US008074147B2

(12) United States Patent
Lee et al.

(10) Patent No.: US 8,074,147 B2
(45) Date of Patent: Dec. 6, 2011

(54) DIGITAL BROADCASTING SYSTEM AND METHOD OF PROCESSING DATA

(75) Inventors: Hyoung Gon Lee, Seoul (KR); In Hwan Choi, Gyeonggi-do (KR); Kook Yeon Kwak, Gyeonggi-do (KR); Jong Moon Kim, Gyeonggi-do (KR); Won Gyu Song, Seoul (KR); Byoung Gill Kim, Seoul (KR); Jin Woo Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 900 days.

(21) Appl. No.: 12/062,790

(22) Filed: Apr. 4, 2008

(65) Prior Publication Data
US 2008/0282130 A1 Nov. 13, 2008

Related U.S. Application Data

(60) Provisional application No. 60/911,509, filed on Apr. 12, 2007.

(30) Foreign Application Priority Data

Apr. 5, 2007 (KR) .......................... 10-2007-0033907

(51) Int. Cl.
*G06F 11/00* (2006.01)
(52) U.S. Cl. ....................................................... 714/758

(58) Field of Classification Search .................. 714/758, 714/776
See application file for complete search history.

(56) References Cited

U.S. PATENT DOCUMENTS

| 7,801,243 B2 * | 9/2010 | Kim et al. ..................... 375/295 |
| 2004/0061645 A1 | 4/2004 | Seo et al. |
| 2006/0262863 A1 | 11/2006 | Park et al. |
| 2006/0268673 A1 | 11/2006 | Roh et al. |
| 2009/0055710 A1 * | 2/2009 | Park et al. ..................... 714/758 |
| 2009/0055711 A1 * | 2/2009 | Chang et al. .................. 714/758 |

* cited by examiner

*Primary Examiner* — Scott Baderman
*Assistant Examiner* — Yair Leibovich
(74) *Attorney, Agent, or Firm* — Lee, Hong, Degerman, Kang & Waimey

(57) ABSTRACT

A digital broadcasting system and a data processing method are disclosed. Herein, additional encoding is performed on mobile service data, which are then transmitted, thereby providing robustness in the processed mobile service data, so that the mobile service data can respond more strongly against fast and frequent channel changes. The data processing method of a digital broadcast transmitting system includes the steps of forming a RS frame by grouping a plurality of mobile service data bytes that is being inputted, and performing error correction encoding in RS frame units, forming a super frame by grouping a plurality of the error correction encoded RS frame, performing row permutation in super frame units, and dividing the super frame back to RS frames, and dividing the RS frame into a plurality of data groups.

20 Claims, 44 Drawing Sheets

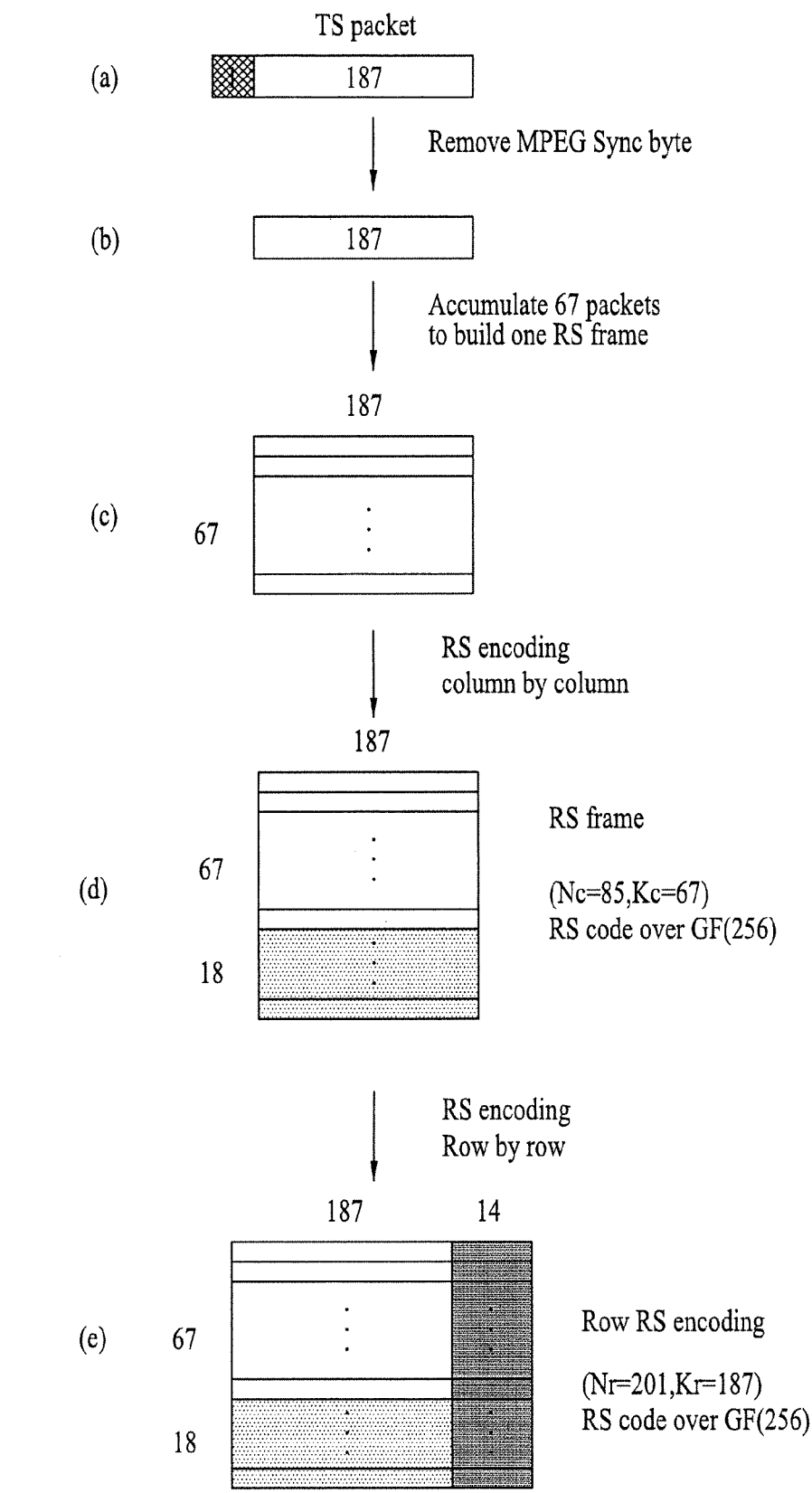

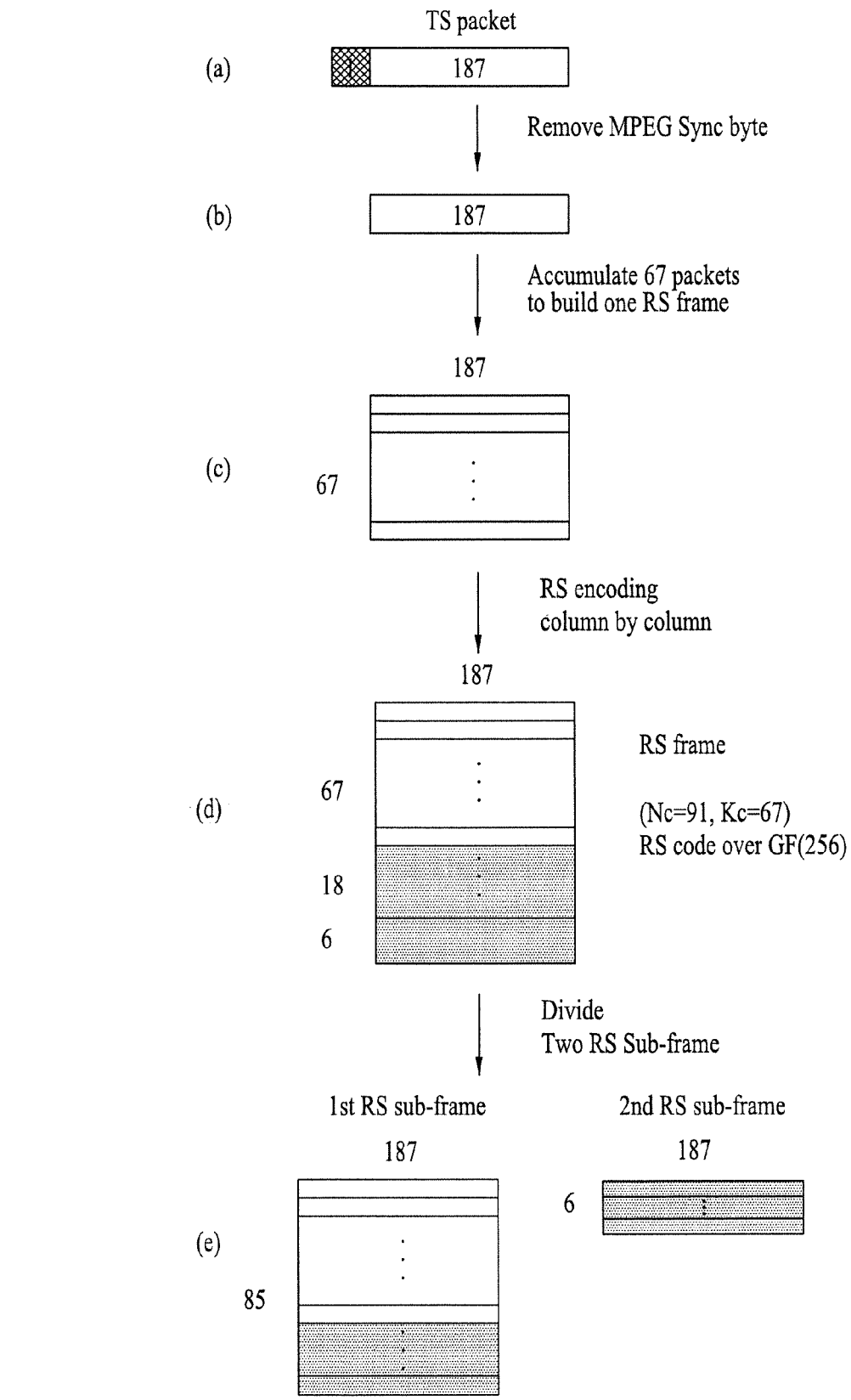

DIGITAL BROADCASTING SYSTEM AND METHOD OF PROCESSING DATA

This application claims the benefit of the Korean Patent Application No. 10-2007-0033907, filed on Apr. 5, 2007, which is hereby incorporated by reference as if fully set forth herein. Also, this application also claims the benefit of U.S. Provisional Application No. 60/911,509, filed on Apr. 12, 2007, which is hereby incorporated by reference.

BACKGROUND OF THE INVENTION

1. Field of the Invention

The present invention relates to a digital broadcasting system and method of processing data.

2. Discussion of the Related Art

The Vestigial Sideband (VSB) transmission mode, which is adopted as the standard for digital broadcasting in North America and the Republic of Korea, is a system using a single carrier method. Therefore, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting system and a method of processing data that substantially obviate one or more problems due to limitations and disadvantages of the related art.

An object of the present invention is to provide a digital broadcasting system and a method of processing data that are highly resistant to channel changes and noise.

Another object of the present invention is to provide a digital broadcasting system and a method of processing data that can enhance the receiving performance of a receiving system (or receiver) by having a transmitting system (or transmitter) perform additional encoding on mobile service data, and by having the receiving system (or receiver) perform decoding on the additionally encoded mobile service data as an inverse process of the transmitting system.

A further object of the present invention is to provide a digital broadcasting system and a method of processing data that can also enhance the receiving performance of a digital broadcast receiving system by inserting known data already known in accordance with a pre-agreement between the receiving system and the transmitting system in a predetermined area within a data area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital broadcast transmitting system includes a service multiplexer and a transmitter. The service multiplexer multiplexes mobile service data and main service data at pre-determined data rates and, then, transmits the multiplexed service data to the transmitter. The transmitter performs additional encoding on the mobile service data transmitted from the service multiplexer and, also, groups a plurality of mobile service data packets having encoding performed thereon so as to configure a data group.

Herein, the transmitter may multiplex a mobile service data packet including the mobile service data and a main service data packet including the main service data in packet units and may transmit the multiplexed data packets to a digital broadcast receiving system. Herein, the transmitter may multiplex the data group and the main service data packet in a burst structure, wherein the burst section may be divided in a burst-on section including the data group, and a burst-off section that does not include the data group. The data group may be divided into a plurality of regions based upon a degree of interference of the main service data. A long known data sequence may be periodically inserted in the region having no interference with the main service data.

In another aspect of the present invention, a digital broadcast receiving system may use the known data sequence for demodulating and channel equalizing processes. When receiving only the mobile service data, the digital broadcast receiving system turns power on only during the burst-on section so as to process the mobile service data.

In another aspect of the present invention, a data processing method of a transmitting system includes the steps of forming a RS frame by grouping a plurality of mobile service data bytes that is being inputted, and performing error correction encoding in RS frame units, forming a super frame by grouping a plurality of the error correction encoded RS frame, performing row permutation in super frame units, and dividing the super frame back to RS frames, and dividing the RS frame into a plurality of data groups.

In another aspect of the present invention, a digital broadcast transmitting system includes a first encoder, a second encoder, and a group formatter. The first encoder forms a RS frame by grouping a plurality of mobile service data bytes that is being inputted and performs error correction encoding in RS frame units. The first encoder then forms a super frame by grouping a plurality of the error correction encoded RS frame, performs row permutation in super frame units, and divides the super frame back to RS frames. The second encoder performs encoding at a coding rate of 1/H on data within the RS frame, wherein H is greater than or equal to 2 (i.e., $H \geq 2$). And, the group formatter divides the encoded RS frame into a plurality of data groups and allocates each data group to each corresponding region.

In a further aspect of the present invention, in a data processing method of a digital broadcast receiving system, which receives a data group including error correction encoded mobile service data and error correction decodes the received data group, the method includes the steps of grouping a plurality of data groups, thereby forming an RS frame, generating a reliability map indicating reliability information of each mobile service data byte within the RS frame, and performing error correction on the RS frame by referring to the reliability information of the reliability map. Herein, the method further includes a step of performing error detection decoding on the RS frame, thereby indicating whether an error exists or not on an error flag corresponding to each row within the RS frame, and wherein the error correction is performed on the RS frame by referring to a number of errors indicated on the error flag and to the reliability information of the reliability map.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13(a) to FIG. 13(e) illustrate process steps of error correction encoding according to yet another embodiment of the present invention;

FIG. 16(a) to FIG. 16(e) illustrate process steps of error correction encoding according to yet another embodiment of the present invention;

DETAILED DESCRIPTION OF THE INVENTION

Figure 1:
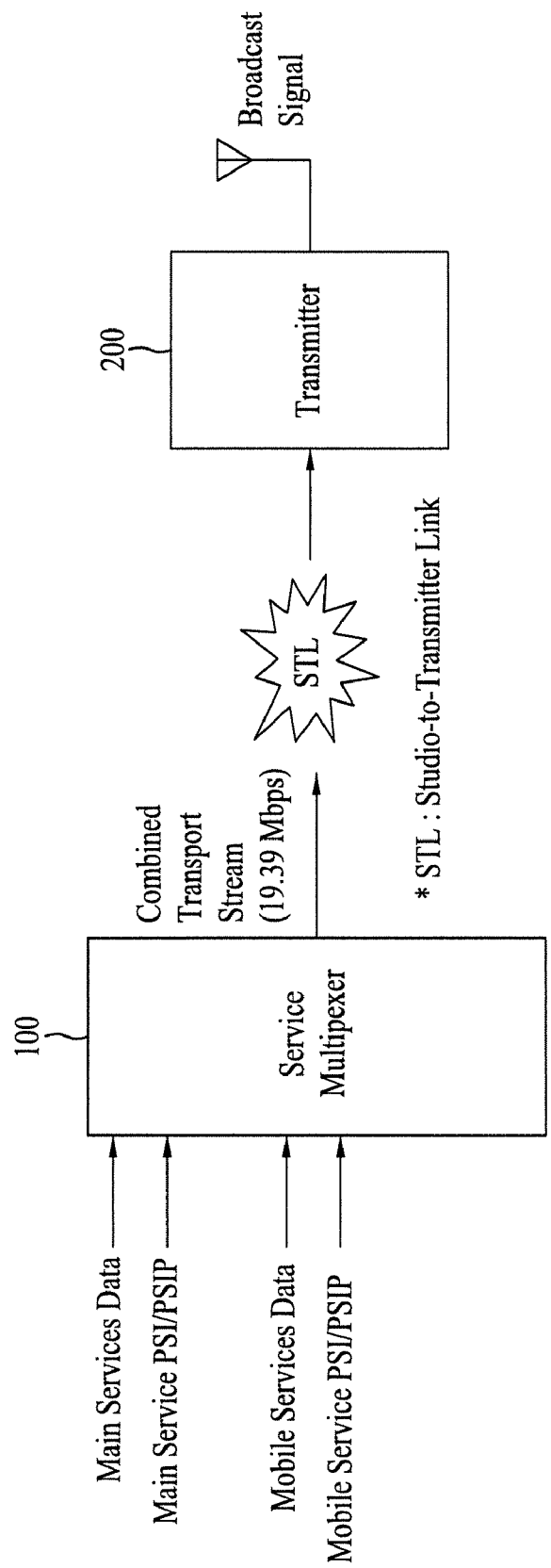
FIG. 1 illustrates a block diagram showing a general structure of a digital broadcasting system according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system. Additionally, in the present invention, mobile service data may include at least one of mobile service data, pedestrian service data, and handheld service data, and are collectively referred to as mobile service data for simplicity. Herein, the mobile service data not only correspond to mobile/pedestrian/handheld service data (M/P/H service data) but may also include any type of service data with mobile or portable characteristics. Therefore, the mobile service data according to the present invention are not limited only to the M/P/H service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be serviced as the main service data.

Also, a data service using the mobile service data may include weather forecast services, traffic information services, stock information services, viewer participation quiz programs, real-time polls & surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

The transmitting system according to the present invention performs additional encoding on the mobile service data and inserts the data already known by the receiving system and transmitting system (i.e., known data), thereby transmitting the processed data. Therefore, when using the transmitting system according to the present invention, the receiving system may receive the mobile service data during a mobile state and may also receive the mobile service data with stability despite various distortion and noise occurring within the channel.

General Description of a Transmitting System

FIG. 1 illustrates a block diagram showing a general structure of a digital broadcast transmitting system according to an embodiment of the present invention. Herein, the digital broadcast transmitting includes a service multiplexer 100 and a transmitter 200. Herein, the service multiplexer 100 is located in the studio of each broadcast station, and the transmitter 200 is located in a site placed at a predetermined distance from the studio. The transmitter 200 may be located in a plurality of different locations. Also, for example, the plurality of transmitters may share the same frequency. And, in this case, the plurality of transmitters receives the same signal. Accordingly, in the receiving system, a channel equalizer may compensate signal distortion, which is caused by a reflected wave, so as to recover the original signal. In another example, the plurality of transmitters may have different frequencies with respect to the same channel.

A variety of methods may be used for data communication each of the transmitters, which are located in remote positions, and the service multiplexer. For example, an interface standard such as a synchronous serial interface for transport of MPEG-2 data (SMPTE-310M). In the SMPTE-310M interface standard, a constant data rate is decided as an output data rate of the service multiplexer. For example, in case of the 8VSB mode, the output data rate is 19.39 Mbps, and, in case of the 16VSB mode, the output data rate is 38.78 Mbps. Furthermore, in the conventional 8VSB mode transmitting system, a transport stream (TS) packet having a data rate of approximately 19.39 Mbps may be transmitted through a single physical channel. Also, in the transmitting system according to the present invention provided with backward compatibility with the conventional transmitting system, additional encoding is performed on the mobile service data. Thereafter, the additionally encoded mobile service data are multiplexed with the main service data to a TS packet form, which is then transmitted. At this point, the data rate of the multiplexed TS packet is approximately 19.39 Mbps.

At this point, the service multiplexer 100 receives at least one type of mobile service data and program specific information (PSI)/program and system information protocol (PSIP) table data for each mobile service and encapsulates the received data to each transport stream (TS) packet. Also, the service multiplexer 100 receives at least one type of main service data and PSI/PSIP table data for each main service so as to encapsulate the received data to a TS packet. Subsequently, the TS packets are multiplexed according to a predetermined multiplexing rule and outputs the multiplexed packets to the transmitter 200.

Service Multiplexer

Figure 2:
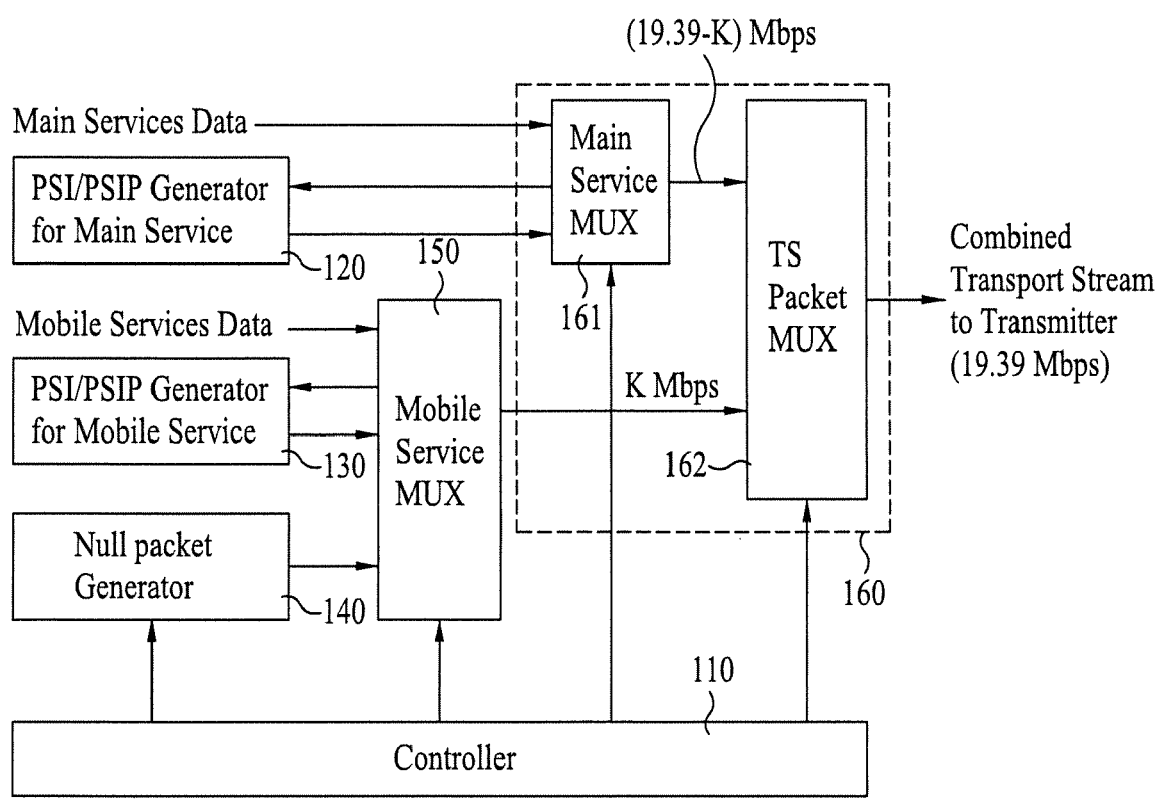
FIG. 2 illustrates a block diagram of a service multiplexer shown in FIG. 1 of the present invention.

FIG. 2 illustrates a block diagram showing an example of the service multiplexer. The service multiplexer includes a controller 110 for controlling the overall operations of the service multiplexer, a PSI/PSIP generator 120 for the main service, a PSI/PSIP generator 130 for the mobile service, a null packet generator 140, a mobile service multiplexer 150, and a transport multiplexer 160. The transport multiplexer 160 may include a main service multiplexer 161 and a transport stream (TS) packet multiplexer 162. Referring to FIG. 2, at least one type of compression encoded main service data and the PSI/PSIP table data generated from the PSI/PSIP generator 120 for the main service are inputted to the main service multiplexer 161 of the transport multiplexer 160. The main service multiplexer 161 encapsulates each of the inputted main service data and PSI/PSIP table data to MPEG-2 TS packet forms. Then, the MPEG-2 TS packets are multiplexed and outputted to the TS packet multiplexer 162. Herein, the data packet being outputted from the main service multiplexer 161 will be referred to as a main service data packet for simplicity.

Thereafter, at least one type of the compression encoded mobile service data and the PSI/PSIP table data generated from the PSI/PSIP generator 130 for the mobile service are inputted to the mobile service multiplexer 150. The mobile service multiplexer 150 encapsulates each of the inputted mobile service data and PSI/PSIP table data to MPEG-2 TS packet forms. Then, the MPEG-2 TS packets are multiplexed and outputted to the TS packet multiplexer 162. Herein, the data packet being outputted from the mobile service multiplexer 150 will be referred to as a mobile service data packet for simplicity. At this point, the transmitter 200 requires identification information in order to identify and process the main service data packet and the mobile service data packet. Herein, the identification information may use values pre-decided in accordance with an agreement between the transmitting system and the receiving system, or may be configured of a separate set of data, or may modify predetermined location value with in the corresponding data packet. As an example of the present invention, a different packet identifier (PID) may be assigned to identify each of the main service data packet and the mobile service data packet.

In another example, by modifying a synchronization data byte within a header of the mobile service data, the service data packet may be identified by using the synchronization data byte value of the corresponding service data packet. For example, the synchronization byte of the main service data packet directly outputs the value decided by the ISO/IEC13818-1 standard (i.e., 0x47) without any modification. The synchronization byte of the mobile service data packet modifies and outputs the value, thereby identifying the main service data packet and the mobile service data packet. Conversely, the synchronization byte of the main service data packet is modified and outputted, whereas the synchronization byte of the mobile service data packet is directly outputted without being modified, thereby enabling the main service data packet and the mobile service data packet to be identified.

A plurality of methods may be applied in the method of modifying the synchronization byte. For example, each bit of the synchronization byte may be inversed, or only a portion of the synchronization byte may be inversed. As described above, any type of identification information may be used to identify the main service data packet and the mobile service data packet. Therefore, the scope of the present invention is not limited only to the example set forth in the description of the present invention.

Meanwhile, a transport multiplexer used in the conventional digital broadcasting system may be used as the transport multiplexer 160 according to the present invention. More specifically, in order to multiplex the mobile service data and the main service data and to transmit the multiplexed data, the data rate of the main service is limited to a data rate of (19.39-K) Mbps. Then, K Mbps, which corresponds to the remaining data rate, is assigned as the data rate of the mobile service. Thus, the transport multiplexer which is already being used may be used as it is without any modification. Herein, the transport multiplexer 160 multiplexes the main service data packet being outputted from the main service multiplexer 161 and the mobile service data packet being outputted from the mobile service multiplexer 150. Thereafter, the transport multiplexer 160 transmits the multiplexed data packets to the transmitter 200.

However, in some cases, the output data rate of the mobile service multiplexer 150 may not be equal to K Mbps. In this case, the mobile service multiplexer 150 multiplexes and outputs null data packets generated from the null packet generator 140 so that the output data rate can reach K Mbps. More specifically, in order to match the output data rate of the mobile service multiplexer 150 to a constant data rate, the null packet generator 140 generates null data packets, which are then outputted to the mobile service multiplexer 150. For example, when the service multiplexer 100 assigns K Mbps of the 19.39 Mbps to the mobile service data, and when the remaining (19.39-K) Mbps is, therefore, assigned to the main service data, the data rate of the mobile service data that are multiplexed by the service multiplexer 100 actually becomes lower than K Mbps. This is because, in case of the mobile service data, the pre-processor of the transmitting system performs additional encoding, thereby increasing the amount of data. Eventually, the data rate of the mobile service data, which may be transmitted from the service multiplexer 100, becomes smaller than K Mbps.

For example, since the pre-processor of the transmitter performs an encoding process on the mobile service data at a coding rate of at least ½, the amount of the data outputted from the pre-processor is increased to more than twice the amount of the data initially inputted to the pre-processor. Therefore, the sum of the data rate of the main service data and the data rate of the mobile service data, both being multiplexed by the service multiplexer 100, becomes either equal to or smaller than 19.39 Mbps. Therefore, in order to match the data rate of the data that are finally outputted from the service multiplexer 100 to a constant data rate (e.g., 19.39 Mbps), an amount of null data packets corresponding to the amount of lacking data rate is generated from the null packet generator 140 and outputted to the mobile service multiplexer 150.

Accordingly, the mobile service multiplexer 150 encapsulates each of the mobile service data and the PSI/PSIP table data that are being inputted to a MPEG-2 TS packet form. Then, the above-described TS packets are multiplexed with the null data packets and, then, outputted to the TS packet multiplexer 162. Thereafter, the TS packet multiplexer 162 multiplexes the main service data packet being outputted from the main service multiplexer 161 and the mobile service data packet being outputted from the mobile service multiplexer 150 and transmits the multiplexed data packets to the transmitter 200 at a data rate of 19.39 Mbps.

According to an embodiment of the present invention, the mobile service multiplexer 150 receives the null data packets. However, this is merely exemplary and does not limit the scope of the present invention. In other words, according to another embodiment of the present invention, the TS packet multiplexer 162 may receive the null data packets, so as to match the data rate of the finally outputted data to a constant data rate. Herein, the output path and multiplexing rule of the null data packet is controlled by the controller 110. The controller 110 controls the multiplexing processed performed by the mobile service multiplexer 150, the main service multiplexer 161 of the transport multiplexer 160, and the TS packet multiplexer 162, and also controls the null data packet generation of the null packet generator 140. At this point, the transmitter 200 discards the null data packets transmitted from the service multiplexer 100 instead of transmitting the null data packets.

Further, in order to allow the transmitter 200 to discard the null data packets transmitted from the service multiplexer 100 instead of transmitting them, identification information for identifying the null data packet is required. Herein, the identification information may use values pre-decided in accordance with an agreement between the transmitting system and the receiving system. For example, the value of the synchronization byte within the header of the null data packet may be modified so as to be used as the identification information. Alternatively, a transport_error_indicator flag may also be used as the identification information.

In the description of the present invention, an example of using the transport_error_indicator flag as the identification information will be given to describe an embodiment of the present invention. In this case, the transport_error_indicator flag of the null data packet is set to '1', and the transport_error_indicator flag of the remaining data packets are reset to '0', so as to identify the null data packet. More specifically, when the null packet generator 140 generates the null data packets, if the transport_error_indicator flag from the header field of the null data packet is set to '1' and then transmitted, the null data packet may be identified and, therefore, be discarded. In the present invention, any type of identification information for identifying the null data packets may be used. Therefore, the scope of the present invention is not limited only to the examples set forth in the description of the present invention.

According to another embodiment of the present invention, a transmission parameter may be included in at least a portion of the null data packet, or at least one table or an operations and maintenance (OM) packet (or OMP) of the PSI/PSIP table for the mobile service. In this case, the transmitter 200 extracts the transmission parameter and outputs the extracted transmission parameter to the corresponding block and also transmits the extracted parameter to the receiving system if required. More specifically, a packet referred to as an OMP is defined for the purpose of operating and managing the transmitting system. For example, the OMP is configured in accordance with the MPEG-2 TS packet format, and the corresponding PID is given the value of 0x1FFA. The OMP is configured of a 4-byte header and a 184-byte payload. Herein, among the 184 bytes, the first byte corresponds to an OM_type field, which indicates the type of the OM packet.

In the present invention, the transmission parameter may be transmitted in the form of an OMP. And, in this case, among the values of the reserved fields within the OM_type field, a pre-arranged value is used, thereby indicating that the transmission parameter is being transmitted to the transmitter 200 in the form of an OMP. More specifically, the transmitter 200 may find (or identify) the OMP by referring to the PID. Also, by parsing the OM_type field within the OMP, the transmitter 200 can verify whether a transmission parameter is included after the OM_type field of the corresponding packet. The transmission parameter corresponds to supplemental data required for processing mobile service data from the transmitting system and the receiving system.

Herein, the transmission parameter may include data group information, region information within the data group, RS frame information, super frame information, burst information, turbo code information, and RS code information. The burst information may include burst size information, burst period information, and time information to next burst. The burst period signifies the period at which the burst transmitting the same mobile service is repeated. The data group includes a plurality of mobile service data packets, and a plurality of such data groups is gathered (or grouped) to form a burst. A burst section signifies the beginning of a current burst to the beginning of a next burst. Herein, the burst section is classified as a section that includes the data group (also referred to as a burst-on section), and a section that does not include the data group (also referred to as a burst-off section). A burst-on section is configured of a plurality of fields, wherein one field includes one data group.

The transmission parameter may also include information on how signals of a symbol domain are encoded in order to transmit the mobile service data, and multiplexing information on how the main service data and the mobile service data or various types of mobile service data are multiplexed. The information included in the transmission parameter is merely exemplary to facilitate the understanding of the present invention. And, the adding and deleting of the information included in the transmission parameter may be easily modified and changed by anyone skilled in the art. Therefore, the present invention is not limited to the examples proposed in the description set forth herein. Furthermore, the transmission parameters may be provided from the service multiplexer 100 to the transmitter 200. Alternatively, the transmission parameters may also be set up by an internal controller (not shown) within the transmitter 200 or received from an external source.

Transmitter

Figure 3:
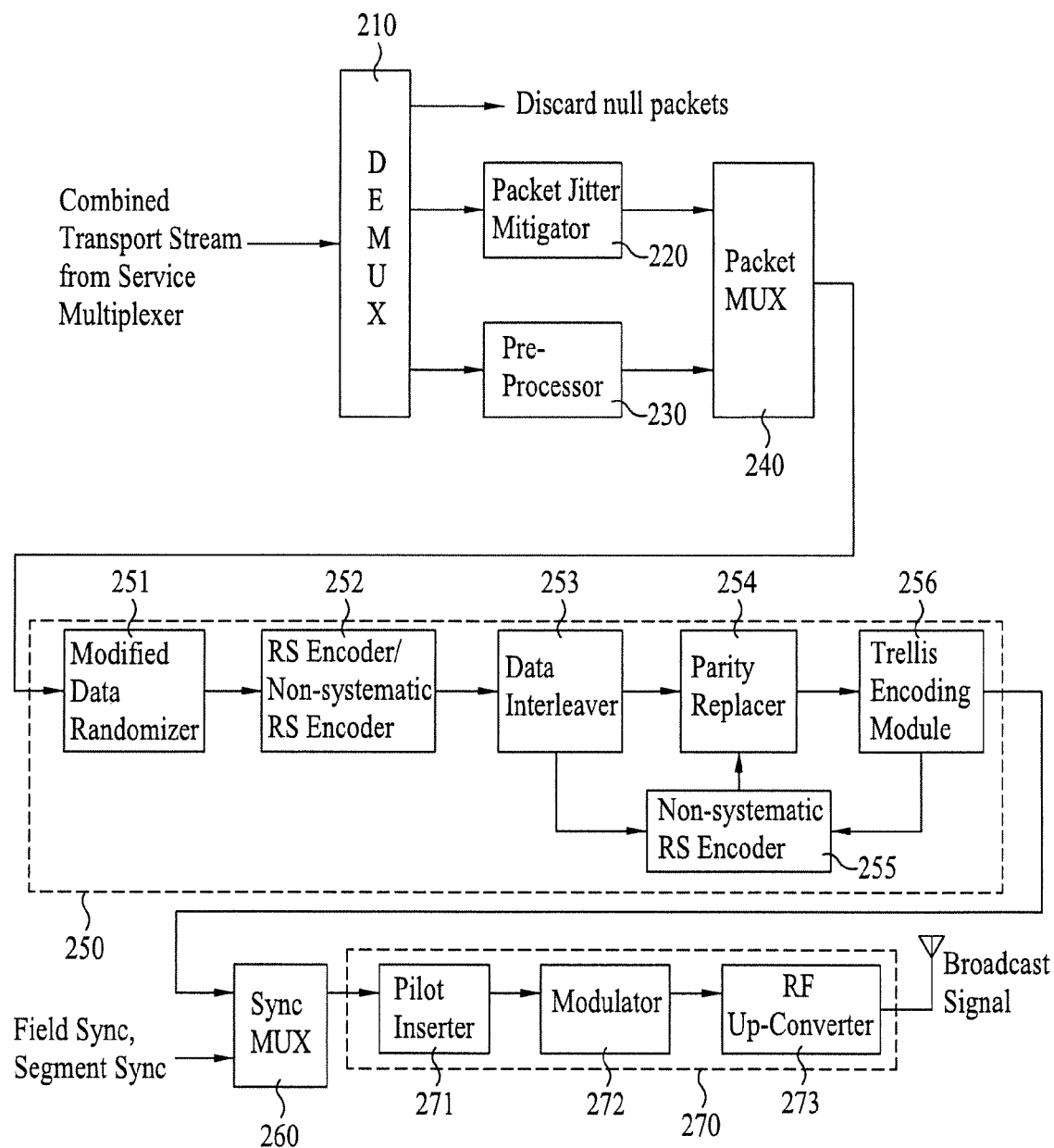
FIG. 3 illustrates a block diagram of a transmitter shown in FIG. 1 of the present invention.

FIG. 3 illustrates a block diagram showing an example of the transmitter 200 according to an embodiment of the present invention. Herein, the transmitter 200 includes a demultiplexer 210, a packet jitter mitigator 220, a pre-processor 230, a packet multiplexer 240, a post-processor 250, a synchronization (sync) multiplexer 260, and a transmission unit 270. Herein, when a data packet is received from the service multiplexer 100, the demultiplexer 210 should identify whether the received data packet corresponds to a main service data packet, a mobile service data packet, or a null data packet. For example, the demultiplexer 210 uses the PID within the received data packet so as to identify the main service data packet and the mobile service data packet. Then, the demultiplexer 210 uses a transport_error_indicator field to identify the null data packet. The main service data packet identified by the demultiplexer 210 is outputted to the packet jitter mitigator 220, the mobile service data packet is outputted to the pre-processor 230, and the null data packet is discarded. If a transmission parameter is included in the null data packet, then the transmission parameter is first extracted and outputted to the corresponding block. Thereafter, the null data packet is discarded.

The pre-processor 230 performs an additional encoding process of the mobile service data included in the service data packet, which is demultiplexed and outputted from the demultiplexer 210. The pre-processor 230 also performs a process of configuring a data group so that the data group may be positioned at a specific place in accordance with the purpose of the data, which are to be transmitted on a transmission frame. This is to enable the mobile service data to respond swiftly and strongly against noise and channel changes. The pre-processor 230 may also refer to the transmission parameter when performing the additional encoding process. Also, the pre-processor 230 groups a plurality of mobile service data packets to configure a data group. Thereafter, known data, mobile service data, RS parity data, and MPEG header are allocated to pre-determined areas within the data group.

Pre-Processor within Transmitter

Figure 4:
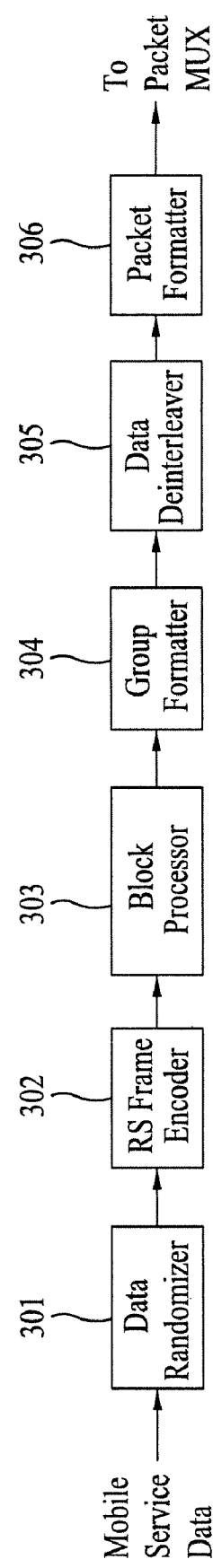
FIG. 4 illustrates a block diagram of a pre-processor shown in FIG. 3 of the present invention.

FIG. 4 illustrates a block diagram showing an example of the pre-processor 230 according to the present invention. The pre-processor 230 includes a data randomizer 301, a RS frame encoder 302, a block processor 303, a group formatter 304, a data deinterleaver 305, a packet formatter 306. The data randomizer 301 within the above-described pre-processor 230 randomizes the mobile service data packet including the mobile service data that is inputted through the demultiplexer 210. Then, the data randomizer 301 outputs the randomized mobile service data packet to the RS frame encoder 302. At this point, since the data randomizer 301 performs the randomizing process on the mobile service data, the randomizing process that is to be performed by the data randomizer 251 of the post-processor 250 on the mobile service data may be omitted. The data randomizer 301 may also discard the synchronization byte within the mobile service data packet and perform the randomizing process. This is an option that may be chosen by the system designer. In the example given in the present invention, the randomizing process is performed without discarding the synchronization byte within the mobile service data packet.

The RS frame encoder 302 groups a plurality of mobile the synchronization byte within the mobile service data packets that is randomized and inputted, so as to create a RS frame. Then, the RS frame encoder 302 performs at least one of an error correction encoding process and an error detection encoding process in RS frame units. Accordingly, robustness may be provided to the mobile service data, thereby scattering group error that may occur during changes in a frequency environment, thereby enabling the mobile service data to respond to the frequency environment, which is extremely vulnerable and liable to frequent changes. Also, the RS frame encoder 302 groups a plurality of RS frame so as to create a super frame, thereby performing a row permutation process in super frame units. The row permutation process may also be referred to as a row interleaving process. Hereinafter, the process will be referred to as row permutation for simplicity.

More specifically, when the RS frame encoder 302 performs the process of permuting each row of the super frame in accordance with a pre-determined rule, the position of the rows within the super frame before and after the row permutation process is changed. If the row permutation process is performed by super frame units, and even though the section having a plurality of errors occurring therein becomes very long, and even though the number of errors included in the RS frame, which is to be decoded, exceeds the extent of being able to be corrected, the errors become dispersed within the entire super frame. Thus, the decoding ability is even more enhanced as compared to a single RS frame.

At this point, as an example of the present invention, RS-encoding is applied for the error correction encoding process, and a cyclic redundancy check (CRC) encoding is applied for the error detection process. When performing the RS-encoding, parity data that are used for the error correction are generated. And, when performing the CRC encoding, CRC data that are used for the error detection are generated. The RS encoding is one of forward error correction (FEC) methods. The FEC corresponds to a technique for compensating errors that occur during the transmission process. The CRC data generated by CRC encoding may be used for indicating whether or not the mobile service data have been damaged by the errors while being transmitted through the channel. In the present invention, a variety of error detection coding methods other than the CRC encoding method may be used, or the error correction coding method may be used to enhance the overall error correction ability of the receiving system. Herein, the RS frame encoder 302 refers to a pre-determined transmission parameter and/or the transmission parameter provided from the service multiplexer 100 so as to perform operations including RS frame configuration, RS encoding, CRC encoding, super frame configuration, and row permutation in super frame units.

RS Frame Encoder within Pre-Processor

FIG. 5(a) to FIG. 5(e) illustrate error correction encoding and error detection encoding processed according to an embodiment of the present invention. More specifically, the RS frame encoder 302 first divides the inputted mobile service data bytes to units of a predetermined length. The predetermined length is decided by the system designer. And, in the example of the present invention, the predetermined length is equal to 187 bytes, and, therefore, the 187-byte unit will be referred to as a packet for simplicity. For example, when the mobile service data that are being inputted, as shown in FIG. 5(a), correspond to a MPEG transport packet stream configured of 188-byte units, the first synchronization byte is removed, as shown in FIG. 5(b), so as to configure a 187-byte unit. Herein, the synchronization byte is removed because each mobile service data packet has the same value.

Herein, the process of removing the synchronization byte may be performed during a randomizing process of the data randomizer 301 in an earlier process. In this case, the process of the removing the synchronization byte by the RS frame encoder 302 may be omitted. Moreover, when adding synchronization bytes from the receiving system, the process may be performed by the data derandomizer instead of the RS frame decoder. Therefore, if a removable fixed byte (e.g., synchronization byte) does not exist within the mobile service data packet that is being inputted to the RS frame encoder 302, or if the mobile service data that are being inputted are not configured in a packet format, the mobile service data that are being inputted are divided into 187-byte units, thereby configuring a packet for each 187-byte unit.

Subsequently, as shown in FIG. 5(c), N number of packets configured of 187 bytes is grouped to configure a RS frame. At this point, the RS frame is configured as a RS frame having the size of N(row)*187(column) bytes, in which 187-byte packets are sequentially inputted in a row direction. In order to simplify the description of the present invention, the RS frame configured as described above will also be referred to as a first RS frame. More specifically, only pure mobile service data are included in the first RS frame, which is the same as the structure configured of 187 N-byte rows. Thereafter, the mobile service data within the RS frame are divided into an equal size. Then, when the divided mobile service data are transmitted in the same order as the input order for configuring the RS frame, and when one or more errors have occurred at a particular point during the transmitting/receiving process, the errors are clustered (or gathered) within the RS frame as well. In this case, the receiving system uses a RS erasure decoding method when performing error correction decoding, thereby enhancing the error correction ability. At this point, the N number of columns within the N number of RS frame includes 187 bytes, as shown in FIG. 5(c).

In this case, a (Nc,Kc)-RS encoding process is performed on each column, so as to generate Nc−Kc(=P) number of parity bytes. Then, the newly generated P number of parity bytes is added after the very last byte of the corresponding column, thereby creating a column of (187+P) bytes. Herein, as shown in FIG. 5(c), Kc is equal to 187 (i.e., Kc=187), and Nc is equal to 187+P (i.e., Nc=187+P). For example, when P is equal to 48, (235,187)-RS encoding process is performed so as to create a column of 235 bytes. When such RS encoding process is performed on all N number of columns, as shown in FIG. 5(c), a RS frame having the size of N(row)*(187+P) (column) bytes may be created, as shown in FIG. 5(d). In order to simplify the description of the present invention, the RS frame having the RS parity inserted therein will be referred to as s second RS frame. More specifically, the second RS frame having the structure of (187+P) rows configured of N bytes may be configured.

As shown in FIG. 5(c) or FIG. 5(d), each row of the RS frame is configured of N bytes. However, depending upon channel conditions between the transmitting system and the receiving system, error may be included in the RS frame. When errors occur as described above, CRC data (or CRC code or CRC checksum) may be used on each row unit in order to verify whether error exists in each row unit. The RS frame encoder 302 may perform CRC encoding on the mobile service data being RS encoded so as to create (or generate) the CRC data. The CRC data being generated by CRC encoding may be used to indicate whether the mobile service data have been damaged while being transmitted through the channel.

The present invention may also use different error detection encoding methods other than the CRC encoding method. Alternatively, the present invention may use the error correction encoding method to enhance the overall error correction ability of the receiving system. FIG. 5(e) illustrates an example of using a 2-byte (i.e., 16-bit) CRC checksum as the CRC data. Herein, a 2-byte CRC checksum is generated for N number of bytes of each row, thereby adding the 2-byte CRC checksum at the end of the N number of bytes. Thus, each row is expanded to (N+2) number of bytes. Equation 1 below corresponds to an exemplary equation for generating a 2-byte CRC checksum for each row being configured of N number of bytes.

$$g(x)=x^{16}+x^{12}+x^5+1$$ Equation 1

The process of adding a 2-byte checksum in each row is only exemplary. Therefore, the present invention is not limited only to the example proposed in the description set forth herein. In order to simplify the understanding of the present invention, the RS frame having the RS parity and CRC checksum added therein will hereinafter be referred to as a third RS frame. More specifically, the third RS frame corresponds to (187+P) number of rows each configured of (N+2) number of bytes. As described above, when the process of RS encoding and CRC encoding are completed, the (N*187)-byte RS frame is expanded to a (N+2)*(187+P)-byte RS frame. Furthermore, the RS frame that is expanded, as shown in FIG. 5(e), is inputted to the block processor 303.

FIG. 6(a) to FIG. 6(e) illustrate examples showing the steps of an encoding process performed by the RS frame encoder 302 according to another embodiment of the present invention. Herein, the RS frame encoding process of FIG. 6(a) to FIG. 6(e) is identical to the RS frame encoding process of FIG. 5(a) to FIG. 5(e) with the exception of the process step for forming the RS frame shown in FIG. 6(c). More specifically, when a 187-byte unit packet is formed through the process steps of FIG. 6(a) and FIG. 6(b), a column is configured with the 187-byte packet. Subsequently, N number of columns (i.e., N number of packets configuring each column) are sequentially grouped to form a RS frame having the size of N(rows)*187(columns), as shown in FIG. 6(c). In other words, an RS frame having the size of N*187 bytes is configured by sequentially inserting N number of 187-byte packets in N number of columns. Since the remaining process steps are identical to those shown in FIG. 5(d) and FIG. 5(e), a detailed description of the same will be omitted for simplicity.

Figure 6:
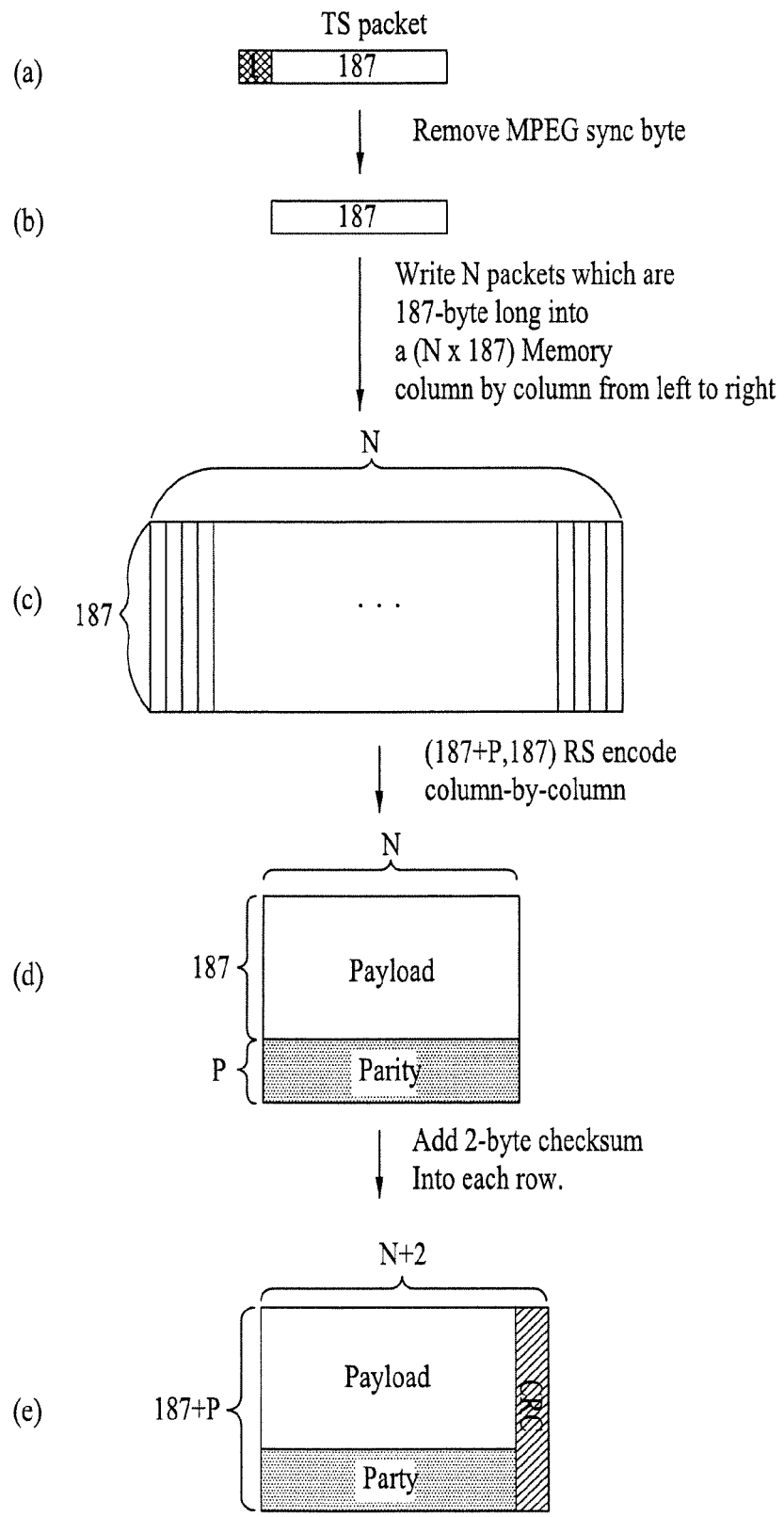
FIG. 6(a) to FIG. 6(e) illustrate process steps of error correction encoding and error detection encoding according to another embodiment of the present invention.
Figure 7:
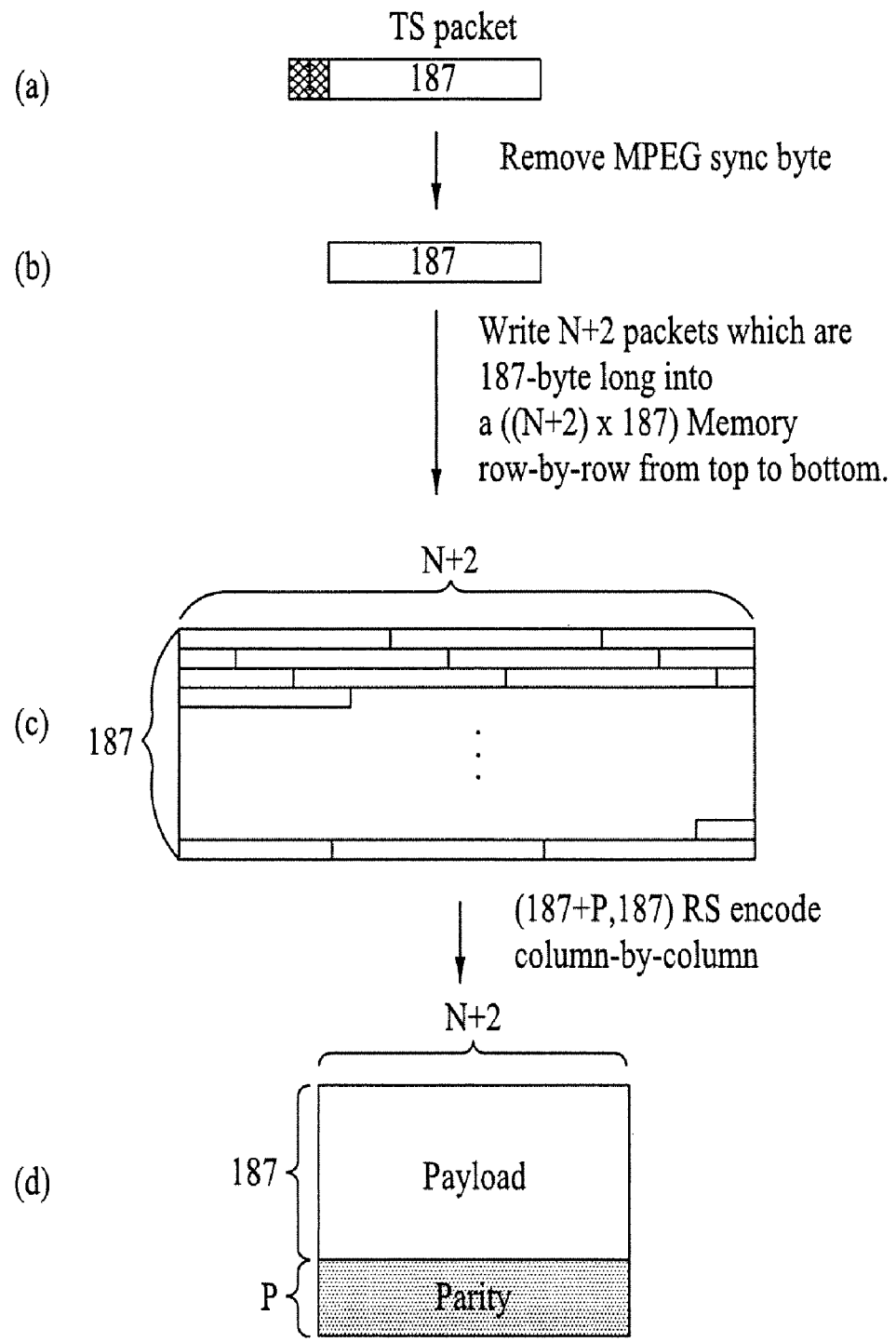
FIG. 7(a) to FIG. 7(d) illustrate process steps of error correction encoding according to yet another embodiment of the present invention.

FIG. 7(a) to FIG. 7(d) illustrate examples showing the steps of an encoding process performed by the RS frame encoder 302 according to yet another embodiment of the present invention. In this example, the process step for error detection encoding is omitted. Referring to FIG. 7, the process of forming a packet by grouping 187 mobile service data bytes is identical to that described in FIG. 5 and FIG. 6. For example, if the mobile service data being inputted as shown in FIG. 7(a) correspond to a transport stream (TS) packet configured of 188-byte units, the first synchronization byte is removed, as shown in FIG. 7(b), thereby configuring a packet with 187 bytes.

However, since the error detection encoding process is not performed in the example shown in FIG. 7, N+2 number of packets configured of 187 bytes is grouped to form a RS frame, as shown in FIG. 7(c). At this point, an RS frame may be configured by serially inserting in a row direction a 187-byte packet into a RS frame having the size of (N+2)(rows)*187(columns). Herein, each column of N number of RS frames includes 187 bytes, as shown in FIG. 7(c). Therefore, in the present invention, a ((187+P),187)-RS encoding process is performed on each column, so as to generate P number of parity data bytes. Then, the generated P number of parity data bytes are added to the corresponding column behind the last data byte of the column, thereby creating a column of (187+P) bytes. Also, when the ((187+P),187)-RS encoding process is performed, as shown in FIG. 7(d), on all N number of columns, shown in FIG. 7(c), a RS frame having the size of (N+2)(rows)*(187+P)(columns) number of bytes may be created.

Figure 5:
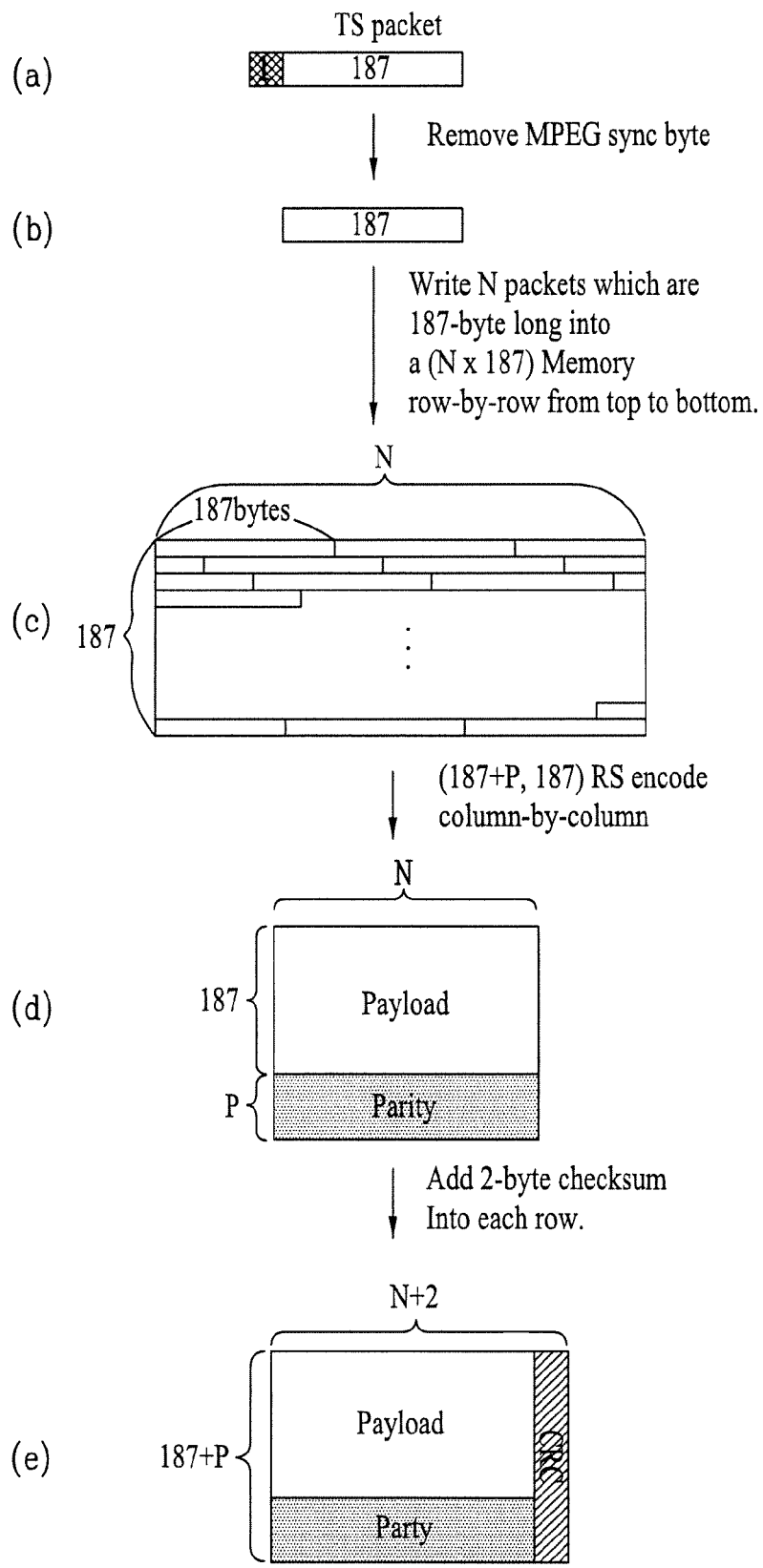
FIG. 5(a) to FIG. 5(e) illustrate process steps of error correction encoding and error detection encoding according to an embodiment of the present invention.

More specifically, the size of the RS frame being processed with error correction encoding and error detection encoding, as shown in FIG. 5, is the same as the size of the RS frame being process with error correction encoding, as shown in FIG. 7. Herein, depending upon the type of the encoded mobile service data, the value P may either have the same values or have different values. For example, the value P of the first RS frame encoder 102a may be set to be equal to 48 (i.e., P=48), and the value P of the second RS frame encoder 102b may be set to be equal to 36 (i.e., P=36). If the value P is set to be equal to 48 is the first RS frame encoder 102a, (235,187)-RS encoding is performed on each column, thereby creating 48 parity data bytes.

Based upon an error correction scenario of a RS frame, the data bytes within the RS frame are transmitted through a channel in a row direction. At this point, when a large number of errors occur during a limited period of transmission time, errors also occur in a row direction within the RS frame being processed with a decoding process in the receiving system. However, in the perspective of RS encoding performed in a column direction, the errors are shown as being scattered. Therefore, error correction may be performed more effectively. At this point, a method of increasing the number of parity data bytes (P) may be used in order to perform a more intense error correction process. However, using this method may lead to a decrease in transmission efficiency. Therefore, a mutually advantageous method is required. Furthermore, when performing the decoding process, an erasure decoding process may be used to enhance the error correction performance.

Figure 8:
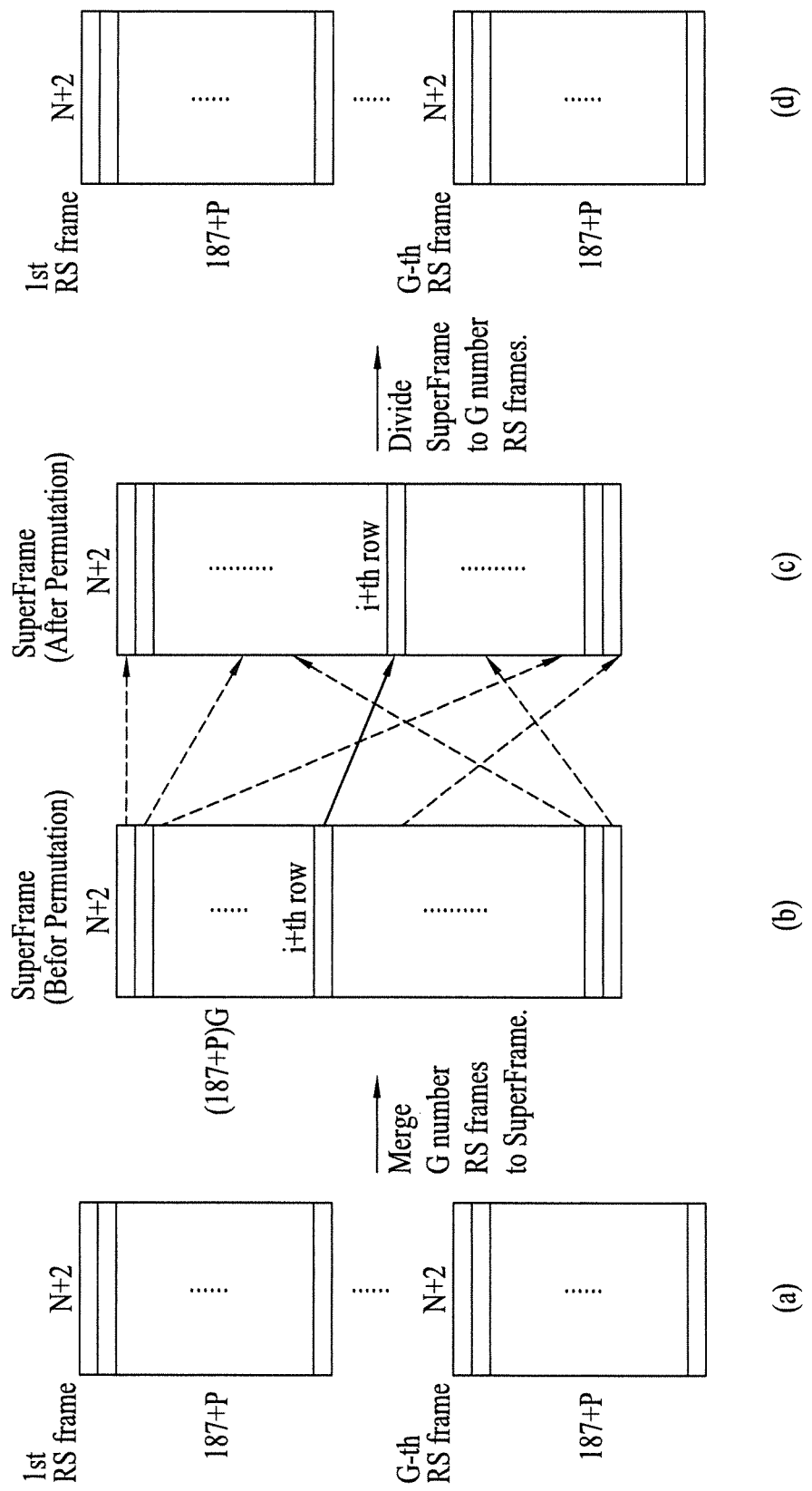
FIG. 8(a) to FIG. 8(d) illustrate process steps of row permutation in super frame units according to an embodiment of the present invention.

The RS frame encoder according to the present invention also performs a row permutation (or interleaving) process in super frame units in order to further enhance the error correction performance when error correction the RS frame. FIG. 8 illustrates an example of performing a row permutation (or interleaving) process in super frame units according to the present invention. More specifically, G number of RS frames encoded as shown in FIG. 5 to FIG. 7 is grouped to form a super frame, as shown in FIG. 8(a). At this point, since each RS frame is formed of (N+2)*(187+P) number of bytes, one super frame is configured to have the size of (N+2)*(187+P)*G bytes.

When a row permutation process permuting each row of the super frame configured as described above is performed based upon a pre-determined permutation rule, the positions of the rows prior to and after being permuted (or interleaved) within the super frame may be altered. More specifically, the $i^{th}$ row of the super frame prior to the interleaving process, as shown in FIG. 8(b), is positioned in the $j^{th}$ row of the same super frame after the row permutation process. The above-described relation between i and j can be easily understood with reference to a permutation rule as shown in Equation 2 below.

$$j=G(i \bmod (187+P))+\lfloor i/(187+P) \rfloor$$

$$i=(187+P)(j \bmod G)+\lfloor j/G \rfloor \quad \text{Equation 2}$$

where $0 \leq i, j \leq (187+P)G-1$; or
where $0 \leq i, j < (187+P)G$

Herein, each row of the super frame is configured of (N+2) number of data bytes even after being row-permuted in super frame units.

When all row permutation processes in super frame units are completed, the super frame is once again divided into G number of row-permuted RS frames, as shown in FIG. 8(d), and then provided to the block processor 303. Herein, the number of RS parity bytes and the number of columns should be equally provided in each of the RS frames, which configure a super frame. As described in the error correction scenario of a RS frame, in case of the super frame, a section having a large number of error occurring therein is so long that, even when one RS frame that is to be decoded includes an excessive number of errors (i.e., to an extent that the errors cannot be corrected), such errors are scattered throughout the entire super frame. Therefore, in comparison with a single RS frame, the decoding performance of the super frame is more enhanced. As described above, the mobile service data being encoded on RS frame units and row-permuted in super frame units by the RS frame encoders 302 are outputted to the block processor 303.

Figure 9:
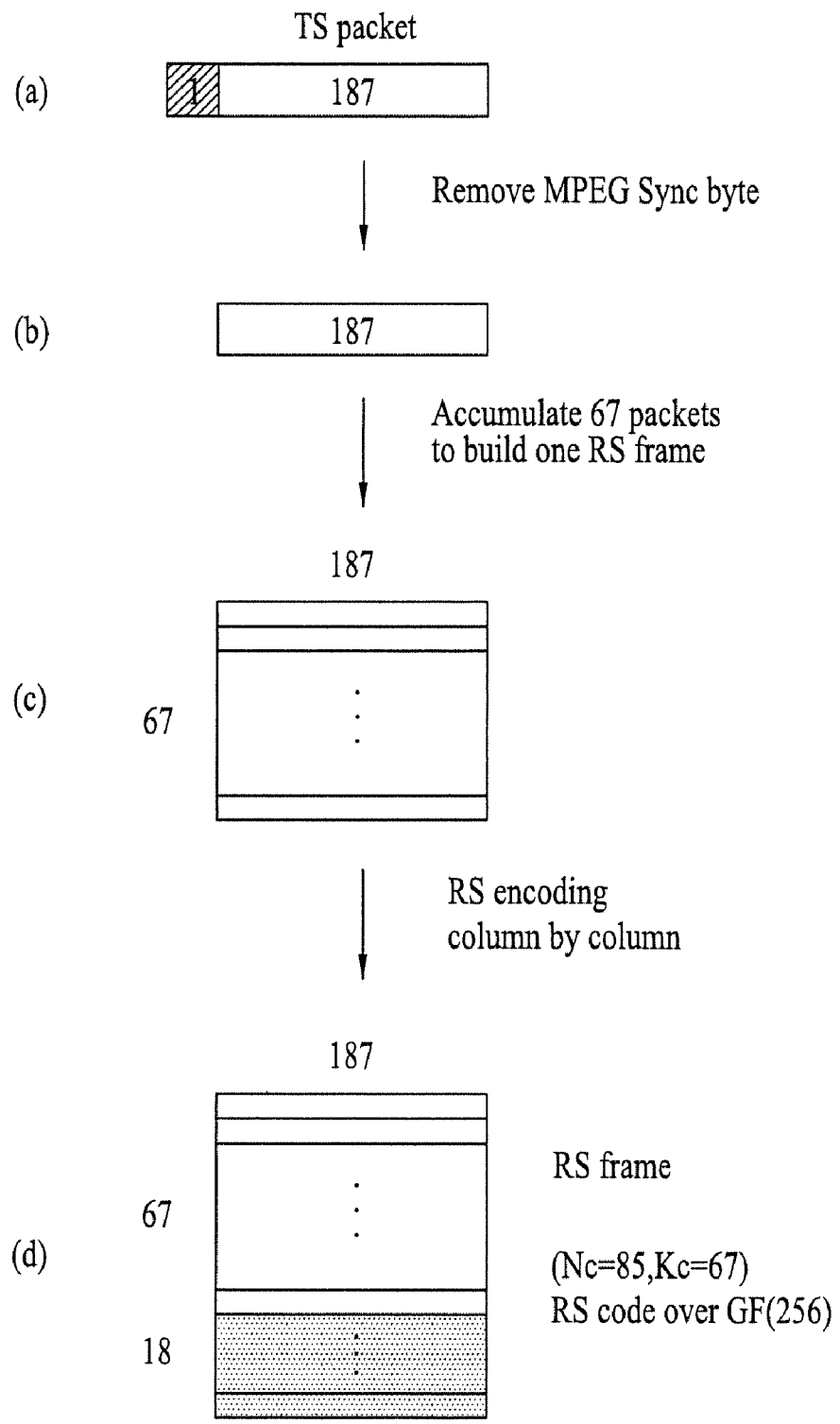
FIG. 9(a) to FIG. 9(d) illustrate process steps of error correction encoding according to yet another embodiment of the present invention.

FIG. 9(a) to FIG. 9(d) illustrate examples showing the steps of an encoding process performed by the RS frame encoder 302 according to yet another embodiment of the present invention. Referring to FIG. 9, the process of forming a packet by grouping 187 mobile service data bytes is identical to that described in FIG. 5 to FIG. 7. Therefore, a detailed description of the same will be omitted for simplicity. More specifically, when a 187-byte unit packet is formed through the process steps of FIG. 9(a) and FIG. 9(b), a plurality of packets is grouped to form a RS frame. In this embodiment of the present invention, a RS frame is formed by grouping 67 packets (i.e., rows), as shown in FIG. 9(c).

Subsequently, a (Nc,Kc)-RS encoding process is performed on each column in the RS frame so as to generate Nc–Kc number of parity bytes. Then, the generated Nc–Kc number of parity bytes are added at the end portion of each corresponding column (i.e., after the $67^{th}$ row of each corresponding column). In this example, Nc is equal to 85, and Kc is equal to 67 (i.e., Nc=85 and Kc=67). Subsequently, the parity data being added to each column correspond to 18 bytes. Therefore, when the (85,67)-RS encoding process is performed on each of the 187 columns within the RS frame, an RS frame includes 187 bytes in each row and 85 bytes in each column. In other words, the RS-encoded RS frame includes 85 rows each configured of 187 bytes. In the present invention, the number of bytes configuring a packet, the number of rows configuring a RS frame, and Nc and Kc values used in RS encoding may vary depending upon the design and condition of the system. Therefore, the present invention will not be limited only to the embodiments set forth herein.

Meanwhile, a CRC encoding process may be performed on the RS frame configured as shown in FIG. 9(d) according to the present invention. However, depending upon channel conditions between the transmitting system and the receiving system, error may be included in the RS frame. When errors occur as described above, CRC data (or CRC code or CRC checksum) may be used on each row unit in order to verify whether error exists in each row unit. The RS frame encoder 302 may perform CRC encoding on the mobile service data being RS encoded so as to create (or generate) the CRC data. The CRC data being generated by CRC encoding may be used to indicate whether the mobile service data have been damaged while being transmitted through the channel. The present invention may also use different error detection encoding methods other than the CRC encoding method. Alternatively, the present invention may use the error correction encoding method to enhance the overall error correction ability of the receiving system.

Either an 8-bit CRC checksum may be used as the CRC data, or a 16-bit CRC checksum may be used as the CRC data. For example, when using the 8-bit CRC checksum, a 1-byte (i.e., 8-bit) CRC checksum is generated for each row within the RS frame. Then, the generated 1-byte CRC checksum is added to the respective row, thereby configuring the CRC data. At this point, the 1-byte CRC checksum may be added to any place (or position) within the corresponding row. According to the embodiment of the present invention, the CRC checksum may be added at the end portion of the corresponding row, thereby configuring a 188-byte row. Furthermore, when using a 2-byte CRC checksum, a 2-byte (i.e., 16-bit) CRC checksum is generated for 2 rows. In this case, the generated 2-byte the 2-byte CRC checksum may be added to any one of the 2 rows. Alternatively, a 1-byte CRC checksum may be added to each row. Also, when the RS frame is created by the RS encoding process, or when the RS frame is created by the RS encoding and CRC encoding processes, a plurality of the RS frames is grouped to form a super frame. In this case, the row permutation process may be performed in super frame units.

Figure 10:
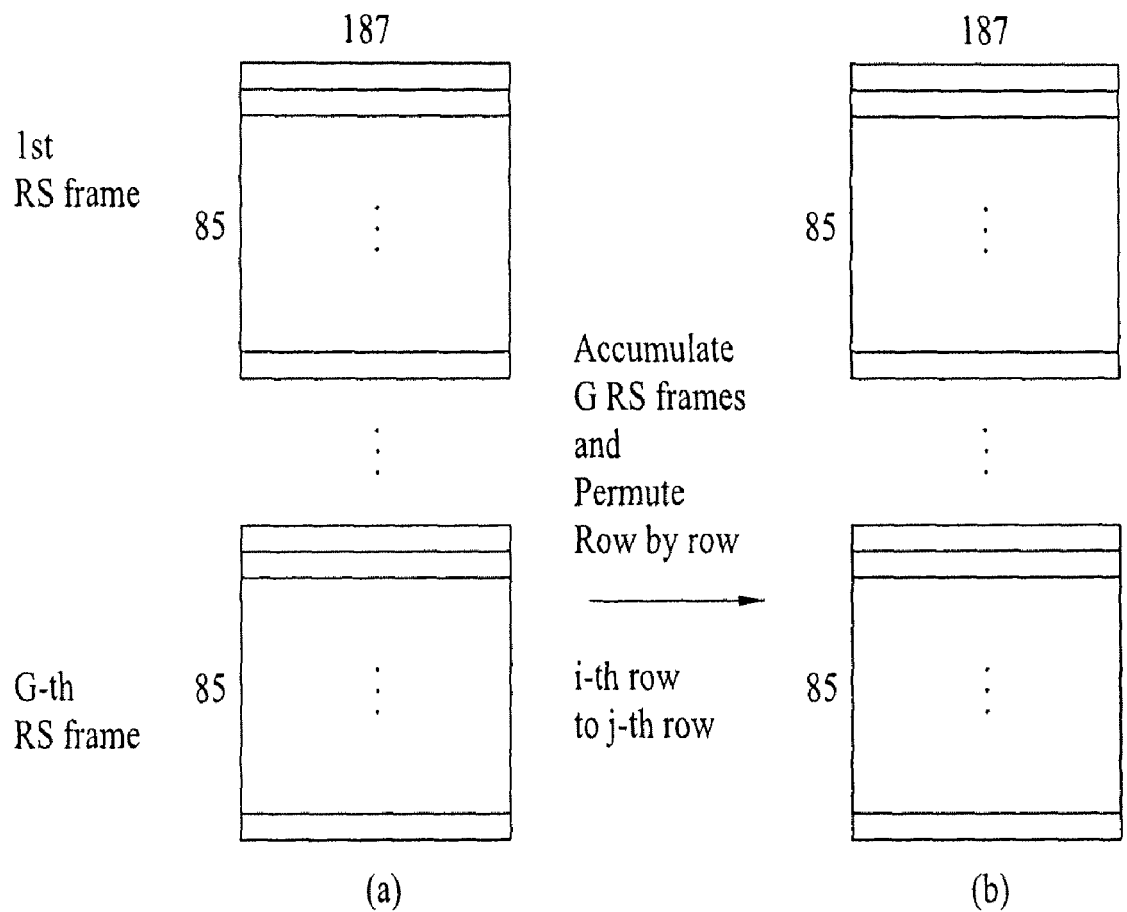
FIG. 10(a) and FIG. 10(b) illustrate process steps of row permutation in super frame units according to another embodiment of the present invention.

When the RS frame is formed, as shown in FIG. 9, FIG. 10 illustrates the process steps for grouping a plurality of the RS frame to create a super frame and for performing row permutation in super frame units. When it is assumed that one row consists of 187 bytes and that (85,67)-RS encoding process is performed in FIG. 9, G number of RS frames each consisting of 85 rows are grouped to formed a super frame, which consists of a total of 85*G number of 187-byte rows, as shown in FIG. 10(a). When the row permutation process is performed on the above-described super frame by using a pre-determined method, the position of the rows may differ prior to and after the row permutation process within the super frame. More specifically, the $i^{th}$ row of the super frame prior to the row permutation process of FIG. 10(a) is positioned in the $j^{th}$ row of the same super frame of FIG. 10(b), which is processed with row permutation. The above-described relation between i and j can be easily understood with reference to Equation 3 below.

$$j=G(i \bmod 85)+\lfloor i/85 \rfloor$$

$$i=85(j \bmod G)+\lfloor j/G \rfloor \quad \text{Equation 3}$$

where $0 \leq i,j < 85G$

Herein, each row of the super frame is configured of 187 bytes even after being processed with row permutation in super frame units. Furthermore, once all super frame unit row permutation processes are performed, the row-permuted super frame is divided back to G number of RS frames, which are then provided to the block processor 303. At this point, the above-described CRC encoding process may either be performed even before the super frame unit row permutation process, or be performed after the row permutation process and the process of dividing the row-permuted super frame to G number of RS frames. Alternatively, at least any one or both of the CRC encoding process and the super frame unit row permutation process may be omitted.

Meanwhile, according to another embodiment of the present invention, a plurality of mobile service data packets may be grouped to form a RS frame, and a primary error correction encoding process may be performed in any one of a row direction or a column direction on the newly formed RS frame. Subsequently, a secondary error correction encoding process may be performed in the other direction on the primarily error correction encoded RS frame. In the description of the present invention, this process will be referred to as a double error correction encoding process for simplicity.

Figure 11:
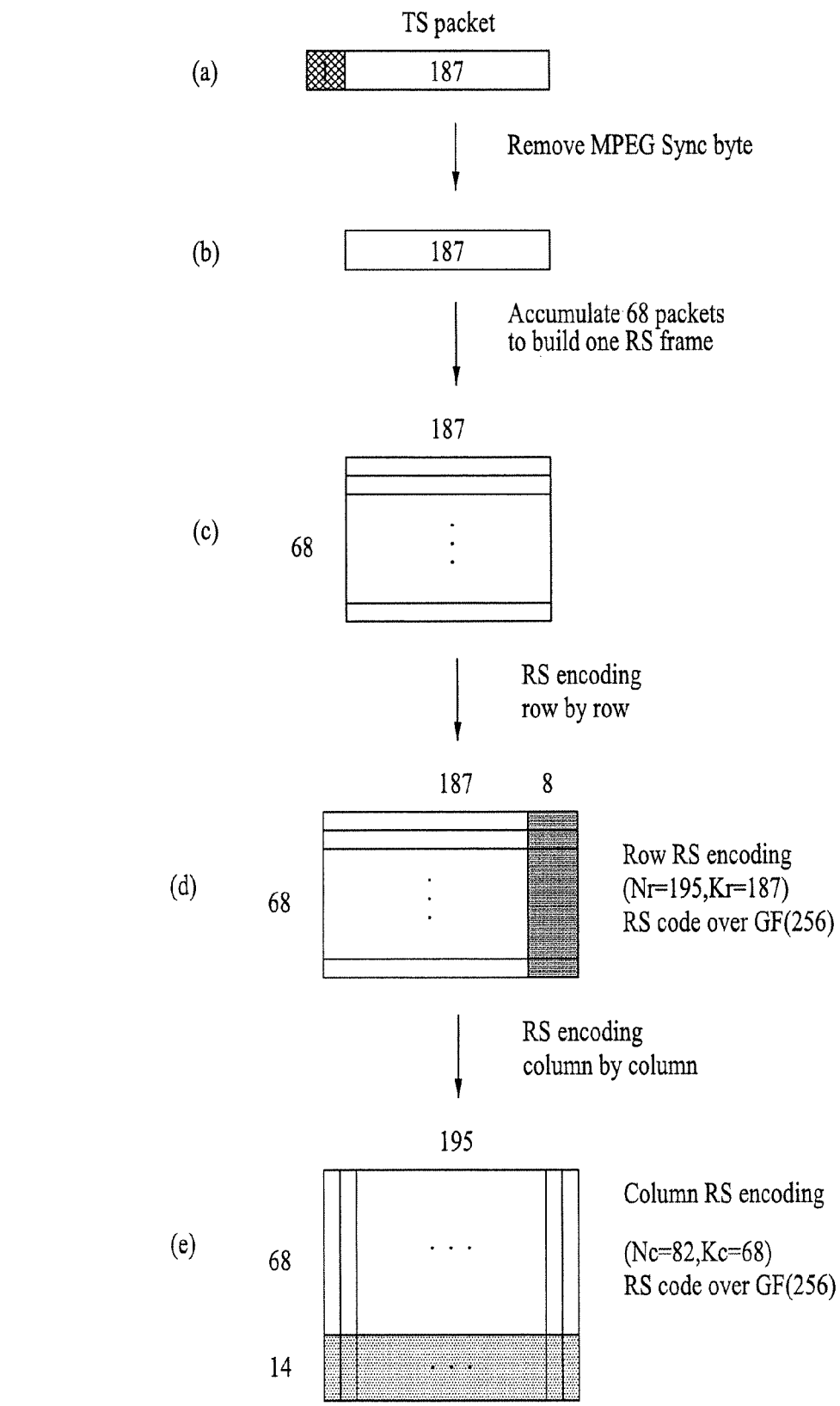
FIG. 11(a) to FIG. 11(e) illustrate process steps of error correction encoding according to yet another embodiment of the present invention.

FIG. 11(a) to FIG. 11(e) illustrate examples showing the steps of a double error correction encoding process of the RS frame encoder 302 according to an embodiment of the present invention. Referring to FIG. 11, a primary error correction encoding process is performed in a row direction on the inputted mobile service data. And, subsequently, a secondary error correction encoding process is performed in a column direction on the primarily error correction encoded mobile service data. For this, the RS frame encoder 302 should first configure a packet with 187 bytes of mobile service data, as shown in FIG. 11(a) to FIG. 11(c). Thereafter, a plurality of such packets is grouped to form a single RS frame. According to the embodiment of the present invention, 68 packets (or rows) each consisting of 187 bytes are grouped to form a RS frame, as shown in FIG. 11(c).

A (Nr,Kr)-RS encoding process is performed on each of the 68 rows in the RS frame so as to generate Nr−Kr number of parity bytes. Then, the generated Nr−Kr number of parity bytes are added at the end portion of each corresponding row (i.e., after the 187$^{th}$ column of each corresponding row). In this example, Nr is equal to 195, and Kr is equal to 187 (i.e., Nr=195 and Kr=187). Accordingly, the parity data being added to each row, as shown in FIG. 11(d), correspond to 8 bytes. In other words, one row is being expanded from 187 bytes to 195 bytes. As described above, when the (195,187)-RS encoding process is performed on each of the 68 rows within the RS frame, a RS frame including 195 bytes in each row and 68 bytes in each column is configured. More specifically, the primarily error correction encoded RS frame includes 68 rows (or packets) each configured of 195 bytes.

Subsequently, a (Nc,Kc)-RS encoding process is performed on each column in the RS frame, which is RS-encoded in the row direction as shown in FIG. 11(d), so as to generate Nc−Kc number of parity bytes. Then, the generated Nc−Kc number of parity bytes are added at the end portion of each corresponding column (i.e., after the 68$^{th}$ row of each corresponding column). In this example, Nc is equal to 82, and Kc is equal to 68 (i.e., Nc=82 and Kc=68). Accordingly, the parity data being added to each column, as shown in FIG. 11(e), correspond to 14 bytes. In other words, one column is being expanded from 68 bytes to 82 bytes. As described above, when the (82,68)-RS encoding process is performed on each of the 195 columns within the RS frame, a RS frame including 195 bytes in each row and 82 bytes in each column is configured. In other words, the primarily and secondarily error correction encoded RS frame includes 82 rows each configured of 195 bytes.

Figure 12:
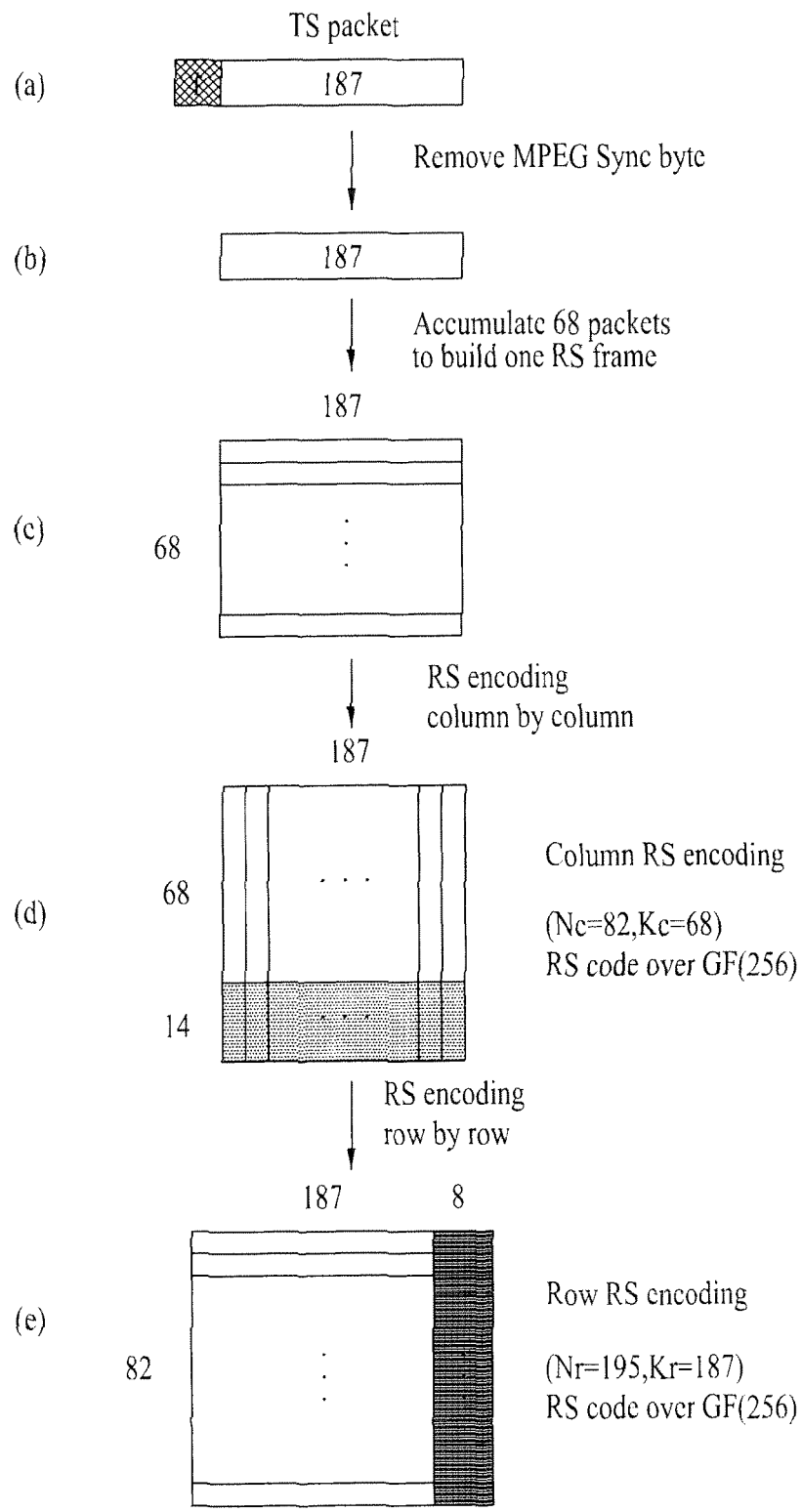
FIG. 12(a) to FIG. 12(e) illustrate process steps of error correction encoding according to yet another embodiment of the present invention.

FIG. 12(a) to FIG. 12(e) illustrate examples showing the steps of a double error correction encoding process of the RS frame encoder 302 according to another embodiment of the present invention. Referring to FIG. 12, a primary error correction encoding process is performed in a column direction on the inputted mobile service data. And, subsequently, a secondary error correction encoding process is performed in a row direction on the primarily error correction encoded mobile service data. For this, the RS frame encoder 302 should first configure a packet with 187 bytes of mobile service data, as shown in FIG. 12(a) to FIG. 12(c). Thereafter, a plurality of such packets is grouped to form a single RS frame. According to the embodiment of the present invention, 68 packets (or rows) each consisting of 187 bytes are grouped to form a RS frame, as shown in FIG. 12(c).

A (Nc,Kc)-RS encoding process is performed on each column in the RS frame so as to generate Nc−Kc number of parity bytes. Then, the generated Nc−Kc number of parity bytes are added at the end portion of each corresponding column (i.e., after the 68$^{th}$ row of each corresponding column). In this example, Nc is equal to 82, and Kc is equal to 68 (i.e., Nc=82 and Kc=68). Accordingly, the parity data being added to each column, as shown in FIG. 12(d), correspond to 14 bytes. When the (82,68)-RS encoding process is performed on each of the 187 columns within the RS frame, a RS frame including 187 bytes in each row and 82 bytes in each column is configured. More specifically, the primarily error correction encoded RS frame includes 82 rows each configured of 187 bytes.

Subsequently, a (Nr,Kr)-RS encoding process is performed on each row in the RS frame, which is RS-encoded in the column direction as shown in FIG. 12(d), so as to generate Nr−Kr number of parity bytes. Then, the generated Nr−Kr number of parity bytes are added at the end portion of each corresponding row (i.e., after the 187$^{th}$ column of each corresponding row). In this example, Nr is equal to 195, and Kr is equal to 187 (i.e., Nr=195 and Kr=187). Accordingly, the parity data being added to each row, as shown in FIG. 12(e), correspond to 8 bytes. When the (195,187)-RS encoding process is performed on each of the 82 rows within the RS frame, a RS frame including 195 bytes in each row and 82 bytes in each column is configured. In other words, the primarily and secondarily error correction encoded RS frame includes 82 rows each configured of 195 bytes.

In the present invention, the number of bytes configuring a row, the number of rows configuring a RS frame, and Nr, Nc, Kr, and Kc values used in RS encoding during the double error correction encoding process may vary depending upon the design and condition of the system. Therefore, the present invention will not be limited only to the embodiments set forth herein. Furthermore, a plurality of the double error correction encoded RS frames, as shown in FIG. 11 or FIG. 12, may be grouped to first configure a super frame. Thereafter, the row permutation process may be performed on newly formed super frame. Herein, by performing the row permutation process, group errors that occur during changes in a frequency environment may be scattered, thereby enabling the mobile service data to respond effectively to the frequency environment, which is extremely vulnerable and liable to frequent changes.

When the double error correction encoding process is performed in FIG. 11 or FIG. 12, one RS frame is configured of 195(rows)*82(columns) bytes. Thereafter, G number of such RS frames is grouped to forms a super frame configured of 82*G number of 195-byte rows. Subsequently, once the row permutation process is performed on the above-described super frame, the positions of the rows prior to and after the row permutation process are changed. The row permutation process is identical to that described in FIG. 8 or FIG. 10. Therefore, a detailed description of the same will be omitted for simplicity.

FIG. 13(*a*) to FIG. 13(*e*) illustrate examples showing the steps of a double error correction encoding process of the RS frame encoder 302 according to yet another embodiment of the present invention. Referring to FIG. 13, a primary error correction encoding process is performed in a column direction on the inputted mobile service data. And, subsequently, a secondary error correction encoding process is performed in a row direction on the primarily error correction encoded mobile service data, thereby providing robustness to the mobile service data. In the embodiment shown in FIG. 13, the primary error correction encoding process is performed in a row direction, and the secondary error correction encoding process is performed in a column direction. Furthermore, at least one of a super frame unit row permutation process and an error detection encoding process may be performed on the secondarily error correction encoded mobile service data.

For this, the RS frame encoder 302 should first configure a packet with 187 bytes of mobile service data, as shown in FIG. 13(*a*) to FIG. 13(*c*). Thereafter, a plurality of such packets is grouped to form a single RS frame. According to the embodiment of the present invention, 67 packets (or rows) each consisting of 187 bytes are grouped to form a RS frame, as shown in FIG. 13(*c*). A (Nc,Kc)-RS encoding process is performed on each column in the RS frame so as to generate Nc–Kc number of parity bytes. Then, the generated Nc–Kc number of parity bytes are added at the end portion of each corresponding column (i.e., after the 67$^{th}$ row of each corresponding column). In this example, Nc is equal to 85, and Kc is equal to 67 (i.e., Nc=85 and Kc=67). Accordingly, the parity data being added to each column, as shown in FIG. 13(*d*), correspond to 18 bytes. When the (85,67)-RS encoding process is performed on each of the 187 columns within the RS frame, a RS frame including 187 bytes in each row and 85 bytes in each column is configured. More specifically, the primarily error correction encoded RS frame includes 85 rows each configured of 187 bytes. In other words, all of the 187 columns of the RS frame include 85 bytes.

Subsequently, a (Nr,Kr)-RS encoding process is performed on each row in the RS frame, which is RS-encoded in the column direction as shown in FIG. 13(*d*), so as to generate Nr–Kr number of parity bytes. Then, the generated Nr–Kr number of parity bytes are added at the end portion of each corresponding row (i.e., after the 187$^{th}$ column of each corresponding row). In this example, Nr is equal to 201, and Kr is equal to 187 (i.e., Nr=201 and Kr=187). Accordingly, the parity data being added to each row, as shown in FIG. 13(*e*), correspond to 14 bytes. When the (201,187)-RS encoding process is performed on each of the 85 rows within the RS frame, a RS frame including 201 bytes in each row and 85 bytes in each column is configured. In other words, the RS frame that is obtained after the secondary error correction encoding process includes 85 rows each configured of 201 bytes.

In the present invention, the number of bytes configuring a row, the number of rows configuring a RS frame, and Nr, Nc, Kr, and Kc values used in RS encoding during the double error correction encoding process may vary depending upon the design and condition of the system. Therefore, the present invention will not be limited only to the embodiments set forth herein. Furthermore, the row permutation process may be performed in super frame units on the primarily and secondarily error correction encoded mobile service data, as described above. By performing the row permutation process, group errors that occur during changes in a frequency environment may be scattered, thereby enabling the mobile service data to respond effectively to the frequency environment, which is extremely vulnerable and liable to frequent changes.

For this, in the present invention, the secondarily error correction encoded RS frame (i.e., the RS frame having 85 rows each configured of 201 bytes) is first divided into 2 RS sub-frames. For example, the mobile service data that are inputted to the RS frame encoder 302 for the RS encoding process (i.e., payload data) and the parity data that are generated by an RS encoding process performed in a column direction are collectively referred to as a "first RS sub-frame". The parity data that are generated by an RS encoding process performed in a row direction are referred to as a "second RS sub-frame". Accordingly, the first RS sub-frame includes 85 units of 187 bytes, and the second RS sub-frame includes 85 units of 14 bytes. Then, a plurality of the divided first RS sub-frames is grouped to form a first super frame, and a plurality of the divided second RS sub-frames is grouped to form a second super frame. Thereafter, row permutation is performed on each super frame.

Figure 14A:
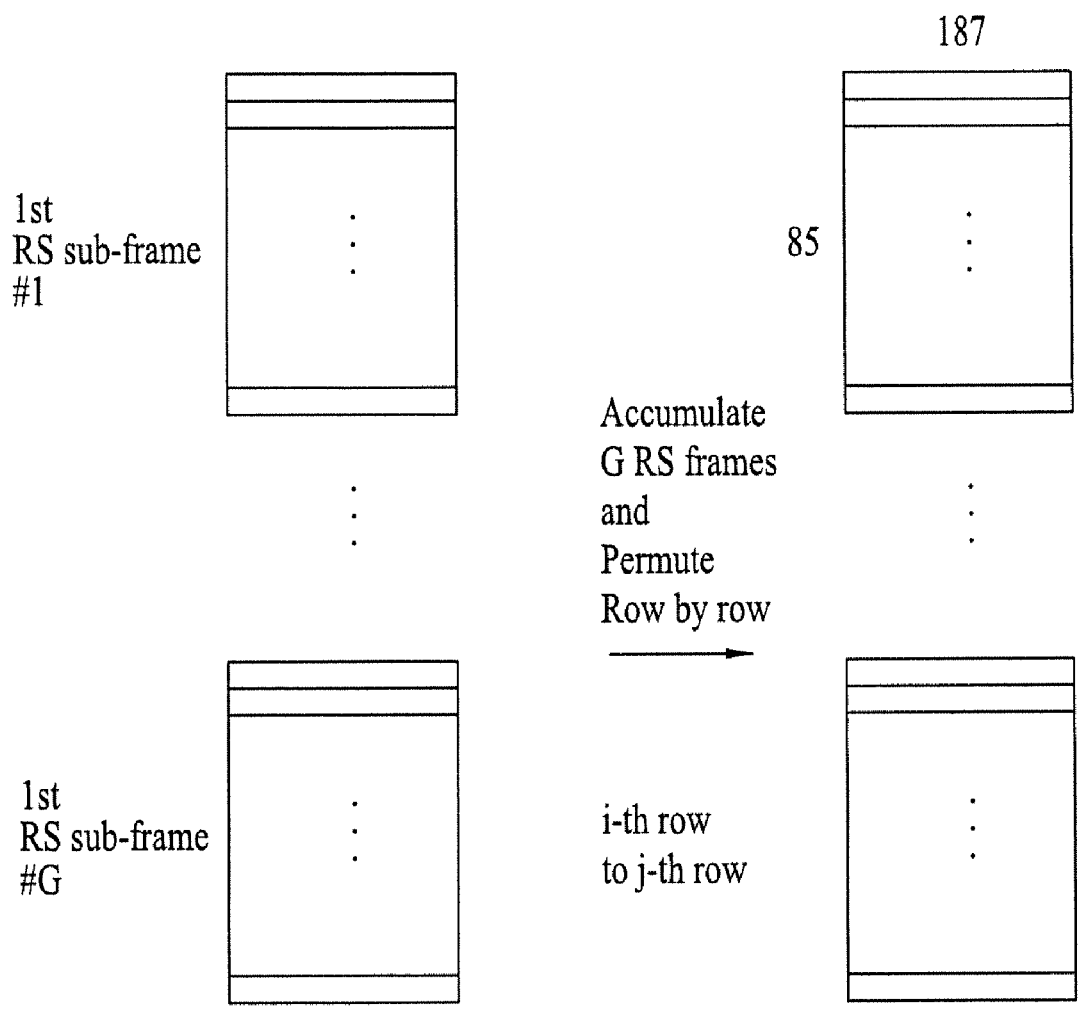
FIG. 14A and FIG. 14B illustrate process steps of row permutation in super frame units according to yet another embodiment of the present invention.
Figure 14B:
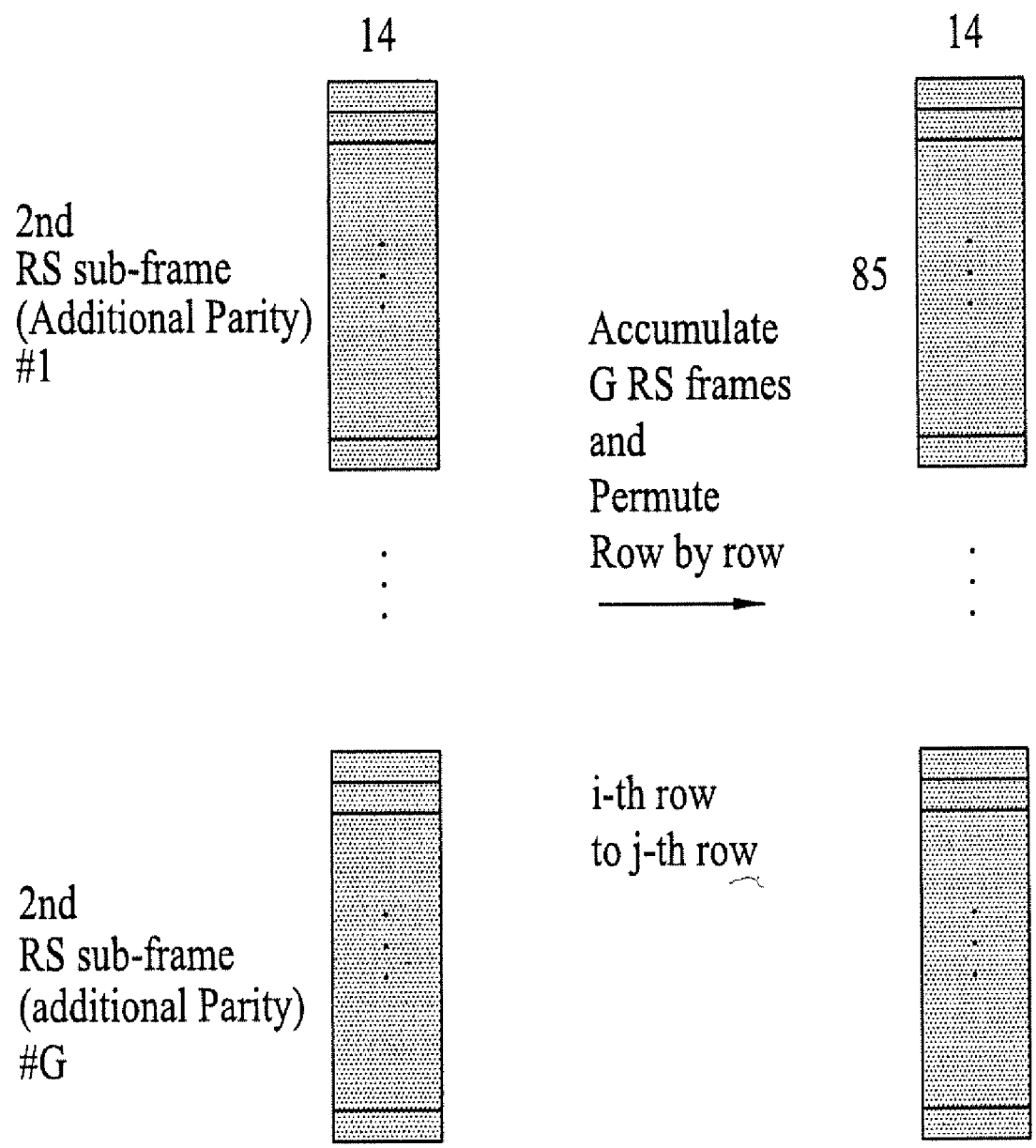

FIG. 14A illustrates a row permutation process performed on the first super frame, and FIG. 14B illustrates a row permutation process performed on the second super frame. Referring to FIG. 14A, when a first super frame including 187 bytes in each row and 85 bytes in each column is configured, G number of first RS sub-frames are grouped to configure a first super frame consisting of 85*G number of 187-byte rows. When the row permutation process is performed on the above-described first super frame by using a predetermined method, the position of the rows may differ prior to and after the row permutation process within the first super frame, as shown in FIG. 14A. More specifically, the i$^{th}$ row of the first super frame prior to the row permutation process is positioned in the j$^{th}$ row of the same first RS super frame after row permutation. The above-described relation between i and j can be easily understood with reference to Equation 4 below.

$$j=G(i \bmod 85)+\lfloor i/85 \rfloor$$

$$i=85(j \bmod G)+\lfloor j/G \rfloor \quad \text{Equation 4}$$

where $0 \leq i,j < 85G$

Herein, each row of the first super frame is configured of 187 bytes even after being processes with row permutation. Once the first super frame unit row permutation process is performed, the first super frame is divided back to G number of row-permuted first RS sub-frames, which are then provided to the block processor 303.

Meanwhile, referring to FIG. 14B, when a second RS sub-frame including 14 bytes in each row and 85 bytes in each column is configured, G number of second RS sub-frames are grouped to configure a second super frame consisting of 85*G number of 14-byte rows. When the row permutation process is performed on the above-described second super frame by using a predetermined method, the position of the rows may differ prior to and after the row permutation process within the second super frame, as shown in FIG. 14B. More specifically, the i$^{th}$ row of the second super frame prior to the row permutation process is positioned in the j$^{th}$ row of the same second super frame after row permutation. Similarly, each row of the second super frame is configured of 14 bytes even after the row permutation process is performed. The above-described relation between i and j of the second super frame may be applied to the above-described Equation 4, or another row permutation method may be applied herein.

In other words, Equation 4 corresponds to a row permutation method according to an embodiment of the present invention. Any row permutation method in which i and j may include all rows within the super frames may be used. The row permutation method is not limited only to the examples given in the description of the present invention. Furthermore, in using the equation for performing row permutation on the first and second super frames, the same equation may be used on both super frames, or a different equation may be used on each super frame. Furthermore, an error detection encoding process may be performed on at least any one of the first and second super frames that is processed with row permutation. For example, CRC encoding may be used in the error detection encoding process. Alternatively, any error detection encoding method other than the CRC encoding method may also be used. Furthermore, an error correction encoding method may be used to enhance the overall error correction performance of the receiving system.

For example, when it is assumed that CRC encoding is applied to the first RS sub-frame and that the 1-byte (i.e., 8-bit) checksum is used as the CRC data, the RS frame encoder 302 may generate a 1-byte (i.e., 8-bit) CRC checksum for each 187-byte row within the first RS sub-frame. Then, the generated 1-byte CRC checksum is added to the respective row. At this point, the 1-byte CRC checksum may be added to any place (or position) within the corresponding row. According to the embodiment of the present invention, the CRC checksum may be added at the end portion of the corresponding row, thereby configuring a 188-byte row. In another example, when it is assumed that CRC encoding is applied to the first RS sub-frame and that a 2-byte (i.e., 16-bit) CRC checksum is used, a 2-byte (i.e., 16-bit) CRC checksum is generated for 2 rows. In this case, the generated 2-byte the 2-byte CRC checksum may be added to any one of the 2 rows. At this point, the 2-byte CRC checksum may be added to any place (or position) within the 2 rows. After adding the 2-byte CRC checksum to the predetermined position within the 2 rows, the processed data may be divided so as to configure 2 188-byte rows. Alternatively, a 2-byte (i.e., 16-bit) CRC checksum is generated for 2 rows. Then, a 1-byte CRC checksum is added to the end of each row, thereby configuring 2 188-byte rows.

The CRC encoding process may be performed before the row permutation process, or the CRC encoding process may be performed after the row permutation process. For example, when the CRC encoding process is performed after the row permutation process, the first super frame having 85*G number of 187-byte rows is extended to a first super frame having 85*G number of 188-byte rows. The CRC-encoded first super frame is then divided back to G number of first RS sub-frames. The row-permuted second super frame is also divided back to G number of second RS sub-frames. Thereafter, the divided first RS sub-frames and the divided second RS sub-frames are inputted to the block processor 303.

Figure 15:
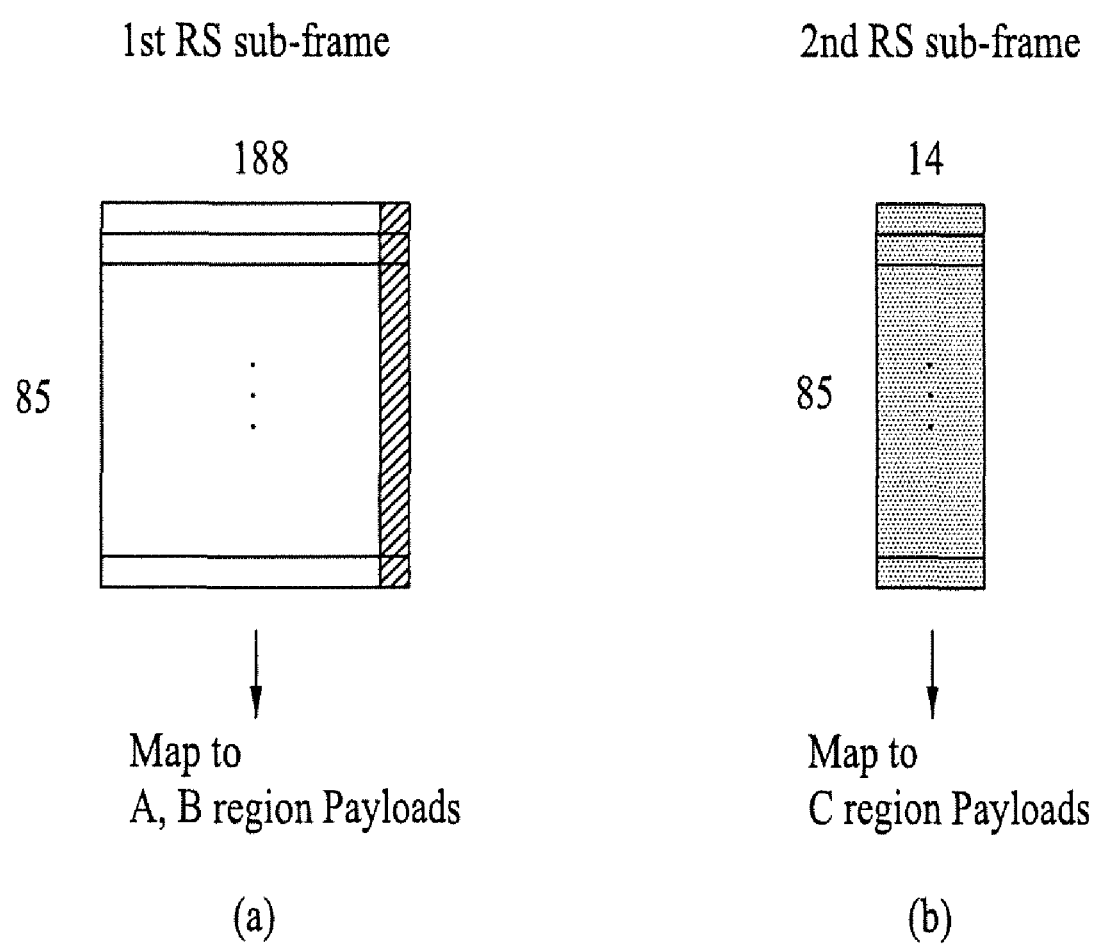
FIG. 15(a) and FIG. 15(b) illustrate an example of dividing the error correction encoded RS frame into a plurality of sub-frames according to the present invention.

FIG. 15(a) illustrates a structure of a first RS sub-frame being sequentially processed with RS-encoding, row permutation, and CRC-encoding and then being inputted to the block processor 303. Herein, the first RS sub-frame consists of 85 188-byte rows. FIG. 15(b) illustrates a structure of a second RS sub-frame being sequentially processed with RS-encoding and row permutation and then being inputted to the block processor 303. Herein, the second RS sub-frame consists of 85 14-byte rows.

FIG. 16(a) to FIG. 16(e) illustrate examples showing the steps of an error correction encoding process of the RS frame encoder 302 according to another embodiment of the present invention. Referring to FIG. 16, inputted mobile service data packets are grouped to form a RS frame. Then, an error correction encoding process is performed in a column direction on the RS frame. Also, the RS frame that is error correction encoded in a column direction is divided into a first RS sub-frame and a second RS sub-frame. Then, each of the first and second RS sub-frames may be processed with at least one of a row permutation process and an error detection encoding process. In order to do so, the RS frame encoder 302 should first configure a packet with 187 bytes of mobile service data, as shown in FIG. 16(a) to FIG. 16(c). Thereafter, a plurality of such packets is grouped to form a single RS frame. According to the embodiment of the present invention, 67 packets (or rows) each consisting of 187 bytes are grouped to form a RS frame, as shown in FIG. 16(c).

A (Nc,Kc)-RS encoding process is performed on each column in the RS frame so as to generate Nc−Kc number of parity bytes. Then, the generated Nc−Kc number of parity bytes are added at the end portion of each corresponding column (i.e., after the 67$^{th}$ row of each corresponding column). In this example, Nc is equal to 91, and Kc is equal to 67 (i.e., Nc=91 and Kc=67). Accordingly, the parity data being added to each column, as shown in FIG. 16(d), correspond to 24 bytes. When the (91,67)-RS encoding process is performed on each of the 187 columns within the RS frame, a RS frame including 187 bytes in each row and 91 bytes in each column is configured. More specifically, the error correction encoded RS frame includes 91 rows each configured of 187 bytes. In other words, each of the 187 columns included in the RS frame includes 91 bytes.

In the present invention, the number of bytes configuring a row, the number of rows configuring a RS frame, and Nc and Kc values used in RS encoding during the double error correction encoding process may vary depending upon the design and condition of the system. Therefore, the present invention will not be limited only to the embodiments set forth herein. Furthermore, the row permutation process may be performed in super frame units on the mobile service data error correction encoded in a column direction, as shown in FIG. 16(d). By performing the row permutation process, group errors that occur during changes in a frequency environment may be scattered, thereby enabling the mobile service data to respond effectively to the frequency environment, which is extremely vulnerable and liable to frequent changes.

For this, in the present invention, the error correction encoded RS frame (i.e., the RS frame having 91 rows each configured of 187 bytes) is divided into 2 RS sub-frames. For example, the rows of the mobile service data that are inputted for the RS encoding process (i.e., payload data) and part of the parity data rows (e.g., rows including 18 parity data bytes among a total of 24 parity data byte generated by the RS encoding process performed in a column direction) are collectively referred to as a "first RS sub-frame". The rows including the remaining 6 parity data byte are referred to as a "second RS sub-frame". Accordingly, the first RS sub-frame includes 85 units of 187 bytes, as shown in FIG. 16(e), and the second RS sub-frame includes 6 units of 187 bytes. Then, a plurality of the divided first RS sub-frames is grouped to form a first super frame, and a plurality of the divided second RS sub-frames is grouped to form a second super frame. Thereafter, row permutation is performed on each super frame.

Figure 17A:
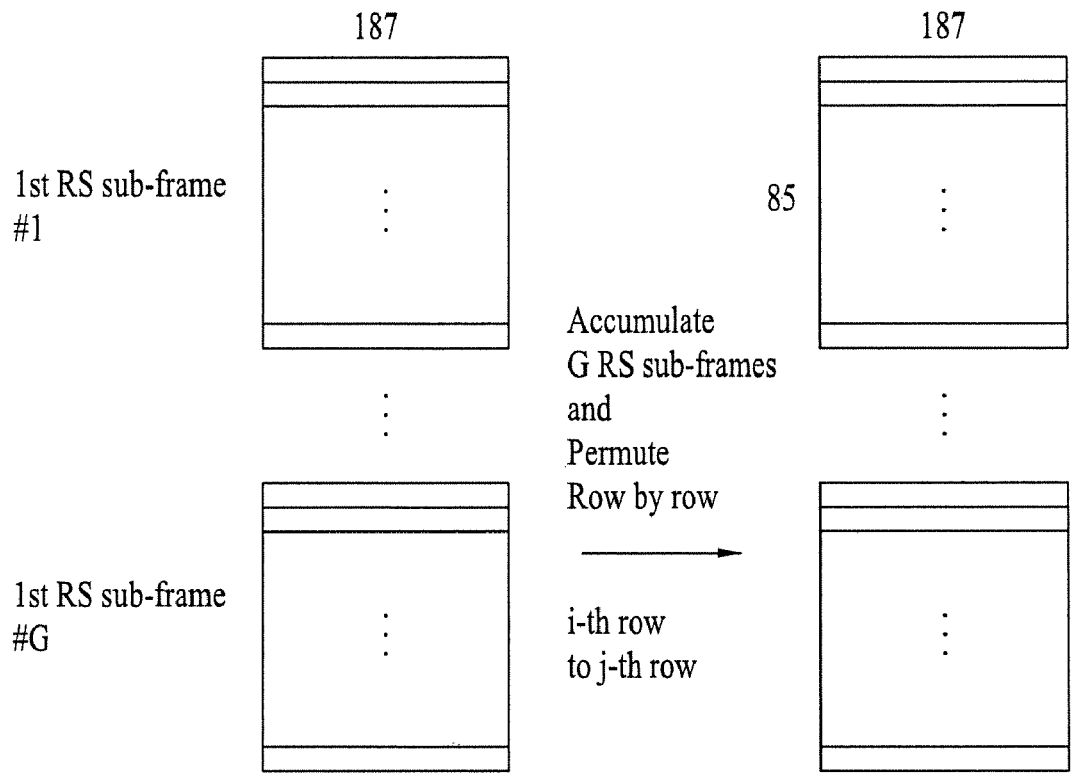
FIG. 17A and FIG. 17B illustrate process steps of row permutation in super frame units according to yet another embodiment of the present invention.
Figure 17B:
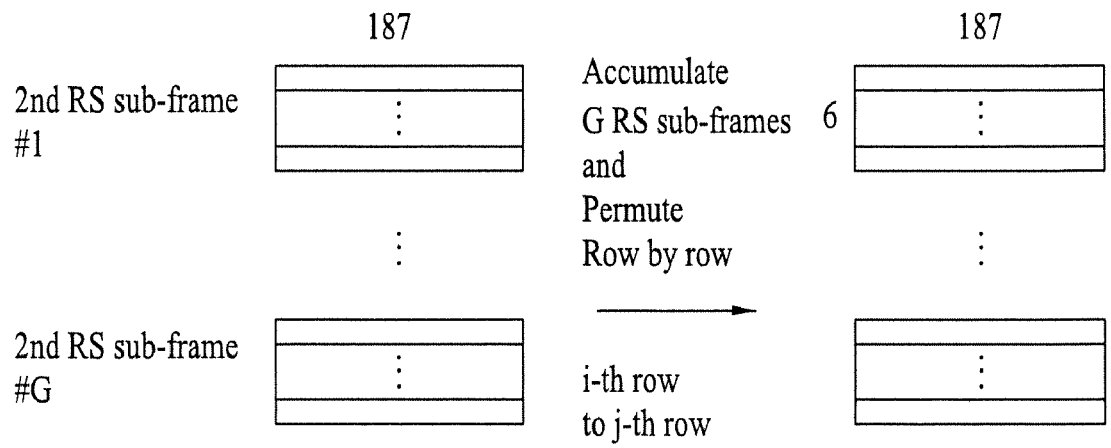

FIG. 17A illustrates a row permutation process performed on the first super frame, and FIG. 17B illustrates a row permutation process performed on the second super frame. Referring to FIG. 17A, when a first super frame including 187 bytes in each row and 85 bytes in each column is configured, G number of first RS sub-frames are grouped to configure a first super frame consisting of 85*G number of 187-byte rows. At this point, the structure of the first super frame shown in FIG. 17A is identical to the structure of the first super frame shown in FIG. 14A. Therefore, since the row permutation process of the first super frame shown in FIG. 17A is also identical to that of the first super frame shown in FIG. 14A, a detailed description of the same will be omitted for simplicity.

Meanwhile, referring to FIG. 17B, the row permutation process of the second RS sub-frame will be described in detail. More specifically, when a second RS sub-frame including 187 bytes in each row and 6 bytes in each column is configured, G number of second RS sub-frames are grouped to configure a second super frame consisting of 6*G number of 187-byte rows. When the row permutation process is performed on the above-described second super frame by using a predetermined method, the position of the rows may differ prior to and after the row permutation process within the second super frame, as shown in FIG. 17B. More specifically, the $i^{th}$ row of the second super frame prior to the row permutation process is positioned in the $j^{th}$ row of the same second super frame after row permutation. Similarly, each row of the second super frame is configured of 187 bytes even after the row permutation process is performed. The above-described relation between i and j can be easily understood with reference to Equation 5 below.

$$j = G(i \bmod 6) + \lfloor i/6 \rfloor$$

$$i = 6(j \bmod G) + \lfloor j/G \rfloor \quad Equation\ 5$$

where $0 \leq i, j < 6G$

More specifically, Equation 5 corresponds to a row permutation method according to another embodiment of the present invention. Any row permutation method in which i and j may include all rows within the super frame may be used. The row permutation method is not limited only to the examples given in the description of the present invention. Also in the other embodiment of the present invention, in using the equation for performing row permutation on the first and second super frames, the same equation may be used on both super frames, or a different equation may be used on each super frame. For example, CRC encoding may be used in the error detection encoding process. Alternatively, any error detection encoding method other than the CRC encoding method may also be used. Furthermore, an error correction encoding method may be used to enhance the overall error correction performance of the receiving system.

When it is assumed that CRC encoding is applied to the first and second RS sub-frames and that the 1-byte (i.e., 8-bit) checksum is used as the CRC data, the RS frame encoder 302 may generate a 1-byte (i.e., 8-bit) CRC checksum for each 187-byte row within the first and second RS sub-frames. Then, the generated 1-byte CRC checksum is added to the respective row. At this point, the 1-byte CRC checksum may be added to any place (or position) within the corresponding row. According to the embodiment of the present invention, the CRC checksum may be added at the end portion of the corresponding row, thereby configuring a 188-byte row.

In another example, when it is assumed that CRC encoding is applied to the first and second RS sub-frames and that a 2-byte (i.e., 16-bit) CRC checksum is used, a 2-byte (i.e., 16-bit) CRC checksum is generated for 2 rows. In this case, the generated 2-byte the 2-byte CRC checksum may be added to any one of the 2 rows. At this point, the 2-byte CRC checksum may be added to any place (or position) within the 2 rows. After adding the 2-byte CRC checksum to the predetermined position within the 2 rows, the processed data may be divided so as to configure 2 188-byte rows. Alternatively, a 2-byte (i.e., 16-bit) CRC checksum is generated for 2 rows. Then, a 1-byte CRC checksum is added to the end of each row, thereby configuring 2 188-byte rows.

The CRC encoding process may be performed before the row permutation process, or the CRC encoding process may be performed after the row permutation process. For example, when the CRC encoding process is performed after the row permutation process, the first super frame having 85*G number of 187-byte rows is extended to a first super frame having 85*G number of 188-byte rows. Also, the second super frame having 6*G number of 187-byte rows is extended to a second super frame having 6*G number of 188-byte rows. The CRC-encoded first and second super frames are, then, each divided back to G number of first and second RS sub-frames. Thereafter, the divided first RS sub-frames and the divided second RS sub-frames are inputted to the block processor 303.

Figure 18:
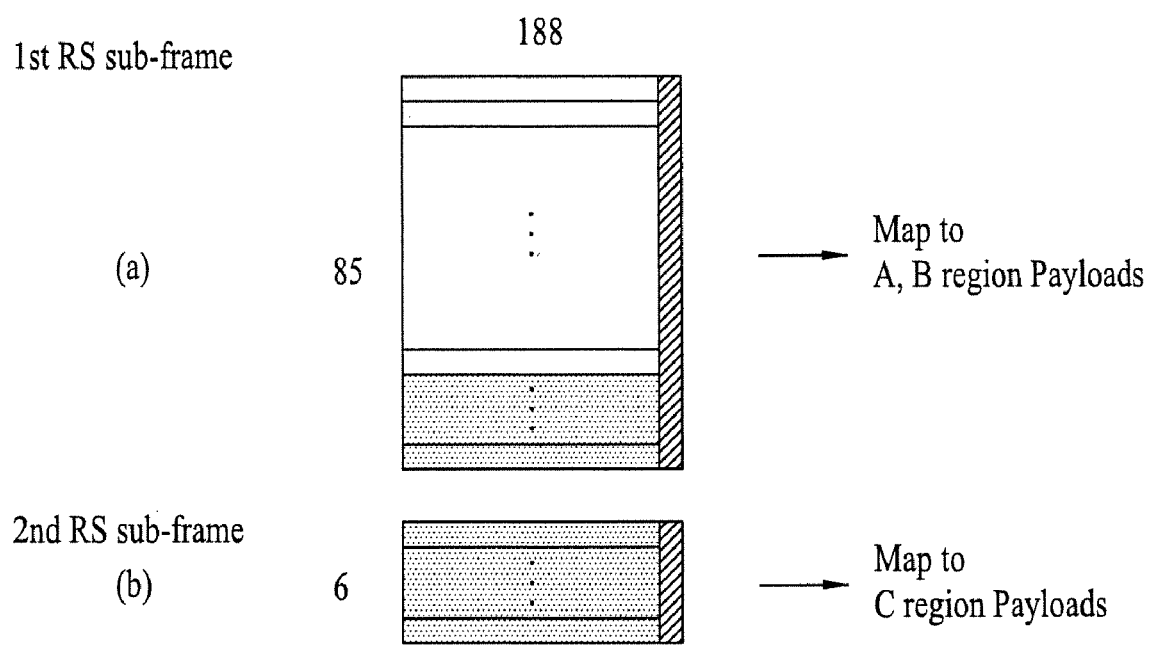
FIG. 18(a) and FIG. 18(b) illustrate another example of dividing the error correction encoded RS frame into a plurality of sub-frames according to the present invention.

FIG. 18(a) illustrates a structure of a first RS sub-frame being sequentially processed with RS-encoding, row permutation, and CRC-encoding and then being inputted to the block processor 303. Herein, the first RS sub-frame consists of 85 188-byte rows. FIG. 18(b) illustrates a structure of a second RS sub-frame being sequentially processed with RS-encoding and row permutation and then being inputted to the block processor 303. Herein, the second RS sub-frame consists of 6 188-byte rows.

The coding rates for the above-described column direction RS encoding process and row direction RS encoding process may be used in any combination that best fits the system structure. Additionally, the corresponding coding rates may be used not only for the RS encoding processes but also for other error correction encoding processes. Furthermore, when performing row permutation in super frame units, the size of the RS sub-frames after the row permutation process is not necessarily required to be identical to the size of the RS sub-frames prior to the row permutation process. Nevertheless, the total number of rows included in the super frame should remain the same. More specifically, if G number of RS sub-frames are included in a super frame prior to row permutation, and if N number of rows are included in a single RS sub-frame, the number of RS sub-frames included in a super frame after row permutation becomes equal to G/2 (wherein G is an even number), and the number of row included in a single RS sub-frame becomes equal to 2N. Since there is no actual change in the total number of rows included in a super frame, the row permutation operation may be performed without difficulty. Therefore, the system designer may randomly decide the size of each RS sub-frame prior to and after row permutation.

As described above, the mobile service data encoded by the RS frame encoder 302 are inputted to the block processor 303. The block processor 303 then encodes the inputted mobile service data at a coding rate of G/H (wherein, G is smaller than H (i.e., G<H)) and then outputted to the group formatter 304. More specifically, the block processor 303 divides the mobile service data being inputted in byte units into bit units. Then, the G number of bits is encoded to H number of bits. Thereafter, the encoded bits are converted back to byte units and then outputted. For example, if 1 bit of the input data is coded to 2 bits and outputted, then G is equal to 1 and H is equal to 2 (i.e., G=1 and H=2). Alternatively, if 1 bit of the input data is coded to 4 bits and outputted, then G is equal to 1 and H is equal to 4 (i.e., G=1 and H=4). Hereinafter, the former coding rate will be referred to as a coding rate of ½ (½-rate coding), and the latter coding rate will be referred to as a coding rate of ¼ (¼-rate coding), for simplicity.

Herein, when using the ¼ coding rate, the coding efficiency is greater than when using the ½ coding rate, and may, therefore, provide greater and enhanced error correction ability. For such reason, when it is assumed that the data encoded at a ¼ coding rate in the group formatter 304, which is located near the end portion of the system, are allocated to an area in which the receiving performance may be deteriorated, and that the data encoded at a ½ coding rate are allocated to an area having excellent receiving performance, the difference in performance may be reduced. At this point, the block processor 303 may also receive signaling information including transmission parameters. Herein, the signaling information may also be processed with either ½-rate coding or ¼-rate coding as in the step of processing mobile service data. Thereafter, the signaling information is also considered the same as the mobile service data and processed accordingly.

Meanwhile, the group formatter inserts mobile service data that are outputted from the block processor 303 in corresponding areas within a data group, which is configured in accordance with a pre-defined rule. Also, with respect to the data deinterleaving process, each place holder or known data (or known data place holders) are also inserted in corresponding areas within the data group. At this point, the data group may be divided into at least one hierarchical area. Herein, the type of mobile service data being inserted in each area may vary depending upon the characteristics of each hierarchical area. Additionally, each area may, for example, be divided based upon the receiving performance within the data group. Furthermore, one data group may be configured to include a set of field synchronization data.

Figure 19A:
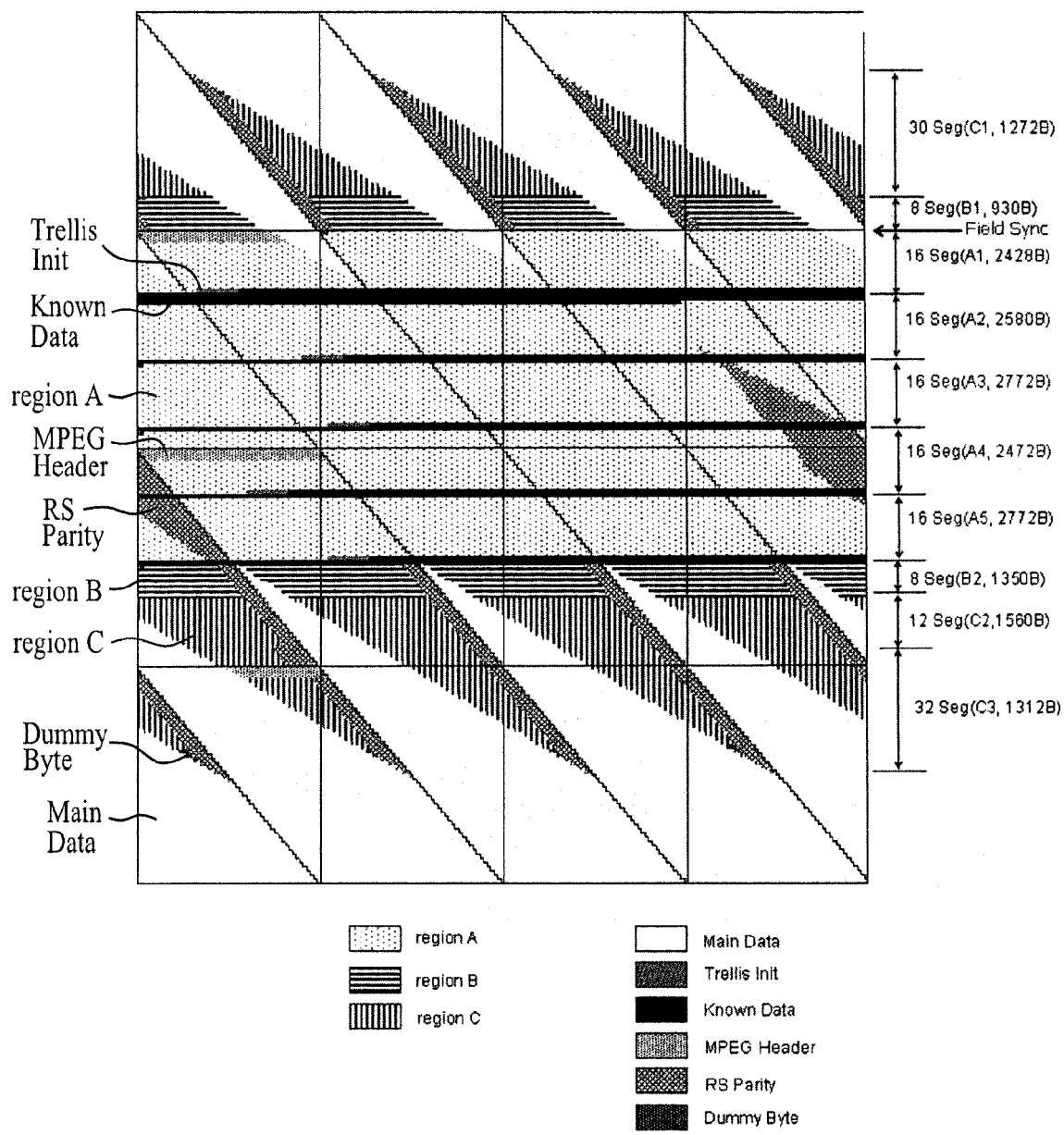
FIG. 19A and FIG. 19B respectively illustrate examples of data structures before and after in a data deinterleaver of a digital broadcast transmitting system according to the present invention.
Figure 19B:
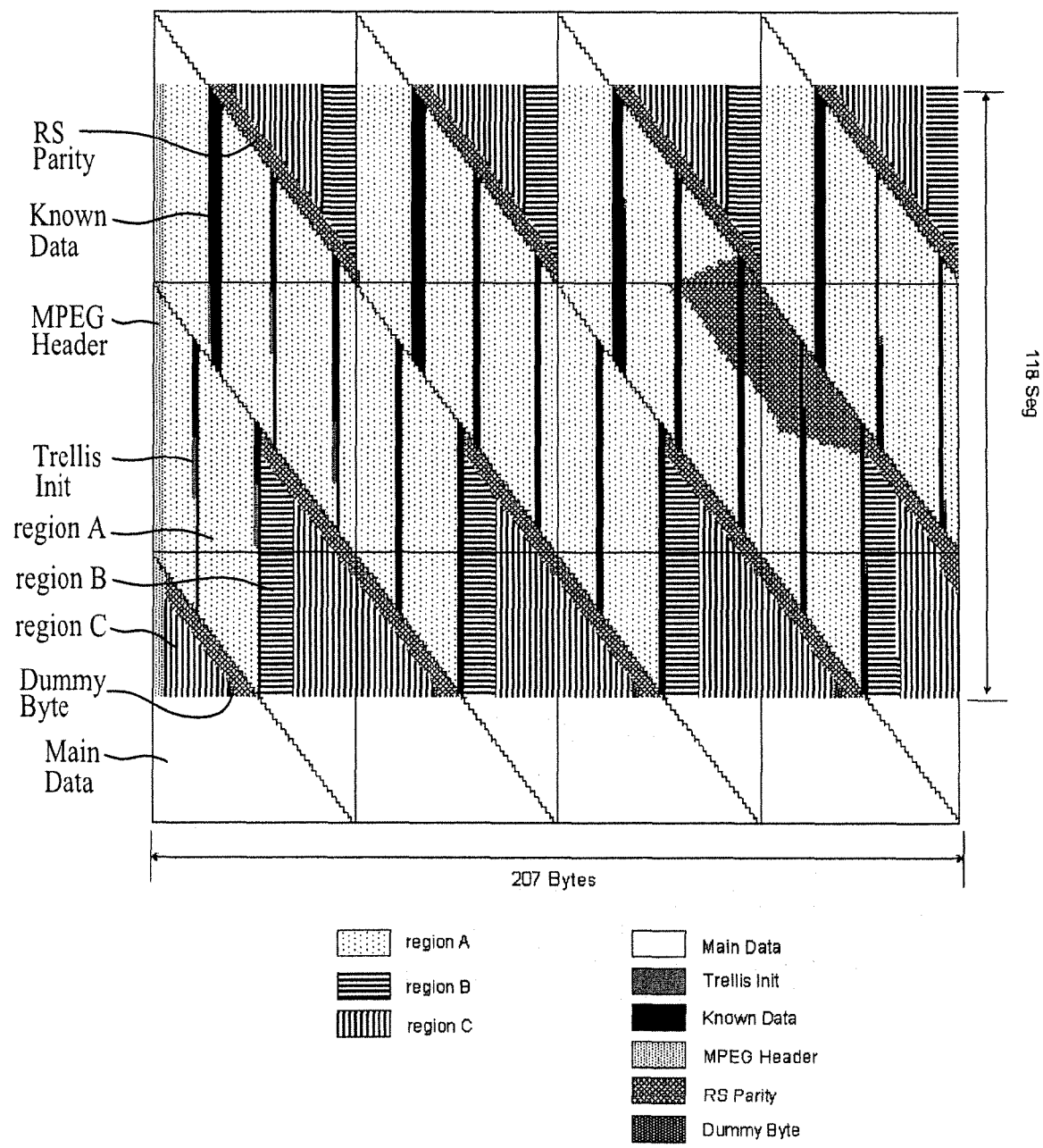

In an example given in the present invention, a data group is divided into A, B, and C regions in a data configuration prior to data deinterleaving. At this point, the group formatter 304 allocates the mobile service data, which are inputted after being RS encoded and block encoded, to each of the corresponding regions by referring to the transmission parameter. FIG. 19A illustrates an alignment of data after being data interleaved and identified, and FIG. 19B illustrates an alignment of data before being data interleaved and identified. More specifically, a data structure identical to that shown in FIG. 19A is transmitted to a receiving system. Also, the data group configured to have the same structure as the data structure shown in FIG. 19A is inputted to the data deinterleaver 305.

As described above, FIG. 19A illustrates a data structure prior to data deinterleaving that is divided into 3 regions, such as region A, region B, and region C. Also, in the present invention, each of the regions A to C is further divided into a plurality of regions. Referring to FIG. 19A, region A is divided into 5 regions (A1 to A5), region B is divided into 2 regions (B1 and B2), and region C is divided into 3 regions (C1 to C3). Herein, regions A to C are identified as regions having similar receiving performances within the data group. Herein, the type of mobile service data, which are inputted, may also vary depending upon the characteristic of each region.

In the example of the present invention, the data structure is divided into regions A to C based upon the level of interference of the main service data. Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, and when consecutively long known data are to be periodically inserted in the mobile service data, the known data having a predetermined length may be periodically inserted in the region having no interference from the main service data (e.g., region A). However, due to interference from the main service data, it is difficult to periodically insert known data and also to insert consecutively long known data to a region having interference from the main service data (e.g., region B and region C).

Hereinafter, examples of allocating data to region A (A1 to A5), region B (B1 and B2), and region C (C1 to C3) will now be described in detail with reference to FIG. 19A. The data group size, the number of hierarchically divided regions within the data group and the size of each region, and the number of mobile service data bytes that can be inserted in each hierarchically divided region of FIG. 19A are merely examples given to facilitate the understanding of the present invention. Herein, the group formatter 304 creates a data group including places in which field synchronization data bytes are to be inserted, so as to create the data group that will hereinafter be described in detail.

More specifically, region A is a region within the data group in which a long known data sequence may be periodically inserted, and in which includes regions wherein the main service data are not mixed (e.g., A2 to A5). Also, region A includes a region (e.g., A1) located between a field synchronization region and the region in which the first known data sequence is to be inserted. The field synchronization region has the length of one segment (i.e., 832 symbols) existing in an ATSC system.

For example, referring to FIG. 19A, 2428 bytes of the mobile service data may be inserted in region A1, 2580 bytes may be inserted in region A2, 2772 bytes may be inserted in region A3, 2472 bytes may be inserted in region A4, and 2772 bytes may be inserted in region A5. Herein, trellis initialization data or known data, MPEG header, and RS parity are not included in the mobile service data. As described above, when region A includes a known data sequence at both ends, the receiving system uses channel information that can obtain known data or field synchronization data, so as to perform equalization, thereby providing enforced equalization performance.

Also, region B includes a region located within 8 segments at the beginning of a field synchronization region within the data group (chronologically placed before region A1) (e.g., region B1), and a region located within 8 segments behind the very last known data sequence which is inserted in the data group (e.g., region B2). For example, 930 bytes of the mobile service data may be inserted in the region B1, and 1350 bytes may be inserted in region B2. Similarly, trellis initialization data or known data, MPEG header, and RS parity are not included in the mobile service data. In case of region B, the receiving system may perform equalization by using channel information obtained from the field synchronization region. Alternatively, the receiving system may also perform equalization by using channel information that may be obtained from the last known data sequence, thereby enabling the system to respond to the channel changes.

Region C includes a region located within 30 segments including and preceding the 9$^{th}$ segment of the field synchronization region (chronologically located before region A) (e.g., region C1), a region located within 12 segments including and following the 9$^{th}$ segment of the very last known data sequence within the data group (chronologically located after region A) (e.g., region C2), and a region located in 32 segments after the region C2 (e.g., region C3). For example, 1272 bytes of the mobile service data may be inserted in the region C1, 1560 bytes may be inserted in region C2, and 1312 bytes may be inserted in region C3. Similarly, trellis initialization data or known data, MPEG header, and RS parity are not included in the mobile service data. Herein, region C (e.g., region C1) is located chronologically earlier than (or before) region A.

Since region C (e.g., region C1) is located further apart from the field synchronization region which corresponds to the closest known data region, the receiving system may use the channel information obtained from the field synchronization data when performing channel equalization. Alternatively, the receiving system may also use the most recent channel information of a previous data group. Furthermore, in region C (e.g., region C2 and region C3) located before region A, the receiving system may use the channel information obtained from the last known data sequence to perform equalization. However, when the channels are subject to fast and frequent changes, the equalization may not be performed perfectly. Therefore, the equalization performance of region C may be deteriorated as compared to that of region B.

When it is assumed that the data group is allocated with a plurality of hierarchically divided regions, as described above, the block processor 303 may encode the mobile service data, which are to be inserted to each region based upon the characteristic of each hierarchical region, at a different coding rate. For example, the block processor 303 may encode the mobile service data, which are to be inserted in regions A1 to A5 of region A, at a coding rate of ½. Then, the group formatter 304 may insert the ½-rate encoded mobile service data to regions A1 to A5.

The block processor 303 may encode the mobile service data, which are to be inserted in regions B1 and B2 of region B, at a coding rate of ¼ having higher error correction ability as compared to the ½-coding rate. Then, the group formatter 304 inserts the ¼-rate coded mobile service data in region B1 and region B2. Furthermore, the block processor 303 may encode the mobile service data, which are to be inserted in regions C1 to C3 of region C, at a coding rate of ¼ or a coding rate having higher error correction ability than the ¼-coding rate. Then, the group formatter 304 may either insert the encoded mobile service data to regions C1 to C3, as described above, or leave the data in a reserved region for future usage.

For example, when the RS frame encoder 302 performs double error correction encoding, error detection encoding, and row permutation of super frame unit as shown in FIG. 13, FIG. 14(a), and FIG. 14(b), and configures the first RS sub_frame and the second RS sub_frame as shown in FIG. 15(a) and FIG. 15(b), the first RS sub_frame via the block processor 303 may assign regions A and B within the data group, the second RS sub_frame via the block processor 303 may assign region c within the data group by the group formatter 304.

In another example, when the RS frame encoder 302 performs double error correction encoding, error detection encoding, and row permutation of super frame unit as shown in FIG. 16, FIG. 17(a), and FIG. 17(b), and configures the first RS sub_frame and the second RS sub_frame as shown in FIG. 18(a) and FIG. 18(b), the first RS sub_frame via the block processor 303 may assign regions A and B within the data group, the second RS sub_frame via the block processor 303 may assign region c within the data group by the group formatter 304.

In addition, the group formatter 304 also inserts supplemental data, such as signaling information that notifies the overall transmission information, other than the mobile service data in the data group. Also, apart from the encoded mobile service data outputted from the block processor 303, the group formatter 304 also inserts MPEG header place holders, non-systematic RS parity place holders, main service data place holders, which are related to data deinterleaving in a later process, as shown in FIG. 19A. Herein, the main service data place holders are inserted because the mobile service data bytes and the main service data bytes are alternately mixed with one another in regions B and C based upon the input of the data deinterleaver, as shown in FIG. 19A. For example, based upon the data outputted after data deinterleaving, the place holder for the MPEG header may be allocated at the very beginning of each packet.

Furthermore, the group formatter 304 either inserts known data generated in accordance with a pre-determined method or inserts known data place holders for inserting the known data in a later process. Additionally, place holders for initializing the trellis encoding module 256 are also inserted in the corresponding regions. For example, the initialization data place holders may be inserted in the beginning of the known data sequence. Herein, the size of the mobile service data that can be inserted in a data group may vary in accordance with the sizes of the trellis initialization place holders or known data (or known data place holders), MPEG header place holders, and RS parity place holders.

The output of the group formatter 304 is inputted to the data deinterleaver 305. And, the data deinterleaver 305 deinterleaves data by performing an inverse process of the data interleaver on the data and place holders within the data group, which are then outputted to the packet formatter 306. More specifically, when the data and place holders within the data group configured, as shown in FIG. 19A, are deinterleaved by the data deinterleaver 305, the data group being outputted to the packet formatter 306 is configured to have the structure shown in FIG. 19B.

The packet formatter 306 removes the main service data place holders and the RS parity place holders that were allocated for the deinterleaving process from the deinterleaved data being inputted. Then, the packet formatter 306 groups the remaining portion and replaces the 4-byte MPEG header place holder with an MPEG header having a null packet PID (or an unused PID from the main service data packet). Also, when the group formatter 304 inserts known data place holders, the packet formatter 306 may insert actual known data in the known data place holders, or may directly output the known data place holders without any modification in order to make replacement insertion in a later process. Thereafter, the packet formatter 306 identifies the data within the packet-formatted data group, as described above, as a 188-byte unit mobile service data packet (i.e., MPEG TS packet), which is then provided to the packet multiplexer 240.

The packet multiplexer 240 multiplexes the mobile service data packet outputted from the pre-processor 230 and the main service data packet outputted from the packet jitter mitigator 220 in accordance with a pre-defined multiplexing method. Then, the packet multiplexer 240 outputs the multiplexed data packets to the data randomizer 251 of the post-processor 250. Herein, the multiplexing method may vary in accordance with various variables of the system design. One of the multiplexing methods of the packet formatter 240 consists of providing a burst section along a time axis, and, then, transmitting a plurality of data groups during a burst-on section within the burst section, and transmitting only the main service data during the burst-off section within the burst section. Herein, the burst section indicates the section starting from the beginning of the current burst until the beginning of the next burst.

At this point, the main service data may be transmitted during the burst-on section. The packet multiplexer 240 refers to the transmission parameter, such as information on the burst size or the burst period, so as to be informed of the number of data groups and the period of the data groups included in a single burst. Herein, the mobile service data and the main service data may co-exist in the burst-on section, and only the main service data may exist in the burst-off section. Therefore, a main data service section transmitting the main service data may exist in both burst-on and burst-off sections. At this point, the main data service section within the burst-on section and the number of main data service packets included in the burst-off section may either be different from one another or be the same.

When the mobile service data are transmitted in a burst structure, in the receiving system receiving only the mobile service data turns the power on only during the burst section, thereby receiving the corresponding data. Alternatively, in the section transmitting only the main service data, the power is turned off so that the main service data are not received in this section. Thus, the power consumption of the receiving system may be reduced.

Detailed Embodiments of the RS Frame Structure and Packet Multiplexing

Hereinafter, detailed embodiments of the pre-processor 230 and the packet multiplexer 240 will now be described. According to an embodiment of the present invention, the N value corresponding to the length of a row, which is included in the RS frame that is configured by the RS frame encoder 302, is set to 538. Accordingly, the RS frame encoder 302 receives 538 transport stream (TS) packets so as to configure a first RS frame having the size of 538*187 bytes. Thereafter, as described above, the first RS frame is processed with a (235,187)-RS encoding process so as to configure a second RS frame having the size of 538*235 bytes. Finally, the second RS frame is processed with generating a 16-bit checksum so as to configure a third RS frame having the sizes of 540*235.

For example, it is assumed that the mobile service data that are to be inserted in regions A1 to A5 of region A are ½-rate encoded, and the mobile service data that are to be inserted in regions B1 and B2 of region B are ¼-rate encoded by the block processor 303. And it is assumed that the mobile service data that are to be inserted in regions A and B are the same kind of mobile service data.

Meanwhile, as shown in FIG. 19A, the sum of the number of bytes of regions A1 to A5 of region A, in which ½-rate encoded mobile service data are to be inserted, among the plurality of regions within the data group is equal to 13024 bytes (=2428+2580+2772+2472+2772 bytes). Herein, the number of byte prior to performing the ½-rate encoding process is equal to 6512 (=13024/2). On the other hand, the sum of the number of bytes of regions B1 and B2 of region B, in which ¼-rate encoded mobile service data are to be inserted, among the plurality of regions within the data group is equal to 2280 bytes (=930+1350 bytes). Herein, the number of byte prior to performing the ¼-rate encoding process is equal to 570 (=2280/4).

In other words, when 7082 bytes of mobile service data are inputted to the block processor 303, 6512 byte are expanded to 13024 bytes by being ½-rate encoded, and 570 bytes are expanded to 2280 bytes by being ¼-rate encoded. Thereafter, the block processor 303 inserts the mobile service data expanded to 13024 bytes in regions A1 to A5 of region A and, also, inserts the mobile service data expanded to 2280 bytes in regions B1 and B2 of region B. Herein, the 7082 bytes of mobile service data being inputted to the block processor 303 may be divided into an output of the RS frame encoder 302 and signaling information. In the present invention, among the 7082 bytes of mobile service data, 7050 bytes correspond to the output of the RS frame encoder 302, and the remaining 32 bytes correspond to the signaling information data. Then, ½-rate encoding or ¼-rate encoding is performed on the corresponding data bytes.

Meanwhile, a RS frame being processed with RS encoding and CRC encoding from the RS frame encoder 302 is configured of 540*235 bytes, in other words, 126900 bytes. The 126900 bytes are divided by 7050-byte units along the time axis, so as to produce 18 7050-byte units. Thereafter, a 32-byte unit of signaling information data is added to the 7050-byte unit mobile service data being outputted from the RS frame encoder 302. Subsequently, the RS frame encoder 302 performs ½-rate encoding or ¼-rate encoding on the corresponding data bytes, which are then outputted to the group formatter 304. Accordingly, the group formatter 304 inserts the ½-rate encoded data in region A and the ¼-rate encoded data in region B.

The process of deciding an N value that is required for configuring the RS frame from the RS frame encoder 302 will now be described in detail. More specifically, the size of the final RS frame (i.e., the third RS frame), which is RS encoded and CRC encoded from the RS frame encoder 302, which corresponds to (N+2)*235 bytes should be allocated to X number of groups, wherein X is an integer. Herein, in a single data group, 7050 data bytes prior to being encoded are allocated. Therefore, if the (N+2)*235 bytes are set to be the exact multiple of 7050(=30*235), the output data of the RS frame encoder 302 may be efficiently allocated to the data group. According to an embodiment of the present invention, the value of N is decided so that (N+2) becomes a multiple of 30. For example, in the present invention, N is equal to 538, and (N+2)(=540) divided by 30 is equal to 18. This indicates that the mobile service data within one RS frame are processed with either ½-rate encoding or ¼-rate encoding. The encoded mobile service data are then allocated to 18 data groups.

Figure 20:
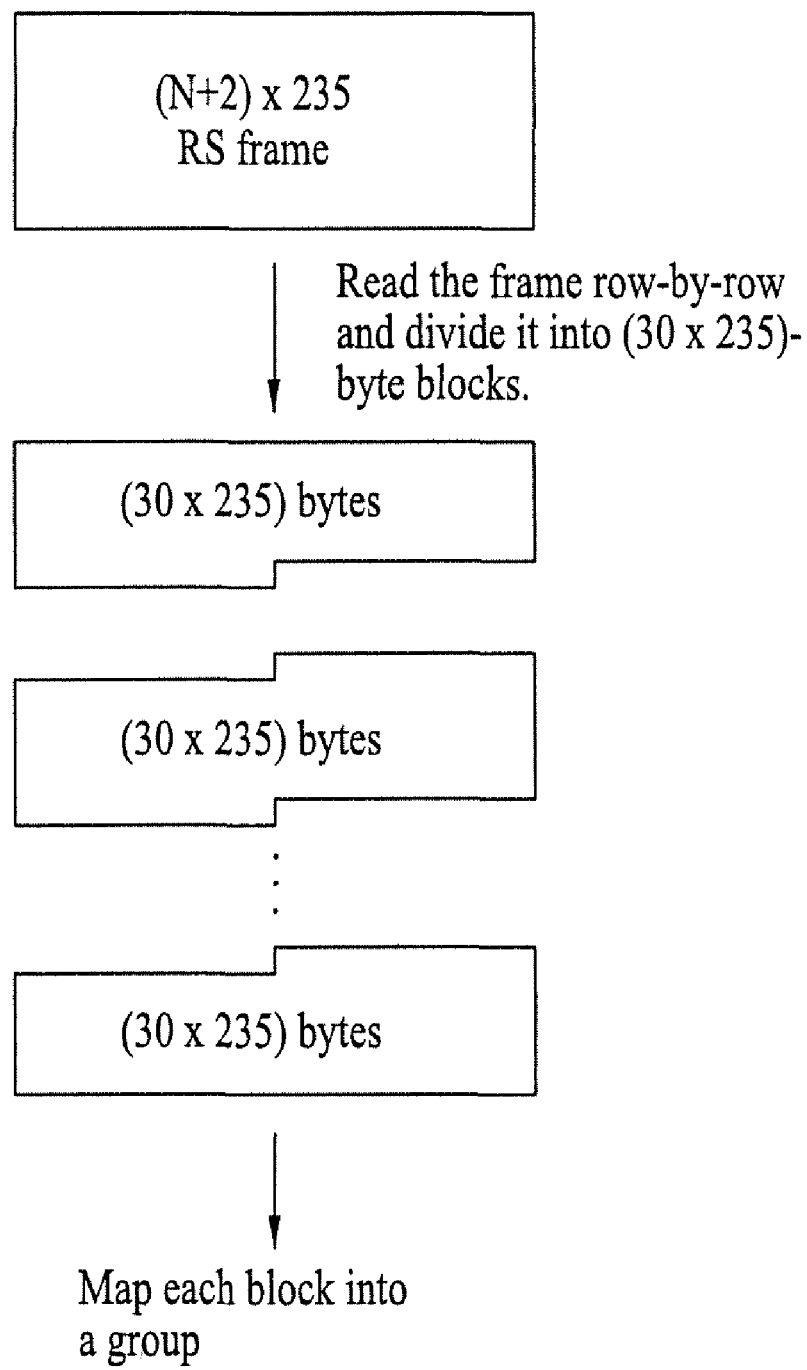
FIG. 20 illustrates an exemplary process of dividing an RS frame for configuring a data group according to the present invention.

FIG. 20 illustrates a process of dividing the RS frame according to the present invention. More specifically, the RS frame having the size of (N+2)*235 is divided into 30*235 byte blocks. Then, the divided blocks are mapped to a single group. In other words, the data of a block having the size of 30*235 bytes are processed with one of a ½-rate encoding process and a ¼-rate encoding process and are, then, inserted in a data group.

In another example, it is assumed that the mobile service data that are to be inserted in region C are ½-rate encoded by the block processor 303, and that the mobile service data that are to be inserted in region C correspond to a different type of mobile service data that are inserted in regions A and B. In this case, as shown in FIG. 19A, the total number of ½-rate encoded mobile service data bytes that are to be included in regions C1 to C3 of region C is equal to 4144 bytes (i.e., 4144=1272+1560+1312). In this case, the total number of mobile service data bytes prior to being ½-rate encoded is equal to 2072 bytes (i.e., 2072=4144/2). At this point, when it is assumed that 18 data groups are grouped to form a RS frame, and that the mobile service data of the RS frame are inserted into the region C, the RS frame is configured of 37296 bytes. Herein, the number of RS parity bytes P is set to be equal to 36 (i.e., P=36), and 2 CRC checksums are set to be included for each row.

Accordingly, a total of 165 188-byte mobile service data packets may be transmitted for each RS frame. In this case, 55 bytes may remain for each RS frame of the region C within the data group. Remaining data bytes may occur, when dividing each RS frame into a plurality of data groups having the same size. More specifically, remaining data bytes may occur in particular regions in each RS frame depending upon the size of the RS frames, the size and number of divided data groups, the number of mobile service data bytes that may be inserted into each data group, the coding rate of the corresponding region, the number of RS parity bytes, whether or not a CRC checksum has been allocated, and, if any, the number of CRC checksums allocated.

Figure 21:
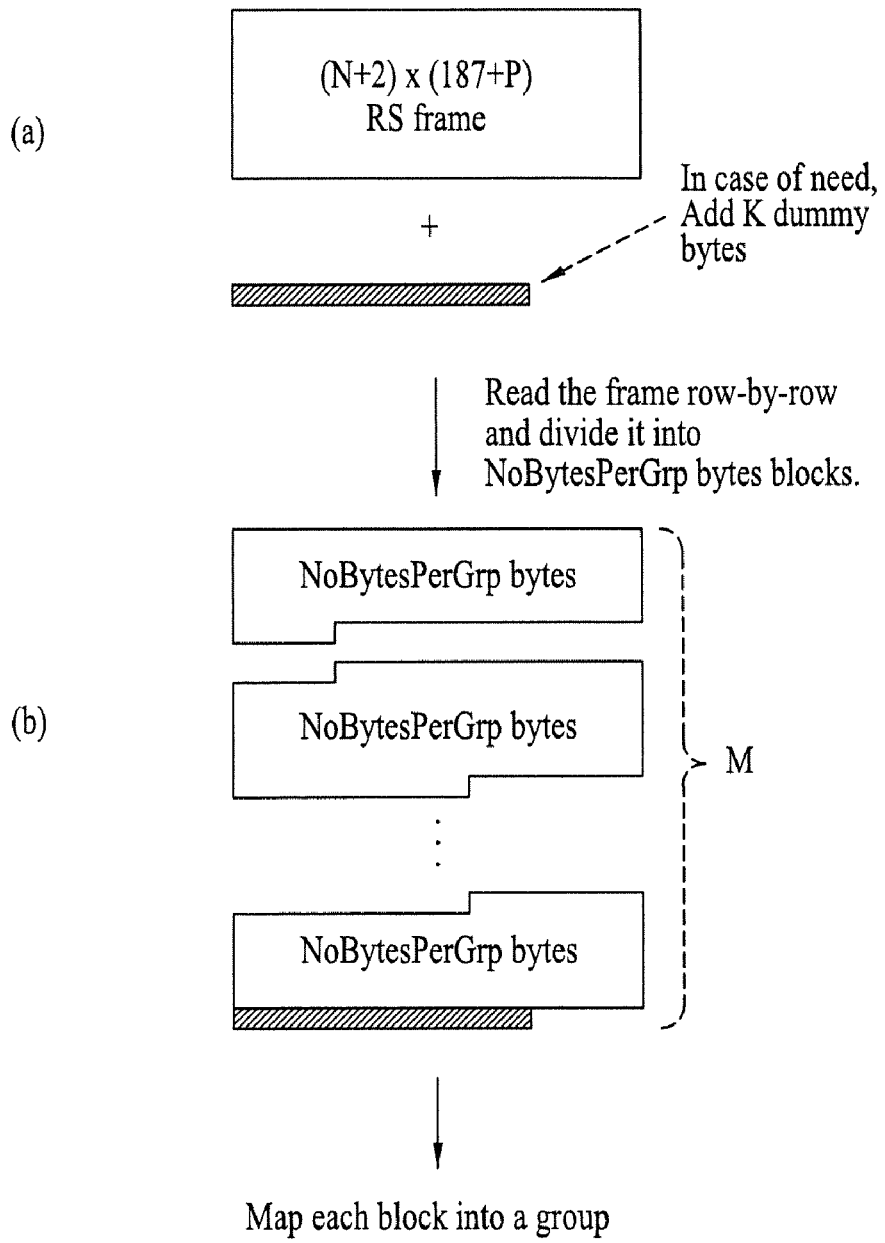
FIG. 21(a) and FIG. 21(b) illustrate an exemplary process of dividing an RS frame for configuring a data group according to the present invention.

When dividing the RS frame into a plurality of data groups having the same size, and when remaining data bytes occur in the corresponding RS frame, K number of dummy bytes are added to the corresponding RS frame, wherein K is equal to the number of remaining data bytes within the RS frame. Then, the dummy byte-added RS frame is divided into a plurality of data groups. This process is illustrated in FIG. 21. More specifically, FIG. 21 illustrates an example of processing K number of remaining data bytes, which are produced by dividing the RS frame having the size of (N+2)*(187+P) bytes into M number of data groups having equal sizes. In this case, as shown in FIG. 21(a), K number of dummy bytes are added to the RS frame having the size of (N+2)*(187+P) bytes. Subsequently, the RS frame is read in row units, thereby being divided into M number of data groups, as shown in FIG. 21(b). At this point, each data group has the size of NoBytesPerGrp bytes. This may be described by Equation 6 shown below.

$$M \times NoBytesPerGrp = (N+2) \times (187+P) \times K \quad \text{Equation 6}$$

Herein, NoBytesPerGrp indicates the number of bytes allocated for each group (i.e., the Number of Bytes Per Group). More specifically, the size corresponding to the number of byte in one RS frame+K bytes is equal to the size of the M number of data groups.

When the mobile service data are transmitted by using the above-described method and transmission mode, the data randomizer 301 of the pre-processor 230 may receive the mobile service data packets through a first mobile service data path and a second mobile service data path, to which data that are to be allocated to regions A and B are inputted. More specifically, 538 data packets are inputted to the first mobile service data path, and 165 data packets are inputted to the second mobile service data path. In order to do so, a plurality of data randomizers and RS frame encoders may be provided. Accordingly, the 538 data packets being inputted to the first mobile service data path and the 165 data packets being inputted to the second mobile service data path are randomized by each respective data randomizer. Then, each RS frame encoder performs RS frame unit encoding and super frame unit row permutation processes on the inputted data packets. Thereafter, the processed data packets are divided back to RS frame units, thereby being inputted to the block processor 303.

For example, the RS frame encoder encoding the data being inputted through the first mobile service data path adds 48 parity bytes in a column direction to the corresponding RS frame. This RS frame encoder also adds a 2-byte CRC checksum in a row direction to the corresponding RS frame. The RS frame encoder encoding the data being inputted through the second mobile service data path adds 36 parity bytes in a column direction to the corresponding RS frame. This RS frame encoder also adds a 2-byte CRC checksum in a row direction to the corresponding RS frame.

The block processor 303 performs ½-rate encoding on the data that are to be allocated to regions A and C. And, the block processor 303 performs ¼-rate encoding on the data that are to be allocated to region B. The block processor 303 then outputs the encoded data to the group formatter 304.

At this point, since 55 bytes remain in region C included in the data group for each RS frame, as described above, the block processor 303 adds 55 bytes of dummy bytes to region C, once all data that are to be allocated to region C are inputted. Thereafter, the block processor 303 ½-rate encodes the processed data. Herein, the dummy bytes may be added by the block processor 303, as described above, or may be added by an external block (not shown).

The group formatter 304 inserts (or allocates) the ½-rate or ¼-rate encoded and inputted mobile service data and known data (e.g., MPEG header place holders, non-systematic RS parity place holders, initialization data place holders, etc.) to the respective regions within the data group shown in FIG. 19A. For example, the mobile service data that are inputted through the first mobile service data path and then ½-rate or ¼-rate encoded are inserted in regions A and B. And, the mobile service data that are inputted through the second mobile service data path and then ½-rate encoded are inserted in region C.

Figure 22:
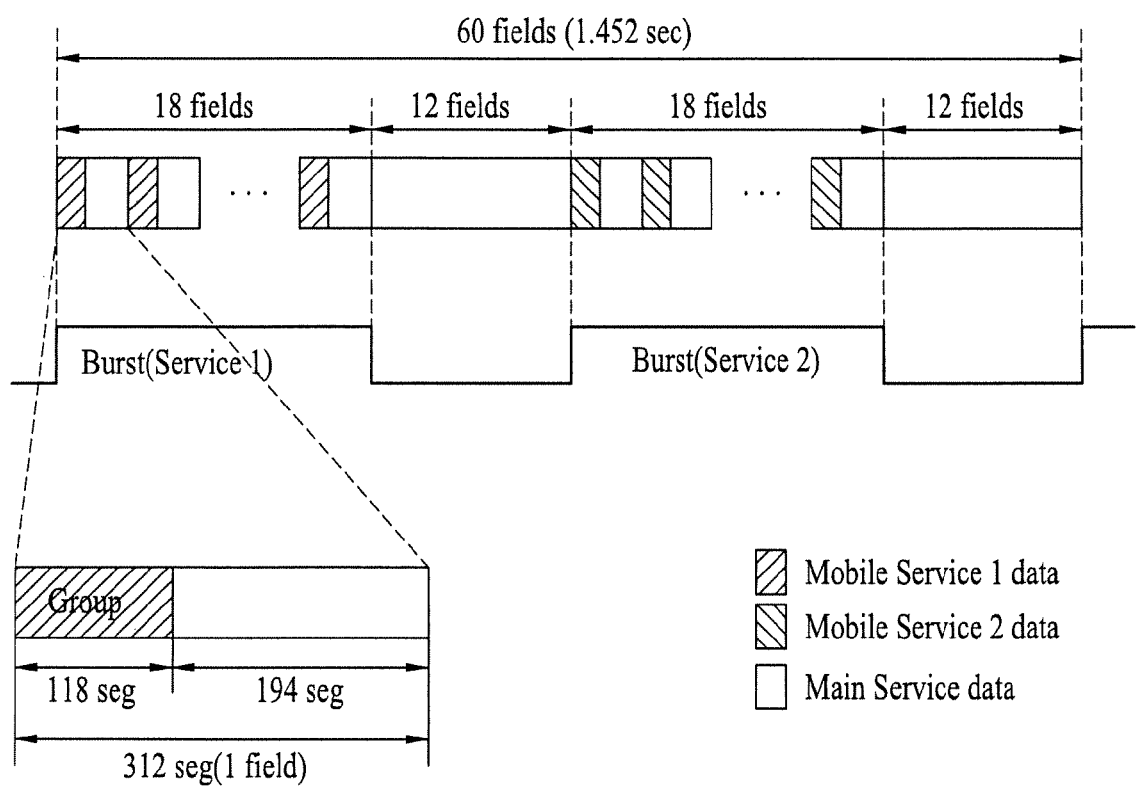
FIG. 22 illustrates exemplary operations of a packet multiplexer for transmitting data groups according to an embodiment of the present invention.

FIG. 22 illustrates detailed exemplary operations of the packet multiplexer 240 according to an embodiment of the present invention. More specifically, the packet multiplexer 240 multiplexes data fields including a data group and data fields only including main service data and outputs the randomized data to the data randomizer 251. According to the present invention, the data fields including a data group are transmitted to a burst-on section. And, the data fields including only the main service data are transmitted to a burst-off section. At this point, the burst-on section may also transmit the main service data.

FIG. 22 illustrates exemplary operations of a packet multiplexer for transmitting the data group according to the present invention. More specifically, the packet multiplexer 240 multiplexes a field including a data group, in which the mobile service data and main service data are mixed with one another, and a field including only the main service data. Thereafter, the packet multiplexer 240 outputs the multiplexed fields to the data randomizer 251. At this point, in order to transmit the RS frame having the size of 540*235 bytes, 18 data groups should be transmitted. Herein, each data group includes field synchronization data, as shown in FIG. 19A. Therefore, the 18 data groups are transmitted during 18 field sections, and the section during which the 18 data groups are being transmitted corresponds to the burst-on section.

In each field within the burst-on section, a data group including field synchronization data is multiplexed with main service data, which are then outputted. For example, in the embodiment of the present invention, in each field within the burst-on section, a data group having the size of 118 segments is multiplexed with a set of main service data having the size of 194 segments. Referring to FIG. 22, during the burst-on section (i.e., during the 18 field sections), a field including 18 data groups is transmitted. Then, during the burst-off section that follows (i.e., during the 12 field sections), a field consisting only of the main service data is transmitted. Subsequently, during a subsequent burst-on section, 18 fields including 18 data groups are transmitted. And, during the following burst-off section, 12 fields consisting only of the main service data are transmitted.

Furthermore, in the present invention, the same type of data service may be provided in the first burst-on section including the first 18 data groups and in the second burst-on section including the next 18 data groups. Alternatively, different types of data service may be provided in each burst-on section. For example, when it is assumed that different data service types are provided to each of the first burst-on section and the second burst-on section, and that the receiving system wishes to receive only one type of data service, the receiving system turns the power on only during the corresponding burst-on section including the desired data service type so as to receive the corresponding 18 data fields. Then, the receiving system turns the power off during the remaining 42 field sections so as to prevent other data service types from being received. Thus, the amount of power consumption of the receiving system may be reduced. In addition, the receiving system according to the present invention is advantageous in that one RS frame may be configured from the 18 data groups that are received during a single burst-on section.

According to the present invention, the number of data groups included in a burst-on section may vary based upon the size of the RS frame, and the size of the RS frame varies in accordance with the value N. More specifically, by adjusting the value N, the number of data groups within the burst section may be adjusted. Herein, in an example of the present invention, the (235,187)-RS encoding process adjusts the value N during a fixed state. Furthermore, the size of the mobile service data that can be inserted in the data group may vary based upon the sizes of the trellis initialization data or known data, the MPEG header, and the RS parity, which are inserted in the corresponding data group.

Meanwhile, since a data group including mobile service data in-between the data bytes of the main service data during the packet multiplexing process, the shifting of the chronological position (or place) of the main service data packet becomes relative. Also, a system object decoder (i.e., MPEG decoder) for processing the main service data of the receiving system, receives and decodes only the main service data and recognizes the mobile service data packet as a null data packet. Therefore, when the system object decoder of the receiving system receives a main service data packet that is multiplexed with the data group, a packet jitter occurs.

At this point, since a multiple-level buffer for the video data exists in the system object decoder and the size of the buffer is relatively large, the packet jitter generated from the packet multiplexer 240 does not cause any serious problem in case of the video data. However, since the size of the buffer for the audio data is relatively small, the packet jitter may cause considerable problem. More specifically, due to the packet jitter, an overflow or underflow may occur in the buffer for the main service data of the receiving system (e.g., the buffer for the audio data). Therefore, the packet jitter mitigator 220 re-adjusts the relative position of the main service data packet so that the overflow or underflow does not occur in the system object decoder.

In the present invention, examples of repositioning places for the audio data packets within the main service data in order to minimize the influence on the operations of the audio buffer will be described in detail. The packet jitter mitigator 220 repositions the audio data packets in the main service data section so that the audio data packets of the main service data can be as equally and uniformly aligned and positioned as possible. The standard for repositioning the audio data packets in the main service data performed by the packet jitter mitigator 220 will now be described. Herein, it is assumed that the packet jitter mitigator 220 knows the same multiplexing information as that of the packet multiplexer 240, which is placed further behind the packet jitter mitigator 220.

Firstly, if one audio data packet exists in the main service data section (e.g., the main service data section positioned between two data groups) within the burst-on section, the audio data packet is positioned at the very beginning of the main service data section. Alternatively, if two audio data packets exist in the corresponding data section, one audio data packet is positioned at the very beginning and the other audio data packet is positioned at the very end of the main service data section. Further, if more than three audio data packets exist, one audio data packet is positioned at the very beginning of the main service data section, another is positioned at the very end of the main service data section, and the remaining audio data packets are equally positioned between the first and last audio data packets. Secondly, during the main service data section placed immediately before the beginning of a burst-on section (i.e., during a burst-off section), the audio data packet is placed at the very end of the corresponding section.

Thirdly, during a main service data section within the burst-off section after the burst-on section, the audio data packet is positioned at the very end of the main service data section. Finally, the data packets other than audio data packets are positioned in accordance with the inputted order in vacant spaces (i.e., spaces that are not designated for the audio data packets). Meanwhile, when the positions of the main service data packets are relatively re-adjusted, associated program clock reference (PCR) values may also be modified accordingly. The PCR value corresponds to a time reference value for synchronizing the time of the MPEG decoder. Herein, the PCR value is inserted in a specific region of a TS packet and then transmitted.

In the example of the present invention, the packet jitter mitigator 220 also performs the operation of modifying the PCR value. The output of the packet jitter mitigator 220 is inputted to the packet multiplexer 240. As described above, the packet multiplexer 240 multiplexes the main service data packet outputted from the packet jitter mitigator 220 with the mobile service data packet outputted from the pre-processor 230 into a burst structure in accordance with a pre-determined multiplexing rule. Then, the packet multiplexer 240 outputs the multiplexed data packets to the data randomizer 251 of the post-processor 250.

If the inputted data correspond to the main service data packet, the data randomizer 251 performs the same randomizing process as that of the conventional randomizer. More specifically, the synchronization byte within the main service data packet is deleted. Then, the remaining 187 data bytes are randomized by using a pseudo random byte generated from the data randomizer 251. Thereafter, the randomized data are outputted to the RS encoder/non-systematic RS encoder 252.

On the other hand, if the inputted data correspond to the mobile service data packet, the data randomizer 251 may randomize only a portion of the data packet. For example, if it is assumed that a randomizing process has already been performed in advance on the mobile service data packet by the pre-processor 230, the data randomizer 251 deletes the synchronization byte from the 4-byte MPEG header included in the mobile service data packet and, then, performs the randomizing process only on the remaining 3 data bytes of the MPEG header. Thereafter, the randomized data bytes are outputted to the RS encoder/non-systematic RS encoder 252. More specifically, the randomizing process is not performed on the remaining portion of the mobile service data excluding the MPEG header. In other words, the remaining portion of the mobile service data packet is directly outputted to the RS encoder/non-systematic RS encoder 252 without being randomized. Also, the data randomizer 251 may or may not perform a randomizing process on the known data (or known data place holders) and the initialization data place holders included in the mobile service data packet.

The RS encoder/non-systematic RS encoder 252 performs an RS encoding process on the data being randomized by the data randomizer 251 or on the data bypassing the data randomizer 251, so as to add 20 bytes of RS parity data. Thereafter, the processed data are outputted to the data interleaver 253. Herein, if the inputted data correspond to the main service data packet, the RS encoder/non-systematic RS encoder 252 performs the same systematic RS encoding process as that of the conventional broadcasting system, thereby adding the 20-byte RS parity data at the end of the 187-byte data. Alternatively, if the inputted data correspond to the mobile service data packet, the RS encoder/non-systematic RS encoder 252 performs a non-systematic RS encoding process. At this point, the 20-byte RS parity data obtained from the non-systematic RS encoding process are inserted in a pre-decided parity byte place within the mobile service data packet.

The data interleaver 253 corresponds to a byte unit convolutional interleaver. The output of the data interleaver 253 is inputted to the parity replacer 254 and to the non-systematic RS encoder 255. Meanwhile, a process of initializing a memory within the trellis encoding module 256 is primarily required in order to decide the output data of the trellis encoding module 256, which is located after the parity replacer 254, as the known data pre-defined according to an agreement between the receiving system and the transmitting system. More specifically, the memory of the trellis encoding module 256 should first be initialized before the received known data sequence is trellis-encoded. At this point, the beginning portion of the known data sequence that is received corresponds to the initialization data place holder and not to the actual known data. Herein, the initialization data place holder has been included in the data by the group formatter within the pre-processor 230 in an earlier process. Therefore, the process of generating initialization data and replacing the initialization data place holder of the corresponding memory with the generated initialization data are required to be performed immediately before the inputted known data sequence is trellis-encoded.

Additionally, a value of the trellis memory initialization data is decided and generated based upon a memory status of the trellis encoding module 256. Further, due to the newly replaced initialization data, a process of newly calculating the RS parity and replacing the RS parity, which is outputted from the data interleaver 253, with the newly calculated RS parity is required. Therefore, the non-systematic RS encoder 255 receives the mobile service data packet including the initialization data place holders, which are to be replaced with the actual initialization data, from the data interleaver 253 and also receives the initialization data from the trellis encoding module 256.

Among the inputted mobile service data packet, the initialization data place holders are replaced with the initialization data, and the RS parity data that are added to the mobile service data packet are removed and processed with non-systematic RS encoding. Thereafter, the new RS parity obtained by performing the non-systematic RS encoding process is outputted to the parity replacer 255. Accordingly, the parity replacer 255 selects the output of the data interleaver 253 as the data within the mobile service data packet, and the parity replacer 255 selects the output of the non-systematic RS encoder 255 as the RS parity. The selected data are then outputted to the trellis encoding module 256.

Meanwhile, if the main service data packet is inputted or if the mobile service data packet, which does not include any initialization data place holders that are to be replaced, is inputted, the parity replacer 254 selects the data and RS parity that are outputted from the data interleaver 253. Then, the parity replacer 254 directly outputs the selected data to the trellis encoding module 256 without any modification. The trellis encoding module 256 converts the byte-unit data to symbol units and performs a 12-way interleaving process so as to trellis-encode the received data. Thereafter, the processed data are outputted to the synchronization multiplexer 260.

The synchronization multiplexer 260 inserts a field synchronization signal and a segment synchronization signal to the data outputted from the trellis encoding module 256 and, then, outputs the processed data to the pilot inserter 271 of the transmission unit 270. Herein, the data having a pilot inserted therein by the pilot inserter 271 are modulated by the modulator 272 in accordance with a pre-determined modulating method (e.g., a VSB method). Thereafter, the modulated data are transmitted to each receiving system though the radio frequency (RF) up-converter 273.

Block Processor

Figure 23:
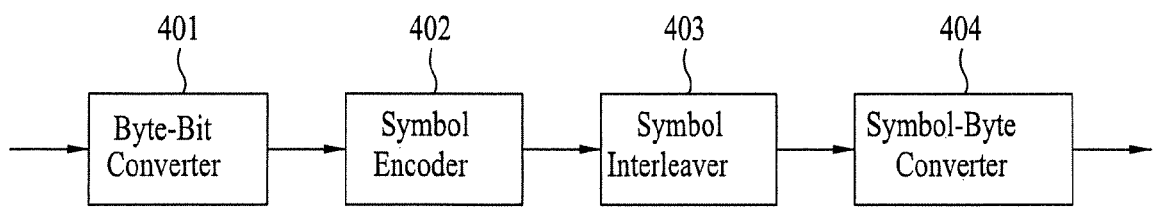
FIG. 23 illustrates a block diagram showing a structure of a block processor according to an embodiment of the present invention.

FIG. 23 illustrates a block diagram showing a structure of a block processor according to the present invention. Herein, the block processor includes a byte-bit converter 401, a symbol encoder 402, a symbol interleaver 403, and a symbol-byte converter 404. The byte-bit converter 401 divides the mobile service data bytes that are inputted from the RS frame encoder 112 into bits, which are then outputted to the symbol encoder 402. The byte-bit converter 401 may also receive signaling information including transmission parameters. The signaling information data bytes are also divided into bits so as to be outputted to the symbol encoder 402. Herein, the signaling information including transmission parameters may be processed with the same data processing step as that of the mobile service data. More specifically, the signaling information may be inputted to the block processor 303 by passing through the data randomizer 301 and the RS frame encoder 302. Alternatively, the signaling information may also be directly outputted to the block processor 303 without passing though the data randomizer 301 and the RS frame encoder 302.

The symbol encoder 402 corresponds to a G/H-rate encoder encoding the inputted data from G bits to H bits and outputting the data encoded at the coding rate of G/H. According to the embodiment of the present invention, it is assumed that the symbol encoder 402 performs either a coding rate of ½ (also referred to as a ½-rate encoding process) or an encoding process at a coding rate of ¼ (also referred to as a ¼-rate encoding process). The symbol encoder 402 performs one of ½-rate encoding and ¼-rate encoding on the inputted mobile service data and signaling information. Thereafter, the signaling information is also recognized as the mobile service data and processed accordingly.

In case of performing the ½-rate coding process, the symbol encoder 402 receives 1 bit and encodes the received 1 bit to 2 bits (i.e., 1 symbol). Then, the symbol encoder 402 outputs the processed 2 bits (or 1 symbol). On the other hand, in case of performing the ¼-rate encoding process, the symbol encoder 402 receives 1 bit and encodes the received 1 bit to 4 bits (i.e., 2 symbols). Then, the symbol encoder 402 outputs the processed 4 bits (or 2 symbols).

Figure 24:
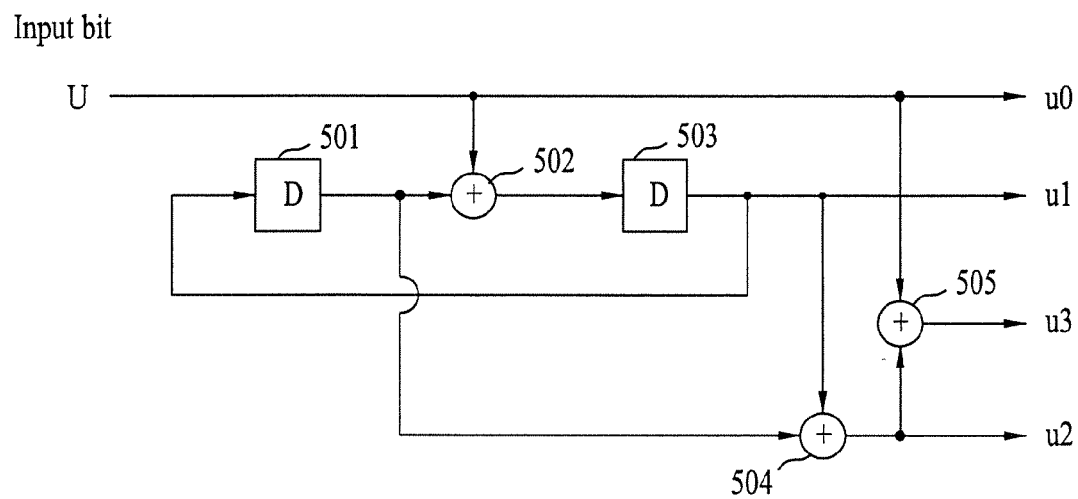
FIG. 24 illustrates a detailed block diagram of a symbol encoder shown in FIG. 23 of the present invention.

FIG. 24 illustrates a detailed block diagram of the symbol encoder 402 shown in FIG. 23. The symbol encoder 402 includes two delay units 501 and 503 and three adders 502, 504, and 505. Herein, the symbol encoder 402 encodes an input data bit U and outputs the coded bit U to 4 bits (u0 to u4). At this point, the data bit U is directly outputted as uppermost bit u0 and simultaneously encoded as lower bit u1u2u3 and then outputted. More specifically, the input data bit U is directly outputted as the uppermost bit u0 and simultaneously outputted to the first and third adders 502 and 505. The first adder 502 adds the input data bit U and the output bit of the first delay unit 501 and, then, outputs the added bit to the second delay unit 503. Then, the data bit delayed by a pre-determined time (e.g., by 1 clock) in the second delay unit 503 is outputted as lower bit u1 and simultaneously fed-back to the first delay unit 501. The first delay unit 501 delays the data bit fed-back from the second delay unit 503 by a pre-determined time (e.g., by 1 clock). Then, the first delay unit 501 outputs the delayed data bit to the first adder 502 and the second adder 504. The second adder 504 adds the data bits outputted from the first and second delay units 501 and 503 as a lower bit u2. The third adder 505 adds the input data bit U and the output of the second delay unit 503 and outputs the added data bit as a lower bit u3.

At this point, if the input data bit U corresponds to data encoded at a ½-coding rate, the symbol encoder 402 configures a symbol with u1u0 bits from the 4 output bits u0u1u2u3. Then, the symbol encoder 402 outputs the newly configured symbol. Alternatively, if the input data bit U corresponds to data encoded at a ¼-coding rate, the symbol encoder 402 configures and outputs a symbol with bits u1u0 and, then, configures and outputs another symbol with bits u2u3. According to another embodiment of the present invention, if the input data bit U corresponds to data encoded at a ¼-coding rate, the symbol encoder 402 may also configure and output a symbol with bits u1u0, and then repeat the process once again and output the corresponding bits. According to yet another embodiment of the present invention, the symbol encoder outputs all four output bits U u0u1u2u3. Then, when using the ½-coding rate, the symbol interleaver 403 located behind the symbol encoder 402 selects only the symbol configured of bits u1u0 from the four output bits u0u1u2u3. Alternatively, when using the ¼-coding rate, the symbol interleaver 403 may select the symbol configured of bits u1u0 and then select another symbol configured of bits u2u3. According to another embodiment, when using the ¼-coding rate, the symbol interleaver 403 may repeatedly select the symbol configured of bits u1u0.

The output of the symbol encoder 402 is inputted to the symbol interleaver 403. Then, the symbol interleaver 403 performs block interleaving in symbol units on the data outputted from the symbol encoder 402. Any interleaver performing structural rearrangement (or realignment) may be applied as the symbol interleaver 403 of the block processor. However, in the present invention, a variable length symbol interleaver that can be applied even when a plurality of lengths is provided for the symbol, so that its order may be rearranged, may also be used.

Figure 25:
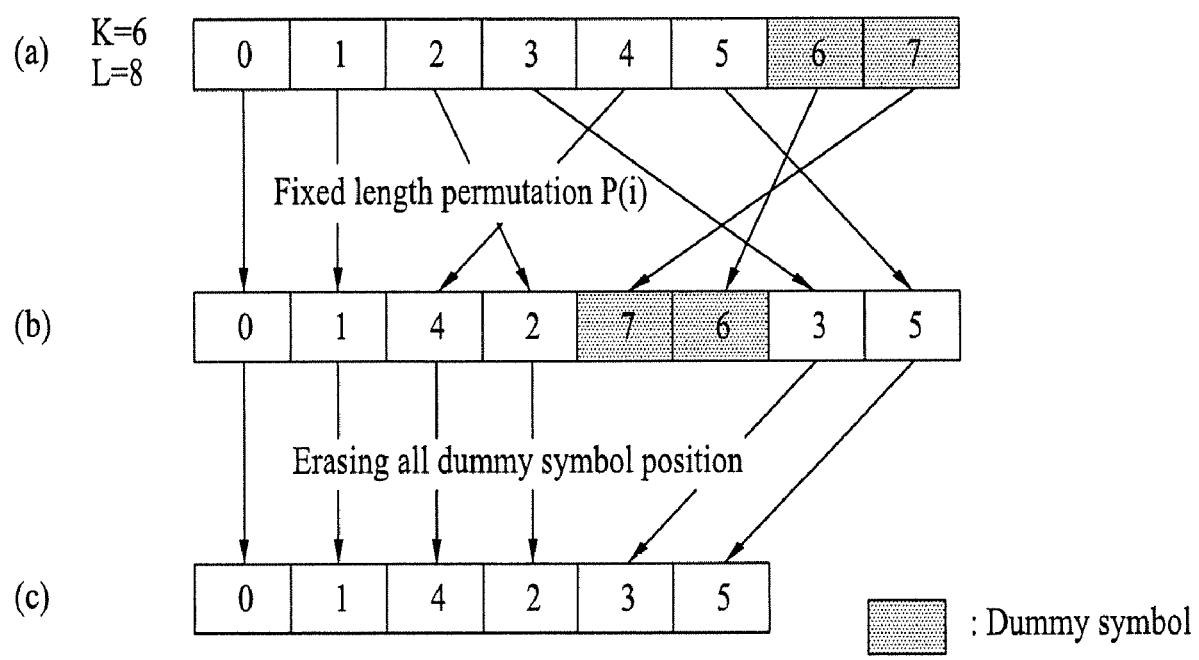
FIG. 25(a) to FIG. 25(c) illustrates a variable length interleaving process of a symbol interleaver shown in FIG. 23.

FIG. 25 illustrates a symbol interleaver according to an embodiment of the present invention. Herein, the symbol interleaver according to the embodiment of the present invention corresponds to a variable length symbol interleaver that may be applied even when a plurality of lengths is provided for the symbol, so that its order may be rearranged. Particularly, FIG. 25 illustrates an example of the symbol interleaver when K=6 and L=8. Herein, K indicates a number of symbols that are outputted for symbol interleaving from the symbol encoder 402. And, L represents a number of symbols that are actually interleaved by the symbol interleaver 403.

In the present invention, the symbol interleaver 403 should satisfy the conditions of $L=2^n$ (wherein n is an integer) and of $L \geq K$. If there is a difference in value between K and L, (L−K) number of null (or dummy) symbols is added, thereby creating an interleaving pattern. Therefore, K becomes a block size of the actual symbols that are inputted to the symbol interleaver 403 in order to be interleaved. L becomes an interleaving unit when the interleaving process is performed by an interleaving pattern created from the symbol interleaver 403. The example of what is described above is illustrated in FIG. 25.

More specifically, FIG. 25(*a*) to FIG. 25(*c*) illustrate a variable length interleaving process of a symbol interleaver shown in FIG. 23. The number of symbols outputted from the symbol encoder 402 in order to be interleaved is equal to 6 (i.e., K=6). In other words, 6 symbols are outputted from the symbol encoder 402 in order to be interleaved. And, the actual interleaving unit (L) is equal to 8 symbols. Therefore, as shown in FIG. 25(*a*), 2 symbols are added to the null (or dummy) symbol, thereby creating the interleaving pattern. Equation 7 shown below described the process of sequentially receiving K number of symbols, the order of which is to be rearranged, and obtaining an L value satisfying the conditions of $L=2^i$ (wherein n is an integer) and of $L \geq K$, thereby creating the interleaving so as to realign (or rearrange) the symbol order.

In relation to all places, wherein $0 \leq i \leq L-1$, $$P(i) = \{S \times i \times (i+1)/2\} \bmod L \qquad \text{Equation 7}$$

Herein, $L \geq K$, $L=2^n$, and n and S are integers. Referring to FIG. 25, it is assumed that S is equal to 89, and that L is equal to 8, and FIG. 25 illustrates the created interleaving pattern and an example of the interleaving process. As shown in FIG. 25(*b*), the order of K number of input symbols and (L−K) number of null symbols is rearranged by using the above-mentioned Equation 7. Then, as shown in FIG. 25(*c*), the null byte places are removed, so as to rearrange the order, by using Equation 8 shown below. Thereafter, the symbol that is interleaved by the rearranged order is then outputted to the symbol-byte converter.

$$\text{if } P(i) > K-1, \text{ then } P(i) \text{ place is removed and rearranged} \qquad \text{Equation 8}$$

Subsequently, the symbol-byte converter 404 converts to bytes the mobile service data symbols, having the rearranging of the symbol order completed and then outputted in accordance with the rearranged order, and thereafter outputs the converted bytes to the group formatter 304.

Figure 26A:
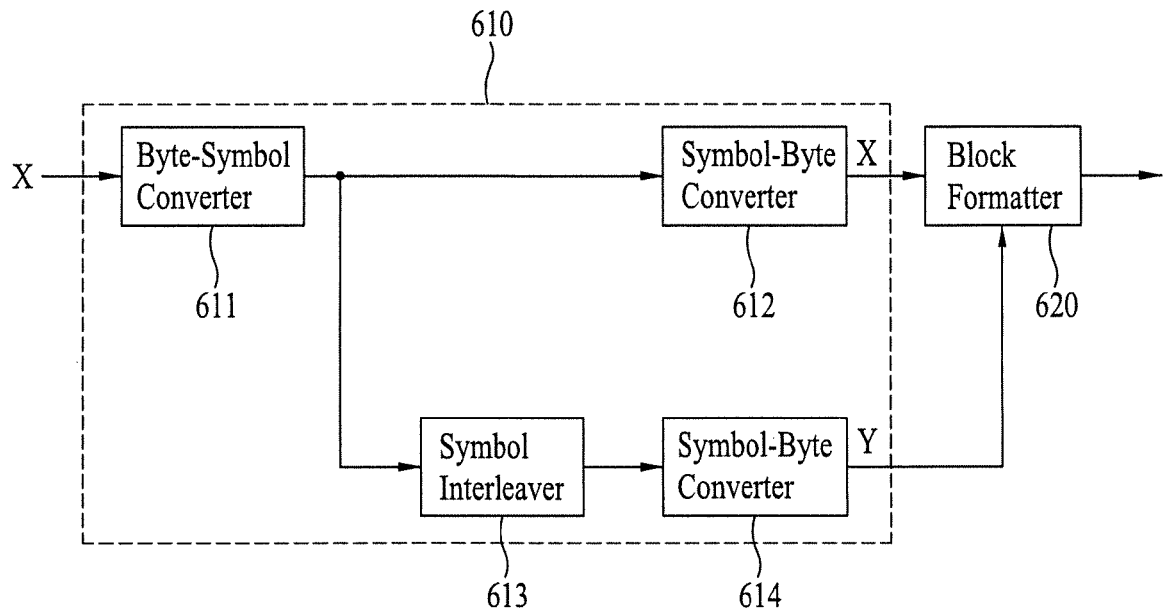
FIG. 26A and FIG. 26B illustrate a block diagram showing a structure of a block processor according to another embodiment of the present invention.

FIG. 26A illustrates a block diagram showing the structure of a block processor according to another embodiment of the present invention. Herein, the block processor includes an interleaving unit 610 and a block formatter 620. The interleaving unit 610 may include a byte-symbol converter 611, a symbol-byte converter 612, a symbol interleaver 613, and a symbol-byte converter 614. Herein, the symbol interleaver 613 may also be referred to as a block interleaver.

The byte-symbol converter 611 of the interleaving unit 610 converts the mobile service data X outputted in byte units from the RS frame encoder 302 to symbol units. Then, the byte-symbol converter 611 outputs the converted mobile service data symbols to the symbol-byte converter 612 and the symbol interleaver 613. More specifically, the byte-symbol converter 611 converts each 2 bits of the inputted mobile service data byte (=8 bits) to 1 symbol and outputs the converted symbols. This is because the input data of the trellis encoding module 256 consist of symbol units configured of 2 bits. The relationship between the block processor 303 and the trellis encoding module 256 will be described in detail in a later process. At this point, the byte-symbol converter 611 may also receive signaling information including transmission parameters. Furthermore, the signaling information bytes may also be divided into symbol units and then outputted to the symbol-byte converter 612 and the symbol interleaver 613.

Figure 26B:
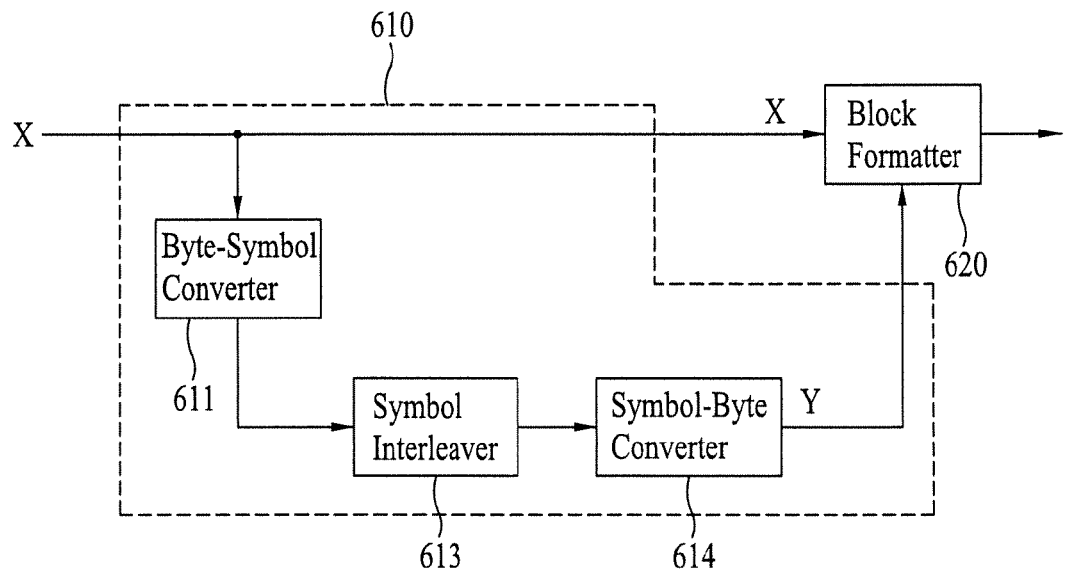

The symbol-byte converter 612 groups 4 symbols outputted from the byte-symbol converter 611 so as to configure a byte. Thereafter, the converted data bytes are outputted to the block formatter 620. Herein, each of the symbol-byte converter 612 and the byte-symbol converter 611 respectively performs an inverse process on one another. Therefore, the yield of these two blocks is offset. Accordingly, as shown in FIG. 26B, the input data X bypass the byte-symbol converter 611 and the symbol-byte converter 612 and are directly inputted to the block formatter 620. More specifically, the interleaving unit 610 of FIG. 26B has a structure equivalent to that of the interleaving unit shown in FIG. 26A. Therefore, the same reference numerals will be used in FIG. 26A and FIG. 26B.

The symbol interleaver 613 performs block interleaving in symbol units on the data that are outputted from the byte-symbol converter 611. Subsequently, the symbol interleaver 613 outputs the interleaved data to the symbol-byte converter 614. Herein, any type of interleaver that can rearrange the structural order may be used as the symbol interleaver 613 of the present invention. In the example given in the present invention, a variable length interleaver that may be applied for symbols having a wide range of lengths, the order of which is to be rearranged. For example, the symbol interleaver of FIG. 25 may also be used in the block processor shown in FIG. 26A and FIG. 26B.

Figure 27:
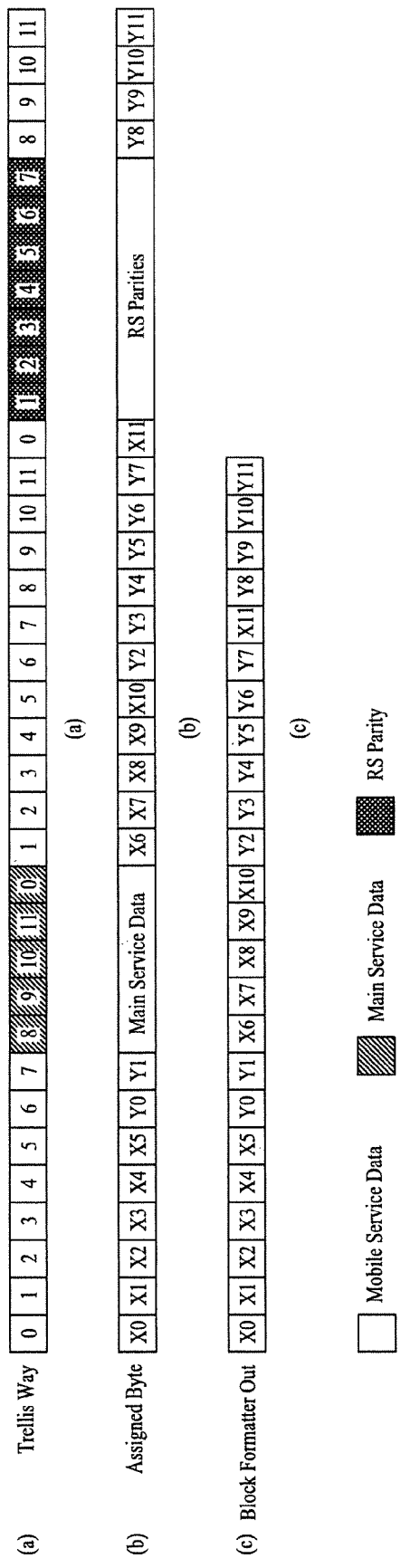
FIG. 27(a) to FIG. 27(c) illustrate examples of block encoding and trellis encoding according to an embodiment of the present invention.

The symbol-byte converter 614 outputs the symbols having the rearranging of the symbol order completed, in accordance with the rearranged order. Thereafter, the symbols are grouped to be configured in byte units, which are then outputted to the block formatter 620. More specifically, the symbol-byte converter 614 groups 4 symbols outputted from the symbol interleaver 613 so as to configure a data byte. As shown in FIG. 27, the block formatter 620 performs the process of aligning the output of each symbol-byte converter 612 and 614 within the block in accordance with a set standard. Herein, the block formatter 620 operates in association with the trellis encoding module 256.

More specifically, the block formatter 620 decides the output order of the mobile service data outputted from each symbol-byte converter 612 and 614 while taking into consideration the place (or order) of the data excluding the mobile service data that are being inputted, wherein the mobile service data include main service data, known data, RS parity data, and MPEG header data.

Figure 28:
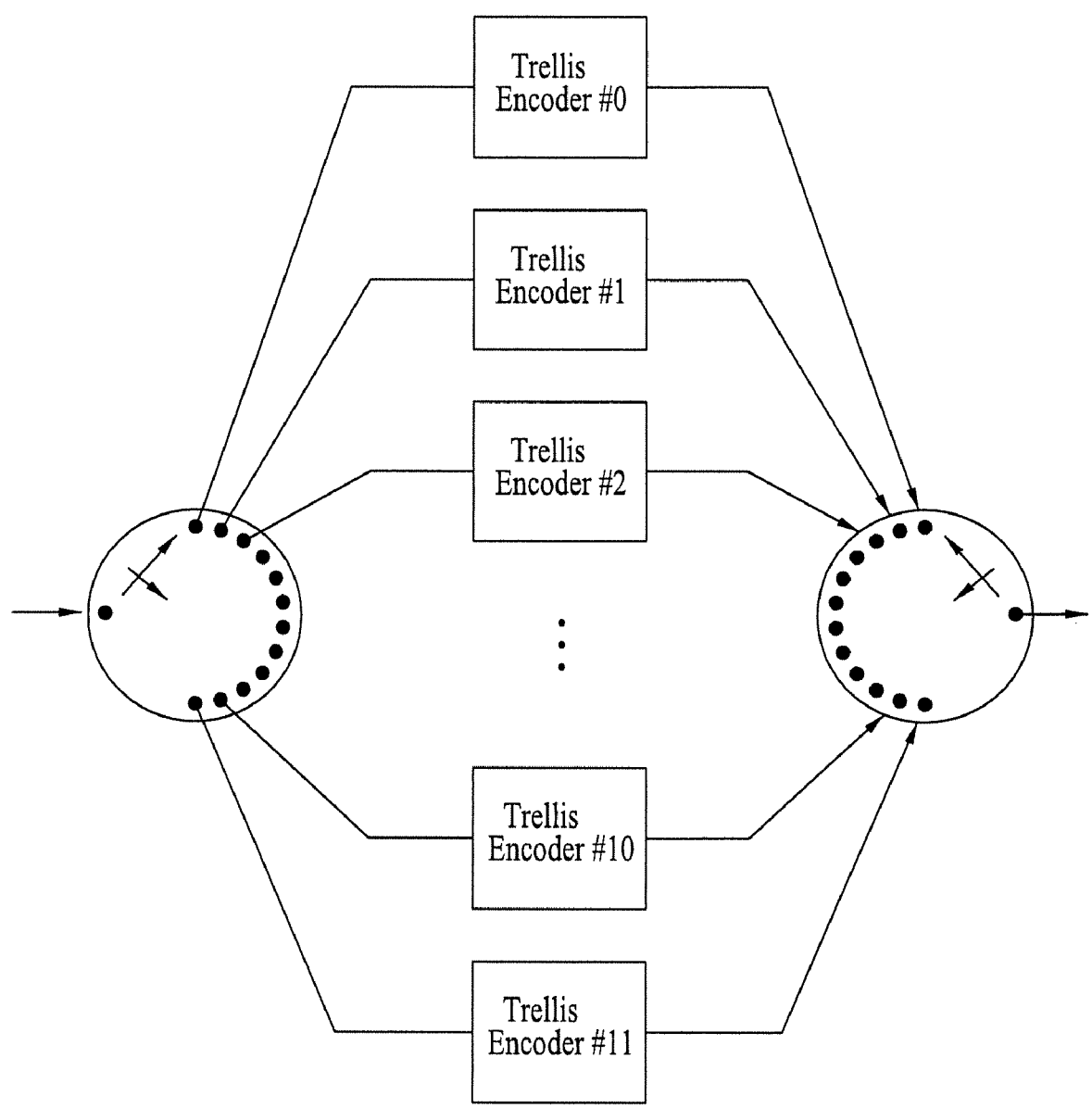
FIG. 28 illustrates a block diagram of a trellis encoding module according to an embodiment of present invention.

According to the embodiment of the present invention, the trellis encoding module 256 is provided with 12 trellis encoders. FIG. 28 illustrates a block diagram showing the trellis encoding module 256 according to the present invention. In the example shown in FIG. 28, 12 identical trellis encoders are combined to the interleaver in order to disperse noise. Herein, each trellis encoder may be provided with a pre-coder.

Figure 29A:
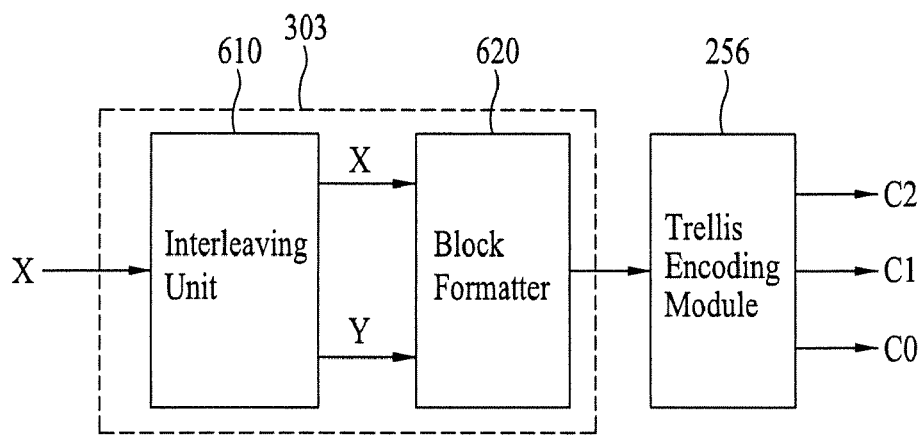
FIG. 29A and FIG. 29B illustrate a concatenation between a block processor and a trellis encoding module according to the present invention.
Figure 29B:
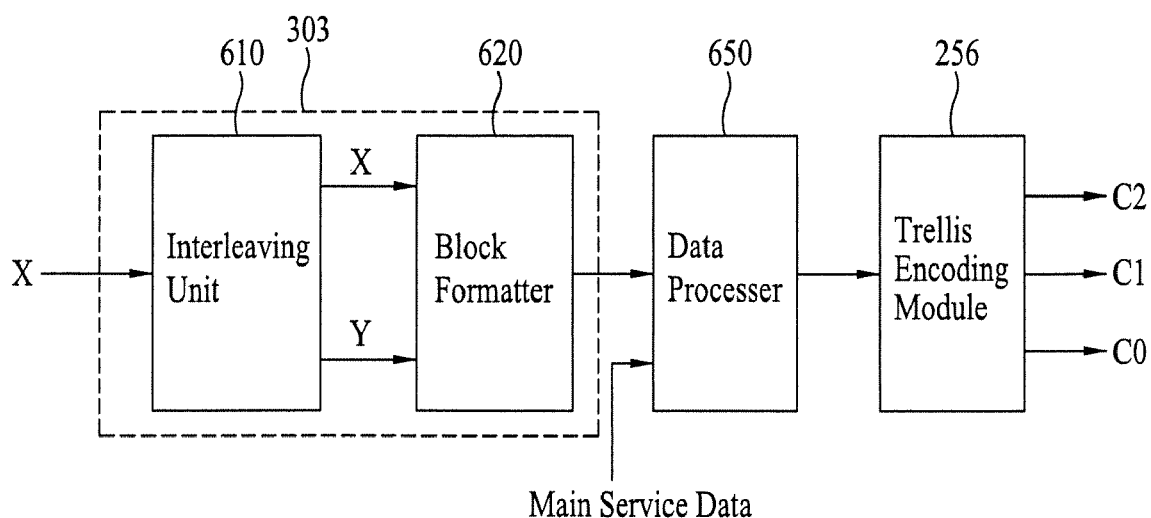

FIG. 29A illustrates the block processor 303 being concatenated with the trellis encoding module 256. In the transmitting system, a plurality of blocks actually exists between the pre-processor 230 including the block processor 303 and the trellis encoding module 256, as shown in FIG. 3. Conversely, the receiving system considers the pre-processor 230 to be concatenated with the trellis encoding module 256, thereby performing the decoding process accordingly. However, the data excluding the mobile service data that are being inputted to the trellis encoding module 256, wherein the mobile service data include main service data, known data, RS parity data, and MPEG header data, correspond to data that are added to the blocks existing between the block processor 303 and the trellis encoding module 256. FIG. 29B illustrates an example of a data processor 650 being positioned between the block processor 303 and the trellis encoding module 256, while taking the above-described instance into consideration.

Herein, when the interleaving unit 610 of the block processor 303 performs a ½-rate encoding process, the interleaving unit 610 may be configured as shown in FIG. 26A (or FIG. 26B). Referring to FIG. 3, for example, the data processor 650 may include a group formatter 304, a data deinterleaver 305, a packet formatter 306, a packet multiplexer 240, and a post-processor 250, wherein the post-processor 250 includes a data randomizer 251, a RS encoder/non-systematic RS encoder 252, a data interleaver 253, a parity replacer 254, and a non-systematic RS encoder 255.

At this point, the trellis encoding module 256 symbolizes the data that are being inputted so as to divide the symbolized data and to send the divided data to each trellis encoder in accordance with a pre-defined method. Herein, one byte is converted into 4 symbols, each being configured of 2 bits. Also, the symbols created from the single data byte are all transmitted to the same trellis encoder. Accordingly, each trellis encoder pre-codes an upper bit of the input symbol, which is then outputted as the uppermost output bit C2. Alternatively, each trellis encoder trellis-encodes a lower bit of the input symbol, which is then outputted as two output bits C1 and C0. The block formatter 620 is controlled so that the data byte outputted from each symbol-byte converter can be transmitted to different trellis encoders.

Hereinafter, the operation of the block formatter 620 will now be described in detail with reference to FIG. 23 to FIG. 26. Referring to FIG. 26A, for example, the data byte outputted from the symbol-byte converter 612 and the data byte outputted from the symbol-byte converter 614 are inputted to different trellis encoders of the trellis encoding module 256 in accordance with the control of the block formatter 620. Hereinafter, the data byte outputted from the symbol-byte converter 612 will be referred to as X, and the data byte outputted from the symbol-byte converter 614 will be referred to as Y, for simplicity. Referring to FIG. 27(a), each number (i.e., 0 to 11) indicates the first to twelfth trellis encoders of the trellis encoding module 256, respectively.

In addition, the output order of both symbol-byte converters are arranged (or aligned) so that the data bytes outputted from the symbol-byte converter 612 are respectively inputted to the $0^{th}$ to $5^{th}$ trellis encoders (0 to 5) of the trellis encoding module 256, and that the data bytes outputted from the symbol-byte converter 614 are respectively inputted to the $6^{th}$ to $11^{th}$ trellis encoders (6 to 11) of the trellis encoding module 256. Herein, the trellis encoders having the data bytes outputted from the symbol-byte converter 612 allocated therein, and the trellis encoders having the data bytes outputted from the symbol-byte converter 614 allocated therein are merely examples given to simplify the understanding of the present invention. Furthermore, according to an embodiment of the present invention, and assuming that the input data of the block processor 303 correspond to a block configured of 12 bytes, the symbol-byte converter 612 outputs 12 data bytes from X0 to X11, and the symbol-byte converter 614 outputs 12 data bytes from Y0 to Y11.

FIG. 27(b) illustrates an example of data being inputted to the trellis encoding module 256. Particularly, FIG. 27(b) illustrates an example of not only the mobile service data but also the main service data and RS parity data being inputted to the trellis encoding module 256, so as to be distributed to each trellis encoder. More specifically, the mobile service data outputted from the block processor 303 pass through the group formatter 304, from which the mobile service data are mixed with the main service data and RS parity data and then outputted, as shown in FIG. 27(a). Accordingly, each data byte is respectively inputted to the 12 trellis encoders in accordance with the positions (or places) within the data group after being data-interleaved.

Herein, when the output data bytes X and Y of the symbol-byte converters 612 and 614 are allocated to each respective trellis encoder, the input of each trellis encoder may be configured as shown in FIG. 27(b). More specifically, referring to FIG. 27(b), the six mobile service data bytes (X0 to X5) outputted from the symbol-byte converter 612 are sequentially allocated (or distributed) to the first to sixth trellis encoders (0 to 5) of the trellis encoding module 256. Also, the 2 mobile service data bytes Y0 and Y1 outputted from the symbol-byte converter 614 are sequentially allocated to the 7$^{th}$ and 8$^{th}$ trellis encoders (6 and 7) of the trellis encoding module 256. Thereafter, among the 5 main service data bytes, 4 data bytes are sequentially allocated to the 9$^{th}$ and 12$^{th}$ trellis encoders (8 to 11) of the trellis encoding module 256. Finally, the remaining 1 byte of the main service data byte is allocated once again to the first trellis encoder (0).

It is assumed that the mobile service data, the main service data, and the RS parity data are allocated to each trellis encoder, as shown in FIG. 27(*b*). It is also assumed that, as described above, the input of the block processor 303 is configured of 12 bytes, and that 12 bytes from X0 to X11 are outputted from the symbol-byte converter 612, and that 12 bytes from Y0 to Y11 are outputted from the symbol-byte converter 614. In this case, as shown in FIG. 27(*c*), the block formatter 620 arranges the data bytes that are to be outputted from the symbol-byte converters 612 and 614 by the order of X0 to X5, Y0, Y1, X6 to X10, Y2 to Y7, X1, and Y8 to Y11. More specifically, the trellis encoder that is to perform the encoding process is decided based upon the position (or place) within the transmission frame in which each data byte is inserted. At this point, not only the mobile service data but also the main service data, the MPEG header data, and the RS parity data are also inputted to the trellis encoding module 256. Herein, it is assumed that, in order to perform the above-described operation, the block formatter 620 is informed of (or knows) the information on the data group format after the data-interleaving process.

Figure 30:
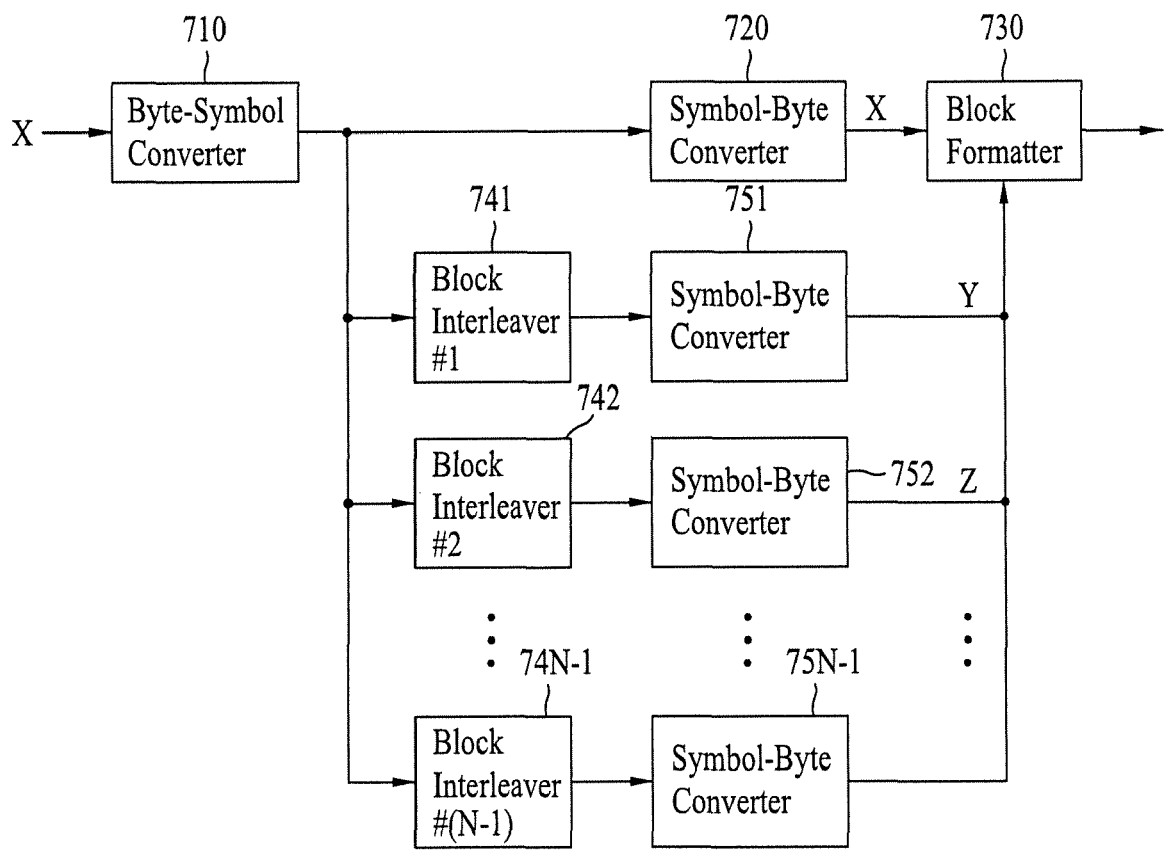
FIG. 30 illustrates a block diagram showing a structure of a block processor according to another embodiment of the present invention.

FIG. 30 illustrates a block diagram of the block processor performing an encoding process at a coding rate of 1/N according to an embodiment of the present invention. Herein, the block processor includes (N−1) number of symbol interleavers 741 to 74N−1, which are configured in a parallel structure. More specifically, the block processor having the coding rate of 1/N consists of a total of N number of branches (or paths) including a branch (or path), which is directly transmitted to the block formatter 730. In addition, the symbol interleaver 741 to 74N−1 of each branch may each be configured of a different symbol interleaver. Furthermore, (N−1) number of symbol-byte converter 751 to 75N−1 each corresponding to each (N−1) number of symbol interleavers 741 to 74N−1 may be included at the end of each symbol interleaver, respectively. Herein, the output data of the (N−1) number of symbol-byte converter 751 to 75N−1 are also inputted to the block formatter 730.

In the example of the present invention, N is equal to or smaller than 12. If N is equal to 12, the block formatter 730 may align the output data so that the output byte of the 12$^{th}$ symbol-byte converter 75N−1 is inputted to the 12$^{th}$ trellis encoder. Alternatively, if N is equal to 3, the block formatter 730 may arranged the output order, so that the data bytes outputted from the symbol-byte converter 720 are inputted to the 1$^{st}$ to 4$^{th}$ trellis encoders of the trellis encoding module 256, and that the data bytes outputted from the symbol-byte converter 751 are inputted to the 5$^{th}$ to 8$^{th}$ trellis encoders, and that the data bytes outputted from the symbol-byte converter 752 are inputted to the 9$^{th}$ to 12$^{th}$ trellis encoders. At this point, the order of the data bytes outputted from each symbol-byte converter may vary in accordance with the position within the data group of the data other than the mobile service data, which are mixed with the mobile service data that are outputted from each symbol-byte converter.

Figure 31:
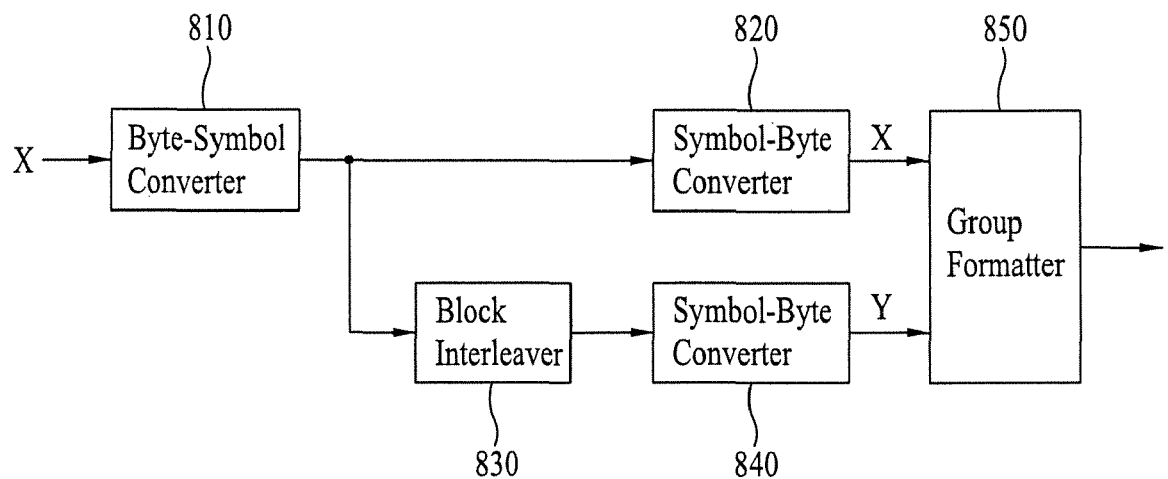
FIG. 31 illustrates a block diagram showing a structure of a block processor according to yet another embodiment of the present invention.

FIG. 31 illustrates a detailed block diagram showing the structure of a block processor according to another embodiment of the present invention. Herein, the block formatter is removed from the block processor so that the operation of the block formatter may be performed by a group formatter. More specifically, the block processor of FIG. 31 may include a byte-symbol converter 810, symbol-byte converters 820 and 840, and a symbol interleaver 830. In this case, the output of each symbol-byte converter 820 and 840 is inputted to the group formatter 850.

Also, the block processor may obtain a desired coding rate by adding symbol interleavers and symbol-byte converters. If the system designer wishes a coding rate of 1/N, the block processor needs to be provided with a total of N number of branches (or paths) including a branch (or path), which is directly transmitted to the block formatter 850, and (N−1) number of symbol interleavers and symbol-byte converters configured in a parallel structure with (N−1) number of branches. At this point, the group formatter 850 inserts place holders ensuring the positions (or places) for the MPEG header, the non-systematic RS parity, and the main service data. And, at the same time, the group formatter 850 positions the data bytes outputted from each branch of the block processor.

The number of trellis encoders, the number of symbol-byte converters, and the number of symbol interleavers proposed in the present invention are merely exemplary. And, therefore, the corresponding numbers do not limit the spirit or scope of the present invention. It is apparent to those skilled in the art that the type and position of each data byte being allocated to each trellis encoder of the trellis encoding module 256 may vary in accordance with the data group format. Therefore, the present invention should not be understood merely by the examples given in the description set forth herein. The mobile service data that are encoded at a coding rate of 1/N and outputted from the block processor 303 are inputted to the group formatter 304. Herein, in the example of the present invention, the order of the output data outputted from the block formatter of the block processor 303 are aligned and outputted in accordance with the position of the data bytes within the data group.

Signaling Information Processing

The transmitter 200 according to the present invention may insert transmission parameters by using a plurality of methods and in a plurality of positions (or places), which are then transmitted to the receiving system. For simplicity, the definition of a transmission parameter that is to be transmitted from the transmitter to the receiving system will now be described. The transmission parameter includes data group information, region information within a data group, the number of RS frames configuring a super frame (i.e., a super frame size (SFS)), the number of RS parity data bytes (P) for each column within the RS frame, whether or not a checksum, which is added to determine the presence of an error in a row direction within the RS frame, has been used, the type and size of the checksum if the checksum is used (presently, 2 bytes are added to the CRC), the number of data groups configuring one RS frame—since the RS frame is transmitted to one burst section, the number of data groups configuring the one RS frame is identical to the number of data groups within one burst (i.e., burst size (BS)), a turbo code mode, and a RS code mode.

Also, the transmission parameter required for receiving a burst includes a burst period—herein, one burst period corresponds to a value obtained by counting the number of fields starting from the beginning of a current burst until the beginning of a next burst, a positioning order of the RS frames that are currently being transmitted within a super frame (i.e., a permuted frame index (PFI)) or a positioning order of groups that are currently being transmitted within a RS frame (burst) (i.e., a group index (GI)), and a burst size. Depending upon the method of managing a burst, the transmission parameter also includes the number of fields remaining until the beginning of the next burst (i.e., time to next burst (TNB)). And, by transmitting such information as the transmission parameter, each data group being transmitted to the receiving system may indicate a relative distance (or number of fields) between a current position and the beginning of a next burst.

The information included in the transmission parameter corresponds to examples given to facilitate the understanding of the present invention. Therefore, the proposed examples do not limit the scope or spirit of the present invention and may be easily varied or modified by anyone skilled in the art. According to the first embodiment of the present invention, the transmission parameter may be inserted by allocating a predetermined region of the mobile service data packet or the data group. In this case, the receiving system performs synchronization and equalization on a received signal, which is then decoded by symbol units. Thereafter, the packet deformatter may separate the mobile service data and the transmission parameter so as to detect the transmission parameter. According to the first embodiment, the transmission parameter may be inserted from the group formatter 304 and then transmitted.

According to the second embodiment of the present invention, the transmission parameter may be multiplexed with another type of data. For example, when known data are multiplexed with the mobile service data, a transmission parameter may be inserted, instead of the known data, in a place (or position) where a known data byte is to be inserted. Alternatively, the transmission parameter may be mixed with the known data and then inserted in the place where the known data byte is to be inserted. According to the second embodiment, the transmission parameter may be inserted from the group formatter 304 or from the packet formatter 306 and then transmitted.

According to a third embodiment of the present invention, the transmission parameter may be inserted by allocating a portion of a reserved region within a field synchronization segment of a transmission frame. In this case, since the receiving system may perform decoding on a receiving signal by symbol units before detecting the transmission parameter, the transmission parameter having information on the processing methods of the block processor 303 and the group formatter 304 may be inserted in a reserved field of a field synchronization signal. More specifically, the receiving system obtains field synchronization by using a field synchronization segment so as to detect the transmission parameter from a pre-decided position. According to the third embodiment, the transmission parameter may be inserted from the synchronization multiplexer 240 and then transmitted.

According to the fourth embodiment of the present invention, the transmission parameter may be inserted in a layer (or hierarchical region) higher than a transport stream (TS) packet. In this case, the receiving system should be able to receive a signal and process the received signal to a layer higher than the TS packet in advance. At this point, the transmission parameter may be used to certify the transmission parameter of a currently received signal and to provide the transmission parameter of a signal that is to be received in a later process.

In the present invention, the variety of transmission parameters associated with the transmission signal may be inserted and transmitted by using the above-described methods according to the first to fourth embodiment of the present invention. At this point, the transmission parameter may be inserted and transmitted by using only one of the four embodiments described above, or by using a selection of the above-described embodiments, or by using all of the above-described embodiments. Furthermore, the information included in the transmission parameter may be duplicated and inserted in each embodiment. Alternatively, only the required information may be inserted in the corresponding position of the corresponding embodiment and then transmitted. Furthermore, in order to ensure robustness of the transmission parameter, a block encoding process of a short cycle (or period) may be performed on the transmission parameter and, then, inserted in a corresponding region. The method for performing a short-period block encoding process on the transmission parameter may include, for example, Kerdock encoding, BCH encoding, RS encoding, and repetition encoding of the transmission parameter. Also, a combination of a plurality of block encoding methods may also be performed on the transmission parameter.

The transmission parameters may be grouped to create a block code of a small size, so as to be inserted in a byte place allocated within the data group for signaling and then transmitted. However, in this case, the block code passes through the block decoded from the receiving end so as to obtain a transmission parameter value. Therefore, the transmission parameters of the turbo code mode and the RS code mode, which are required for block decoding, should first be obtained. Accordingly, the transmission parameters associated with a particular mode may be inserted in a specific section of a known data region. And, in this case, a correlation of with a symbol may be used for a faster decoding process. The receiving system refers to the correlation between each sequence and the currently received sequences, thereby determining the encoding mode and the combination mode.

Meanwhile, when the transmission parameter is inserted in the field synchronization segment region or the known data region and then transmitted, and when the transmission parameter has passed through the transmission channel, the reliability of the transmission parameter is deteriorated. Therefore, one of a plurality of pre-defined patterns may also be inserted in accordance with the corresponding transmission parameter. Herein, the receiving system performs a correlation calculation between the received signal and the pre-defined patterns so as to recognize the transmission parameter. For example, it is assumed that a burst including 5 data groups is pre-decided as pattern A based upon an agreement between the transmitting system and the receiving system. In this case, the transmitting system inserts and transmits pattern A, when the number of groups within the burst is equal to 5. Thereafter, the receiving system calculates a correlation between the received data and a plurality of reference patterns including pattern A, which was created in advance. At this point, if the correlation value between the received data and pattern A is the greatest, the received data indicates the corresponding parameter, and most particularly, the number of groups within the burst. At this point, the number of groups may be acknowledged as 5. Hereinafter, the process of inserting and transmitting the transmission parameter will now be described according to first, second, and third embodiments of the present invention.

First Embodiment

Figure 32:
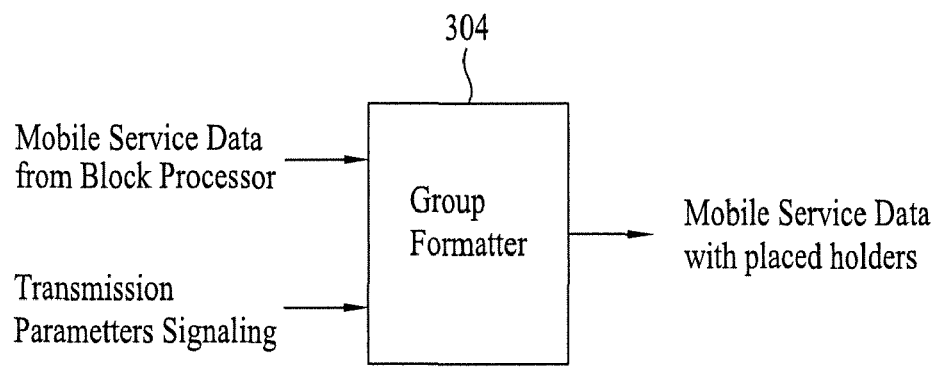
FIG. 32 illustrates an example wherein a group formatter inserts and transmits a transmission parameter according to the present invention.

FIG. 32 illustrates a schematic diagram of the group formatter 304 receiving the transmission parameter and inserting the received transmission parameter in region A of the data group according to the present invention. Herein, the group formatter 304 receives mobile service data from the block processor 303. Conversely, the transmission parameter is processed with at least one of a data randomizing process, a RS frame encoding process, and a block processing process, and may then be inputted to the group formatter 304. Alternatively, the transmission parameter may be directly inputted to the group formatter 304 without being processed with any of the above-mentioned processes. In addition, the transmission parameter may be provided from the service multiplexer 100. Alternatively, the transmission parameter may also be generated and provided from within the transmitter 200. The transmission parameter may also include information required by the receiving system in order to receive and process the data included in the data group. For example, the transmission parameter may include data group information, and multiplexing information.

The group formatter 304 inserts the mobile service data and transmission parameter which are to be inputted to corresponding regions within the data group in accordance with a rule for configuring a data group. For example, the transmission parameter passes through a block encoding process of a short period and is, then, inserted in region A of the data group. Particularly, the transmission parameter may be inserted in a pre-arranged and arbitrary position (or place) within region A. If it is assumed that the transmission parameter has been block encoded by the block processor 303, the block processor 303 performs the same data processing operation as the mobile service data, more specifically, either a ½-rate encoding or ¼-rate encoding process on the signaling information including the transmission parameter. Thereafter, the block processor 303 outputs the processed transmission parameter to the group formatter 304. Thereafter, the signaling information is also recognized as the mobile service data and processed accordingly.

Figure 33:
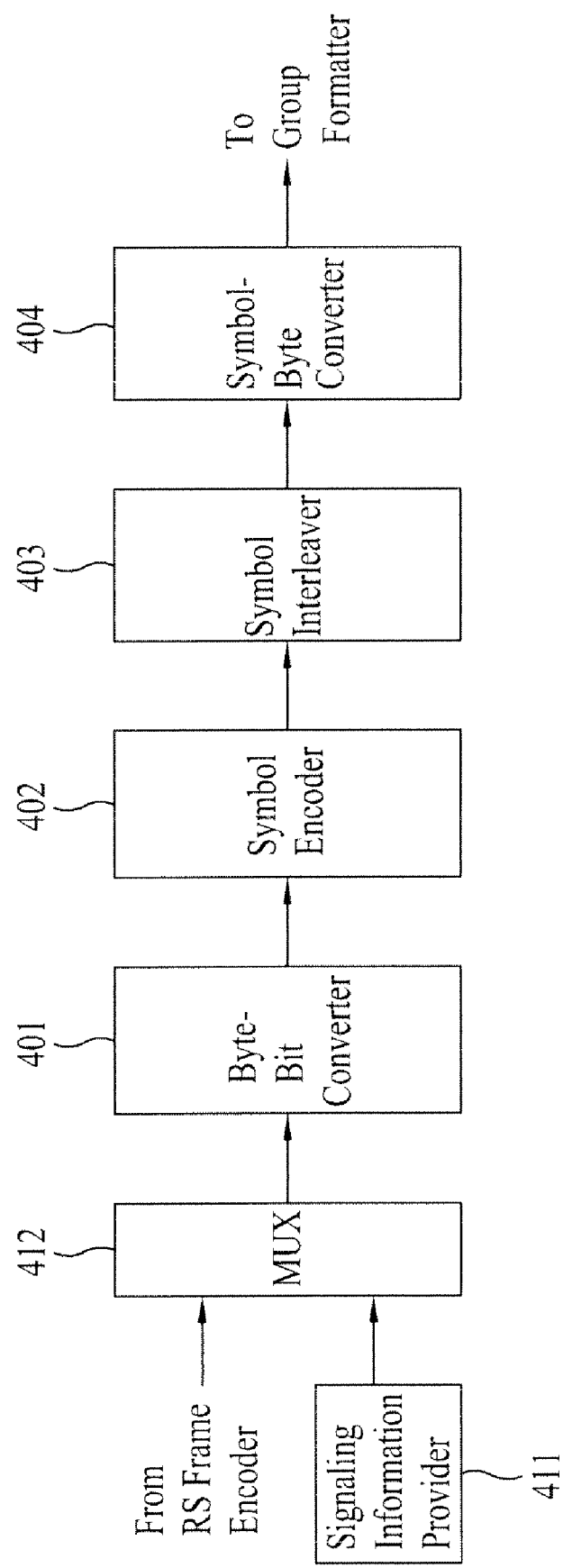
FIG. 33 illustrates an example wherein a block processor inserts and transmits a transmission parameter according to the present invention.

FIG. 33 illustrates a block diagram showing an example of the block processor receiving the transmission parameter and processing the received transmission parameter with the same process as the mobile service data. Particularly, FIG. 33 illustrates an example showing the structure of FIG. 23 further including a signaling information provider 411 and multiplexer 412. More specifically, the signaling information provider 411 outputs the signaling information including the transmission parameter to the multiplexer 412. The multiplexer 412 multiplexes the signaling information and the output of the RS frame encoder 302. Then, the multiplexer 412 outputs the multiplexed data to the byte-bit converter 401.

The byte-bit converter 401 divides the mobile service data bytes or signaling information byte outputted from the multiplexer 412 into bits, which are then outputted to the symbol encoder 402. The subsequent operations are identical to those described in FIG. 23. Therefore, a detailed description of the same will be omitted for simplicity. If any of the detailed structures of the block processor 303 shown in FIG. 26A, FIG. 26B, FIG. 29A, FIG. 29B, FIG. 30, and FIG. 31, the signaling information provider 411 and the multiplexer 412 may be provided behind the byte-symbol converter.

Second Embodiment

Meanwhile, when known data generated from the group formatter in accordance with a pre-decided rule are inserted in a corresponding region within the data group, a transmission parameter may be inserted in at least a portion of a region, where known data may be inserted, instead of the known data. For example, when a long known data sequence is inserted at the beginning of region A within the data group, a transmission parameter may be inserted in at least a portion of the beginning of region A instead of the known data. A portion of the known data sequence that is inserted in the remaining portion of region A, excluding the portion in which the transmission parameter is inserted, may be used to detect a starting point of the data group by the receiving system. Alternatively, another portion of region A may be used for channel equalization by the receiving system.

In addition, when the transmission parameter is inserted in the known data region instead of the actual known data. The transmission parameter may be block encoded in short periods and then inserted. Also, as described above, the transmission parameter may also be inserted based upon a pre-defined pattern in accordance with the transmission parameter. If the group formatter 304 inserts known data place holders in a region within the data group, wherein known data may be inserted, instead of the actual known data, the transmission parameter may be inserted by the packet formatter 306. More specifically, when the group formatter 304 inserts the known data place holders, the packet formatter 306 may insert the known data instead of the known data place holders. Alternatively, when the group formatter 304 inserts the known data, the known data may be directly outputted without modification.

Figure 34:
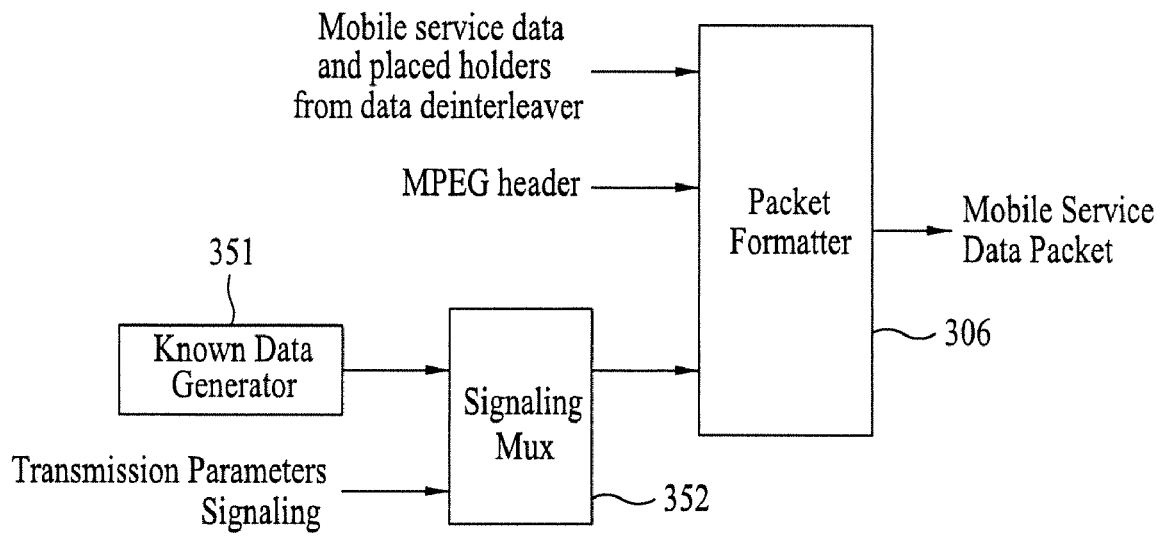
FIG. 34 illustrates an example wherein a packet formatter inserts and transmits a transmission parameter according to the present invention.

FIG. 34 illustrates a block diagram showing the structure of a packet formatter 306 being expanded so that the packet formatter 306 can insert the transmission parameter according to an embodiment of the present invention. More specifically, the structure of the packet formatter 306 further includes a known data generator 351 and a signaling multiplexer 352. Herein, the transmission parameter that is inputted to the signaling multiplexer 352 may include information on the length of a current burst, information indicating a starting point of a next burst, positions in which the groups within the burst exist and the lengths of the groups, information on the time from the current group and the next group within the burst, and information on known data.

The signaling multiplexer 352 selects one of the transmission parameter and the known data generated from the known data generator 351 and, then, outputs the selected data to the packet formatter 306. The packet formatter 306 inserts the known data or transmission parameter outputted from the signaling multiplexer 352 into the known data place holders outputted from the data interleaver 305. Then, the packet formatter 306 outputs the processed data. More specifically, the packet formatter 306 inserts a transmission parameter in at least a portion of the known data region instead of the known data, which is then outputted. For example, when a known data place holder is inserted at a beginning portion of region A within the data group, a transmission parameter may be inserted in a portion of the known data place holder instead of the actual known data.

Also, when the transmission parameter is inserted in the known data place holder instead of the known data, the transmission parameter may be block encoded in short periods and inserted. Alternatively, a pre-defined pattern may be inserted in accordance with the transmission parameter. More specifically, the signaling multiplexer 352 multiplexes the known data and the transmission parameter (or the pattern defined by the transmission parameter) so as to configure a new known data sequence. Then, the signaling multiplexer 352 outputs the newly configured known data sequence to the packet formatter 306. The packet formatter 306 deletes the main service data place holder and RS parity place holder from the output of the data interleaver 305, and creates a mobile service data packet of 188 bytes by using the mobile service data, MPEG header, and the output of the signaling multiplexer.

Then, the packet formatter 306 outputs the newly created mobile service data packet to the packet multiplexer 240.

In this case, the region A of each data group has a different known data pattern. Therefore, the receiving system separates only the symbol in a pre-arranged section of the known data sequence and recognizes the separated symbol as the transmission parameter. Herein, depending upon the design of the transmitting system, the known data may be inserted in different blocks, such as the packet formatter 306, the group formatter 304, or the block processor 303. Therefore, a transmission parameter may be inserted instead of the known data in the block wherein the known data are to be inserted.

According to the second embodiment of the present invention, a transmission parameter including information on the processing method of the block processor 303 may be inserted in a portion of the known data region and then transmitted. In this case, a symbol processing method and position of the symbol for the actual transmission parameter symbol are already decided. Also, the position of the transmission parameter symbol should be positioned so as to be transmitted or received earlier than any other data symbols that are to be decoded. Accordingly, the receiving system may detect the transmission symbol before the data symbol decoding process, so as to use the detected transmission symbol for the decoding process.

Third Embodiment

Figure 35:
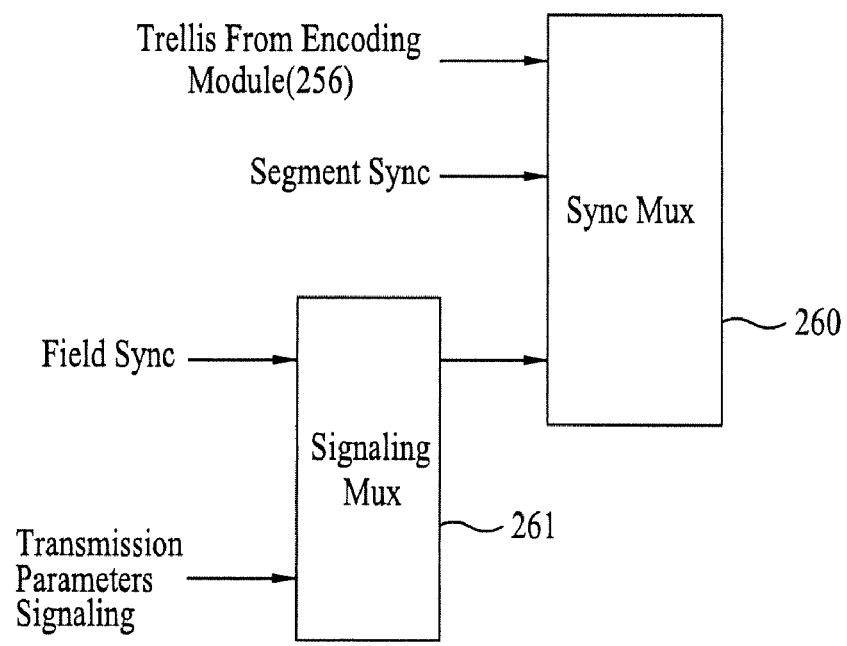
FIG. 35 illustrates an example wherein a transmission parameter according to the present invention is inserted in a field synchronization segment region.

Meanwhile, the transmission parameter may also be inserted in the field synchronization segment region and then transmitted. FIG. 35 illustrates a block diagram showing the synchronization multiplexer being expanded in order to allow the transmission parameter to be inserted in the field synchronization segment region. Herein, a signaling multiplexer 261 is further included in the synchronization multiplexer 260. The transmission parameter of the general VSB method is configured of 2 fields. More specifically, each field is configured of one field synchronization segment and 312 data segments. Herein, the first 4 symbols of a data segment correspond to the segment synchronization portion, and the first data segment of each field corresponds to the field synchronization portion.

One field synchronization signal is configured to have the length of one data segment. The data segment synchronization pattern exists in the first 4 symbols, which are then followed by pseudo random sequences PN 511, PN 63, PN 63, and PN 63. The next 24 symbols include information associated with the VSB mode. Additionally, the 24 symbols that include information associated with the VSB mode are followed by the remaining 104 symbols, which are reserved symbols. Herein, the last 12 symbols of a previous segment are copied and positioned as the last 12 symbols in the reserved region. In other words, only the 92 symbols in the field synchronization segment are the symbols that correspond to the actual reserved region.

Therefore, the signaling multiplexer 261 multiplexes the transmission parameter with an already-existing field synchronization segment symbol, so that the transmission parameter can be inserted in the reserved region of the field synchronization segment. Then, the signaling multiplexer 261 outputs the multiplexed transmission parameter to the synchronization multiplexer 260. The synchronization multiplexer 260 multiplexes the segment synchronization symbol, the data symbols, and the new field synchronization segment outputted from the signaling multiplexer 261, thereby configuring a new transmission frame. The transmission frame including the field synchronization segment, wherein the transmission parameter is inserted, is outputted to the transmission unit 270. At this point, the reserved region within the field synchronization segment for inserting the transmission parameter may correspond to a portion of or the entire 92 symbols of the reserved region. Herein, the transmission parameter being inserted in the reserved region may, for example, include information identifying the transmission parameter as the main service data, the mobile service data, or a different type of mobile service data.

If the information on the processing method of the block processor 303 is transmitted as a portion of the transmission parameter, and when the receiving system wishes to perform a decoding process corresponding to the block processor 303, the receiving system should be informed of such information on the block processing method in order to perform the decoding process. Therefore, the information on the processing method of the block processor 303 should already be known prior to the block decoding process. Accordingly, as described in the third embodiment of the present invention, when the transmission parameter having the information on the processing method of the block processor 303 (and/or the group formatter 304) is inserted in the reserved region of the field synchronization signal and then transmitted, the receiving system is capable of detecting the transmission parameter prior to performing the block decoding process on the received signal.

Receiving System

Figure 36:
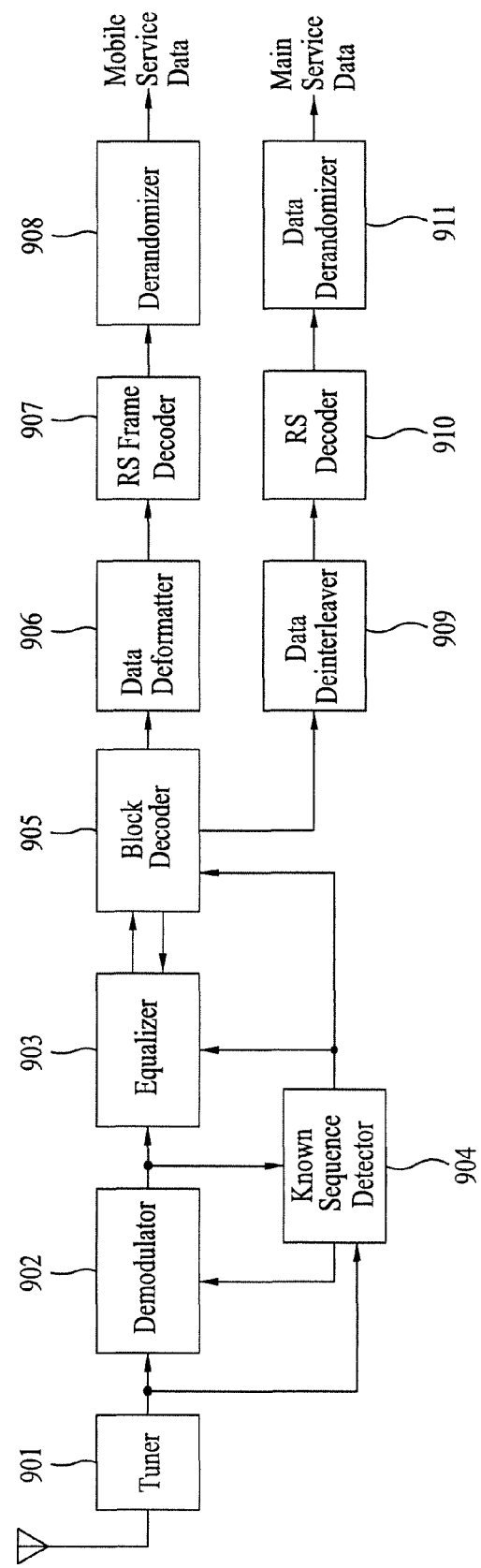
FIG. 36 illustrates a block diagram showing a structure of a digital broadcast receiving system according to the present invention.

FIG. 36 illustrates a block diagram showing a structure of a digital broadcast receiving system according to the present invention. The digital broadcast receiving system of FIG. 36 uses known data information, which is inserted in the mobile service data section and, then, transmitted by the transmitting system, so as to perform carrier synchronization recovery, frame synchronization recovery, and channel equalization, thereby enhancing the receiving performance. Referring to FIG. 36, the digital broadcast receiving system includes a tuner 901, a demodulator 902, an equalizer 903, a known data detector 904, a block decoder 905, a data deformatter 906, a RS frame decoder 907, a derandomizer 908, a data deinterleaver 909, a RS decoder 910, and a data derandomizer 911. Herein, for simplicity of the description of the present invention, the data deformatter 906, the RS frame decoder 907, and the derandomizer 908 will be collectively referred to as a mobile service data processing unit. And, the data deinterleaver 909, the RS decoder 910, and the data derandomizer 911 will be collectively referred to as a main service data processing unit.

More specifically, the tuner 901 tunes a frequency of a particular channel and down-converts the tuned frequency to an intermediate frequency (IF) signal. Then, the tuner 901 outputs the down-converted IF signal to the demodulator 902 and the known data detector 904. The demodulator 902 performs self gain control, carrier recovery, and timing recovery processes on the inputted IF signal, thereby modifying the IF signal to a baseband signal. Then, the demodulator 902 outputs the newly created baseband signal to the equalizer 903 and the known data detector 904. The equalizer 903 compensates the distortion of the channel included in the demodulated signal and then outputs the error-compensated signal to the block decoder 905.

At this point, the known data detector 904 detects the known sequence place inserted by the transmitting end from the input/output data of the demodulator 902 (i.e., the data prior to the demodulation process or the data after the demodulation process). Thereafter, the place information along with the symbol sequence of the known data, which are generated from the detected place, is outputted to the demodulator 902 and the equalizer 903. Also, the known data detector 904 outputs a set of information to the block decoder 905. This set of information is used to allow the block decoder 905 of the receiving system to identify the mobile service data that are processed with additional encoding from the transmitting system and the main service data that are not processed with additional encoding. In addition, although the connection status is not shown in FIG. 36, the information detected from the known data detector 904 may be used throughout the entire receiving system and may also be used in the data deformatter 906 and the RS frame decoder 907. The demodulator 902 uses the known data symbol sequence during the timing and/or carrier recovery, thereby enhancing the demodulating performance. Similarly, the equalizer 903 uses the known data so as to enhance the equalizing performance. Moreover, the decoding result of the block decoder 905 may be fed-back to the equalizer 903, thereby enhancing the equalizing performance.

The equalizer 903 may perform channel equalization by using a plurality of methods. An example of estimating a channel impulse response (CIR) so as to perform channel equalization will be given in the description of the present invention. Most particularly, an example of estimating the CIR in accordance with each region within the data group, which is hierarchically divided and transmitted from the transmitting system, and applying each CIR differently will also be described herein. Furthermore, by using the known data, the place and contents of which is known in accordance with an agreement between the transmitting system and the receiving system, and the field synchronization data, so as to estimate the CIR, the present invention may be able to perform channel equalization with more stability.

Herein, the data group that is inputted for the equalization process is divided into regions A to C, as shown in FIG. 19A. More specifically, in the example of the present invention, each region A, B, and C are further divided into regions A1 to A5, regions B1 and B2, and regions C1 to C3, respectively. Referring to FIG. 19A, the CIR that is estimated from the field synchronization data in the data structure is referred to as CIR_FS. Alternatively, the CIRs that are estimated from each of the 5 known data sequences existing in region A are sequentially referred to as CIR_N0, CIR_N1, CIR_N2, CIR_N3, and CIR_N4.

As described above, the present invention uses the CIR estimated from the field synchronization data and the known data sequences in order to perform channel equalization on data within the data group. At this point, each of the estimated CIRs may be directly used in accordance with the characteristics of each region within the data group. Alternatively, a plurality of the estimated CIRs may also be either interpolated or extrapolated so as to create a new CIR, which is then used for the channel equalization process.

Herein, when a value F(A) of a function F(x) at a particular point A and a value F(B) of the function F(x) at another particular point B are known, interpolation refers to estimating a function value of a point within the section between points A and B. Linear interpolation corresponds to the simplest form among a wide range of interpolation operations. The linear interpolation described herein is merely exemplary among a wide range of possible interpolation methods. And, therefore, the present invention is not limited only to the examples set forth herein.

Alternatively, when a value F(A) of a function F(x) at a particular point A and a value F(B) of the function F(x) at another particular point B are known, extrapolation refers to estimating a function value of a point outside of the section between points A and B. Linear extrapolation is the simplest form among a wide range of extrapolation operations. Similarly, the linear extrapolation described herein is merely exemplary among a wide range of possible extrapolation methods. And, therefore, the present invention is not limited only to the examples set forth herein.

More specifically, in case of region C1, any one of the CIR_N4 estimated from a previous data group, the CIR_FS estimated from the current data group that is to be processed with channel equalization, and a new CIR generated by extrapolating the CIR_FS of the current data group and the CIR_N0 may be used to perform channel equalization. Alternatively, in case of region B1, a variety of methods may be applied as described in the case for region C1. For example, a new CIR created by linearly extrapolating the CIR_FS estimated from the current data group and the CIR_N0 may be used to perform channel equalization. Also, the CIR_FS estimated from the current data group may also be used to perform channel equalization. Finally, in case of region A1, a new CIR may be created by interpolating the CIR_FS estimated from the current data group and CIR_N0, which is then used to perform channel equalization. Furthermore, any one of the CIR_FS estimated from the current data group and CIR_N0 may be used to perform channel equalization.

In case of regions A2 to A5, CIR_N(i−1) estimated from the current data group and CIR_N(i) may be interpolated to create a new CIR and use the newly created CIR to perform channel equalization. Also, any one of the CIR_N(i−1) estimated from the current data group and the CIR_N(i) may be used to perform channel equalization. Alternatively, in case of regions B2, C2, and C3, CIR_N3 and CIR_N4 both estimated from the current data group may be extrapolated to create a new CIR, which is then used to perform the channel equalization process. Furthermore, the CIR_N4 estimated from the current data group may be used to perform the channel equalization process. Accordingly, an optimum performance may be obtained when performing channel equalization on the data inserted in the data group. The methods of obtaining the CIRs required for performing the channel equalization process in each region within the data group, as described above, are merely examples given to facilitate the understanding of the present invention. A wider range of methods may also be used herein. And, therefore, the present invention will not only be limited to the examples given in the description set forth herein.

Meanwhile, if the data being inputted to the block decoder 905 after being channel equalized from the equalizer 903 correspond to the mobile service data having additional encoding and trellis encoding performed thereon by the transmitting system, trellis decoding and additional decoding processes are performed on the inputted data as inverse processes of the transmitting system. Alternatively, if the data being inputted to the block decoder 905 correspond to the main service data having only trellis encoding performed thereon, and not the additional encoding, only the trellis decoding process is performed on the inputted data as the inverse process of the transmitting system. The data group decoded by the block decoder 905 is inputted to the data deformatter 906, and the main service data are inputted to the data deinterleaver 909.

According to another embodiment, the main data may also bypass the block decoder 905 so as to be directly inputted to the data deinterleaver 909. In this case, a trellis decoder for the main service data should be provided before the data deinterleaver 909. When the block decoder 905 outputs the data group to the data deformatter 906, the known data, trellis initialization data, and MPEG header, which are inserted in the data group, and the RS parity, which is added by the RS encoder/non-systematic RS encoder or non-systematic RS encoder of the transmitting system, are removed. Then, the processed data are outputted to the data deformatter 906. Herein, the removal of the data may be performed before the block decoding process, or may be performed during or after the block decoding process. If the transmitting system includes signaling information in the data group upon transmission, the signaling information is outputted to the data deformatter 906.

More specifically, if the inputted data correspond to the main service data, the block decoder 905 performs Viterbi decoding on the inputted data so as to output a hard decision value or to perform a hard-decision on a soft decision value, thereby outputting the result. Meanwhile, if the inputted data correspond to the mobile service data, the block decoder 905 outputs a hard decision value or a soft decision value with respect to the inputted mobile service data. In other words, if the inputted data correspond to the mobile service data, the block decoder 905 performs a decoding process on the data encoded by the block processor and trellis encoding module of the transmitting system.

At this point, the RS frame encoder of the pre-processor included in the transmitting system may be viewed as an external code. And, the block processor and the trellis encoder may be viewed as an internal code. In order to maximize the performance of the external code when decoding such concatenated codes, the decoder of the internal code should output a soft decision value. Therefore, the block decoder 905 may output a hard decision value on the mobile service data. However, when required, it may be more preferable for the block decoder 905 to output a soft decision value.

Meanwhile, the data deinterleaver 909, the RS decoder 910, and the derandomizer 911 are blocks required for receiving the main service data. Therefore, the above-mentioned blocks may not be required in the structure of a digital broadcast receiving system that only receives the mobile service data. The data deinterleaver 909 performs an inverse process of the data interleaver included in the transmitting system. In other words, the data deinterleaver 909 deinterleaves the main service data outputted from the block decoder 905 and outputs the deinterleaved main service data to the RS decoder 910. The RS decoder 910 performs a systematic RS decoding process on the deinterleaved data and outputs the processed data to the derandomizer 911. The derandomizer 911 receives the output of the RS decoder 910 and generates a pseudo random data byte identical to that of the randomizer included in the digital broadcast transmitting system. Thereafter, the derandomizer 911 performs a bitwise exclusive OR (XOR) operation on the generated pseudo random data byte, thereby inserting the MPEG synchronization bytes to the beginning of each packet so as to output the data in 188-byte main service data packet units.

Meanwhile, the data being outputted from the block decoder 905 to the data deformatter 906 are inputted in the form of a data group. At this point, the data deformatter 906 already knows the structure of the data that are to be inputted and is, therefore, capable of identifying the signaling information, which includes the system information, and the mobile service data from the data group. Thereafter, the data deformatter 906 outputs the identified signaling information to a block for processing signaling information (not shown) and outputs the identified mobile service data to the RS frame decoder 907. More specifically, the RS frame decoder 907 receives only the RS encoded and CRC encoded mobile service data that are transmitted from the data deformatter 906.

The RS frame encoder 907 performs an inverse process of the RS frame encoder included in the transmitting system so as to correct the error within the RS frame. Then, the RS frame decoder 907 adds the 1-byte MPEG synchronization service data packet, which had been removed during the RS frame encoding process, to the error-corrected mobile service data packet. Thereafter, the processed data packet is outputted to the derandomizer 908. The operation of the RS frame decoder 907 will be described in detail in a later process. The derandomizer 908 performs a derandomizing process, which corresponds to the inverse process of the randomizer included in the transmitting system, on the received mobile service data. Thereafter, the derandomized data are outputted, thereby obtaining the mobile service data transmitted from the transmitting system. Hereinafter, detailed operations of the RS frame decoder 907 will now be described.

Figure 37:
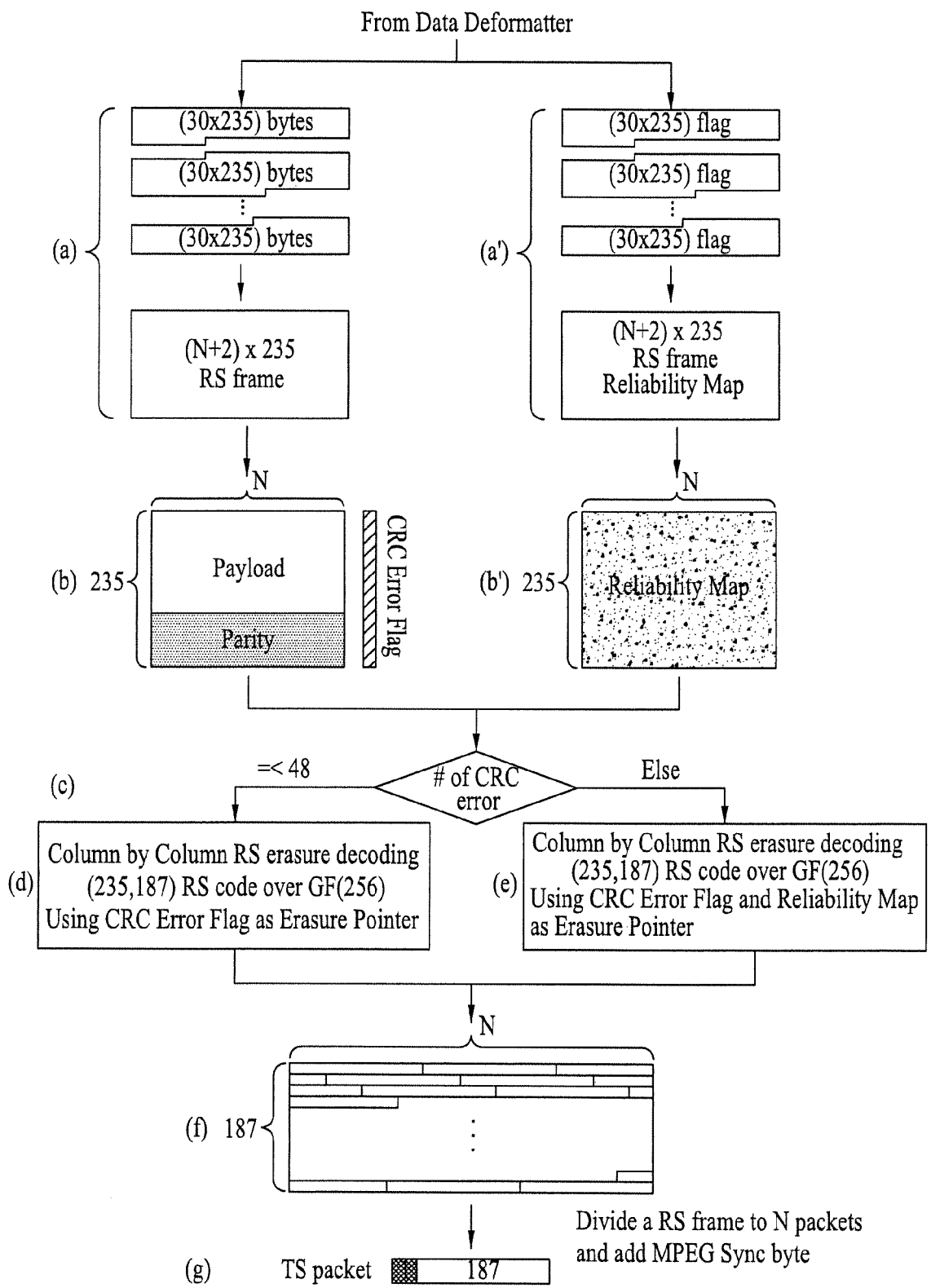
FIG. 37 illustrates process steps of error correction decoding according to an embodiment of the present invention.

FIG. 37 illustrates a series of exemplary step of an error correction decoding process of the RS frame decoder 907 according to the present invention. More specifically, the RS frame decoder 907 groups mobile service data bytes received from the data deformatter 906 so as to configure an RS frame. The mobile service data correspond to data RS encoded and CRC encoded from the transmitting system. FIG. 37($a$) illustrates an example of configuring the RS frame. More specifically, the transmitting system divided the RS frame having the size of (N+2)*235 to 30*235 byte blocks. When it is assumed that each of the divided mobile service data byte blocks is inserted in each data group and then transmitted, the receiving system also groups the 30*235 mobile service data byte blocks respectively inserted in each data group, thereby configuring an RS frame having the size of (N+2)*235. For example, when it is assumed that an RS frame is divided into 18 30*235 byte blocks and transmitted from a burst section, the receiving system also groups the mobile service data bytes of 18 data groups within the corresponding burst section, so as to configure the RS frame. Furthermore, when it is assumed that N is equal to 538 (i.e., N=538), the RS frame decoder 907 may group the mobile service data bytes within the 18 data groups included in a burst so as to configure a RS frame having the size of 540*235 bytes.

Herein, when it is assumed that the block decoder 905 outputs a soft decision value for the decoding result, the RS frame decoder 907 may decide the '0' and '1' of the corresponding bit by using the codes of the soft decision value. 8 bits that are each decided as described above are grouped to create 1 data byte. If the above-described process is performed on all soft decision values of the 18 data groups included in a single burst, the RS frame having the size of 540*235 bytes may be configured. Additionally, the present invention uses the soft decision value not only to configure the RS frame but also to configure a reliability map. Herein, the reliability map indicates the reliability of the corresponding data byte, which is configured by grouping 8 bits, the 8 bits being decided by the codes of the soft decision value.

For example, when the absolute value of the soft decision value exceeds a pre-determined threshold value, the value of the corresponding bit, which is decided by the code of the corresponding soft decision value, is determined to be reliable. Conversely, when the absolute value of the soft decision value does not exceed the pre-determined threshold value, the value of the corresponding bit is determined to be unreliable. Thereafter, if even a single bit among the 8 bits, which are decided by the codes of the soft decision value and group to configure 1 data byte, is determined to be unreliable, the corresponding data byte is marked on the reliability map as an unreliable data byte.

Herein, determining the reliability of 1 data byte is only exemplary. More specifically, when a plurality of data bytes (e.g., at least 4 data bytes) are determined to be unreliable, the corresponding data bytes may also be marked as unreliable data bytes within the reliability map. Conversely, when all of the data bits within the 1 data byte are determined to be reliable (i.e., when the absolute value of the soft decision values of all 8 bits included in the 1 data byte exceed the predetermined threshold value), the corresponding data byte is marked to be a reliable data byte on the reliability map. Similarly, when a plurality of data bytes (e.g., at least 4 data bytes) are determined to be reliable, the corresponding data bytes may also be marked as reliable data bytes within the reliability map. The numbers proposed in the above-described example are merely exemplary and, therefore, do not limit the scope or spirit of the present invention.

The process of configuring the RS frame and the process of configuring the reliability map both using the soft decision value may be performed at the same time. Herein, the reliability information within the reliability map is in a one-to-one correspondence with each byte within the RS frame. For example, if a RS frame has the size of 540*235 bytes, the reliability map is also configured to have the size of 540*235 bytes. FIG. 37($a'$) illustrates the process steps of configuring the reliability map according to the present invention. Meanwhile, if a RS frame is configured to have the size of (N+2)*235 bytes, the RS frame decoder 907 performs a CRC syndrome checking process on the corresponding RS frame, thereby verifying whether any error has occurred in each row. Subsequently, as shown in FIG. 37($b$), a 2-byte checksum is removed to configure an RS frame having the size of N*235 bytes. Herein, the presence (or existence) of an error is indicated on an error flag corresponding to each row. Similarly, since the portion of the reliability map corresponding to the CRC checksum has hardly any applicability, this portion is removed so that only N*235 number of the reliability information bytes remain, as shown in FIG. 37($b'$).

After performing the CRC syndrome checking process, the RS frame decoder 907 performs RS decoding in a column direction. Herein, a RS erasure correction process may be performed in accordance with the number of CRC error flags. More specifically, as shown in FIG. 37($c$), the CRC error flag corresponding to each row within the RS frame is verified. Thereafter, the RS frame decoder 907 determines whether the number of rows having a CRC error occurring therein is equal to or smaller than the maximum number of errors on which the RS erasure correction may be performed, when performing the RS decoding process in a column direction. The maximum number of errors corresponds to a number of parity bytes inserted when performing the RS encoding process. In the embodiment of the present invention, it is assumed that 48 parity bytes have been added to each column.

If the number of rows having the CRC errors occurring therein is smaller than or equal to the maximum number of errors (i.e., 48 errors according to this embodiment) that can be corrected by the RS erasure decoding process, a (235,187)-RS erasure decoding process is performed in a column direction on the RS frame having 235 N-byte rows, as shown in FIG. 37($d$). Thereafter, as shown in FIG. 37($f$), the 48-byte parity data that have been added at the end of each column are removed. Conversely, however, if the number of rows having the CRC errors occurring therein is greater than the maximum number of errors (i.e., 48 errors) that can be corrected by the RS erasure decoding process, the RS erasure decoding process cannot be performed. In this case, the error may be corrected by performing a general RS decoding process. In addition, the reliability map, which has been created based upon the soft decision value along with the RS frame, may be used to further enhance the error correction ability (or performance) of the present invention.

More specifically, the RS frame decoder 907 compares the absolute value of the soft decision value of the block decoder 905 with the pre-determined threshold value, so as to determine the reliability of the bit value decided by the code of the corresponding soft decision value. Also, 8 bits, each being determined by the code of the soft decision value, are grouped to form 1 data byte. Accordingly, the reliability information on this 1 data byte is indicated on the reliability map. Therefore, as shown in FIG. 37($e$), even though a particular row is determined to have an error occurring therein based upon a CRC syndrome checking process on the particular row, the present invention does not assume that all bytes included in the row have errors occurring therein. The present invention refers to the reliability information of the reliability map and sets only the bytes that have been determined to be unreliable as erroneous bytes. In other words, with disregard to whether or not a CRC error exists within the corresponding row, only the bytes that are determined to be unreliable based upon the reliability map are set as erasure points.

According to another method, when it is determined that CRC errors are included in the corresponding row, based upon the result of the CRC syndrome checking result, only the bytes that are determined by the reliability map to be unreliable are set as errors. More specifically, only the bytes corresponding to the row that is determined to have errors included therein and being determined to be unreliable based upon the reliability information, are set as the erasure points. Thereafter, if the number of error points for each column is smaller than or equal to the maximum number of errors (i.e., 48 errors) that can be corrected by the RS erasure decoding process, an RS erasure decoding process is performed on the corresponding column. Conversely, if the number of error points for each column is greater than the maximum number of errors (i.e., 48 errors) that can be corrected by the RS erasure decoding process, a general decoding process is performed on the corresponding column.

More specifically, if the number of rows having CRC errors included therein is greater than the maximum number of errors (i.e., 48 errors) that can be corrected by the RS erasure decoding process, either an RS erasure decoding process or a general RS decoding process is performed on a column that is decided based upon the reliability information of the reliability map, in accordance with the number of erasure points within the corresponding column. For example, it is assumed that the number of rows having CRC errors included therein within the RS frame is greater than 48. And, it is also assumed that the number of erasure points decided based upon the reliability information of the reliability map is indicated as 40 erasure points in the first column and as 50 erasure points in the second column. In this case, a (235,187)-RS erasure decoding process is performed on the first column. Alternatively, a (235,187)-RS decoding process is performed on the second column. When error correction decoding is performed on all column directions within the RS frame by using the above-described process, the 48-byte parity data which were added at the end of each column are removed, as shown in FIG. 37($f$).

As described above, even though the total number of CRC errors corresponding to each row within the RS frame is greater than the maximum number of errors that can be corrected by the RS erasure decoding process, when the number of bytes determined to have a low reliability level, based upon the reliability information on the reliability map within a particular column, while performing error correction decoding on the particular column. Herein, the difference between the general RS decoding process and the RS erasure decoding process is the number of errors that can be corrected. More specifically, when performing the general RS decoding process, the number of errors corresponding to half of the number of parity bytes (i.e., (number of parity bytes)/2) that are inserted during the RS encoding process may be error corrected (e.g., 24 errors may be corrected). Alternatively, when performing the RS erasure decoding process, the number of errors corresponding to the number of parity bytes that are inserted during the RS encoding process may be error corrected (e.g., 48 errors may be corrected).

After performing the error correction decoding process, as described above, a RS frame configured of 187 N-byte rows (or packets) maybe obtained, as shown in FIG. 37(*f*). Furthermore, the RS frame having the size of N*187 bytes is sequentially outputted in N number of 187-byte units. Herein, as shown in FIG. 37(*g*), the 1-byte MPEG synchronization byte that was removed by the transmitting system is added at the end of each 187-byte packet, thereby outputting 188-byte mobile service data packets.

Figure 38:
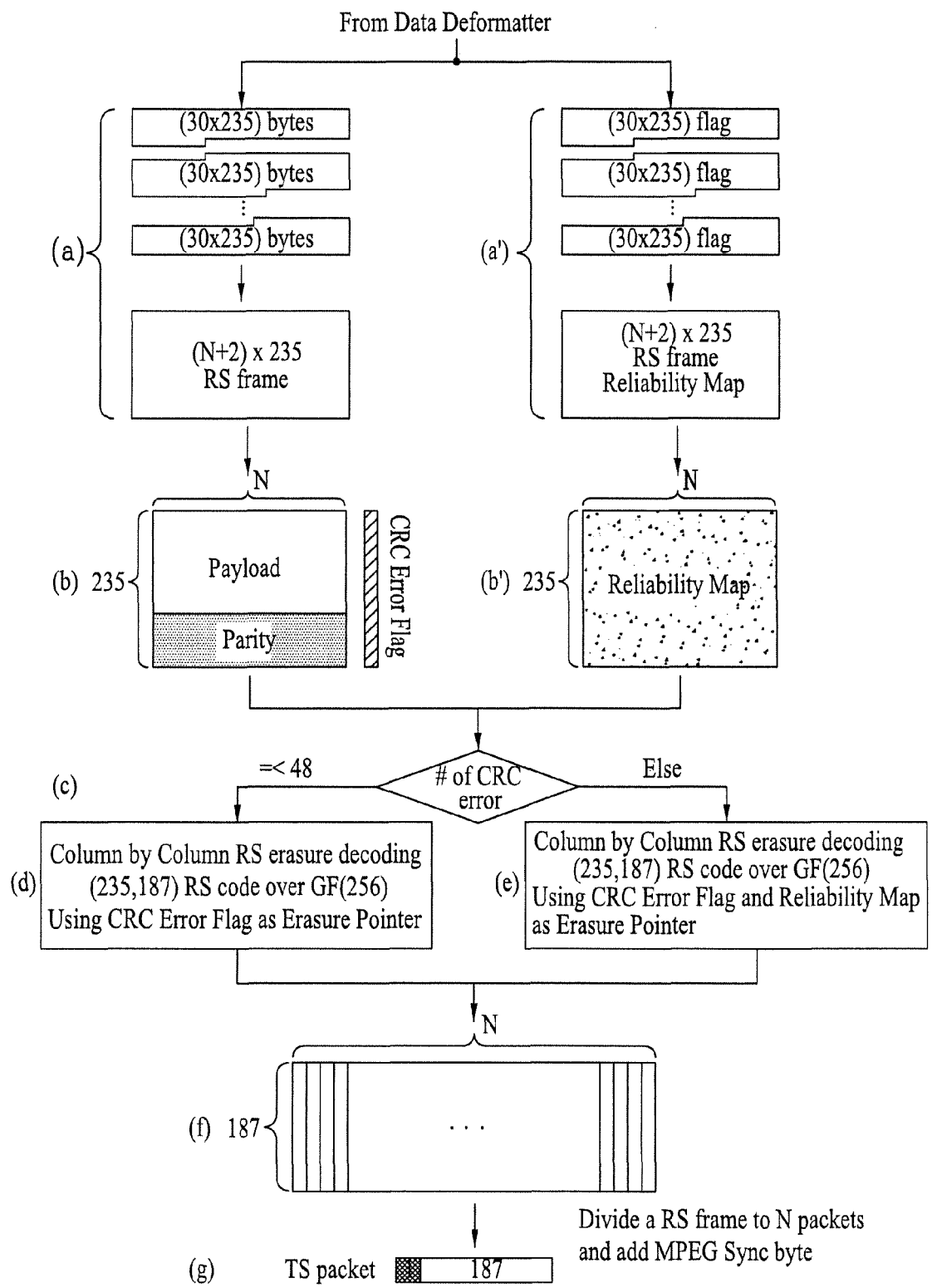
FIG. 38 illustrates process steps of error correction decoding according to another embodiment of the present invention.

When RS frame encoding is performed as shown in FIG. 6, FIG. 38 illustrates process steps of an error correction decoding process performed by the RS frame decoder 907 according to an embodiment of the present invention. More specifically, the RS frame decoder 907 groups mobile service data bytes received from the data deformatter 906 so as to configure a RS frame. The mobile service data correspond to data RS encoded and CRC encoded from the transmitting system. FIG. 38(*a*) illustrates an example of configuring the RS frame. More specifically, the transmitting system divided the RS frame having the size of (N+2)*235 into 30*235 byte blocks. When it is assumed that each of the divided mobile service data byte blocks is inserted in each data group and then transmitted, the receiving system also groups the 30*235 mobile service data byte blocks respectively inserted in each data group, thereby configuring an RS frame having the size of (N+2)*235. For example, when it is assumed that an RS frame is divided into 18 30*235 byte blocks and transmitted from a burst section, the receiving system also groups the mobile service data bytes of 18 data groups within the corresponding burst section, so as to configure the RS frame. Furthermore, when it is assumed that N is equal to 538 (i.e., N=538), the RS frame decoder 907 may group the mobile service data bytes within the 18 data groups included in a burst so as to configure a RS frame having the size of 540*235 bytes.

Herein, when it is assumed that the block decoder 905 outputs a soft decision value for the decoding result, the RS frame decoder 907 may decide the '0' and '1' of the corresponding bit by using the codes of the soft decision value. 8 bits that are each decided as described above are grouped to create 1 data byte. If the above-described process is performed on all soft decision values of the 18 data groups included in a single burst, the RS frame having the size of 540*235 bytes may be configured. Additionally, the present invention uses the soft decision value not only to configure the RS frame but also to configure a reliability map. Herein, the reliability map indicates the reliability of the corresponding data byte, which is configured by grouping 8 bits, the 8 bits being decided by the codes of the soft decision value.

For example, when the absolute value of the soft decision value exceeds a pre-determined threshold value, the value of the corresponding bit, which is decided by the code of the corresponding soft decision value, is determined to be reliable. Conversely, when the absolute value of the soft decision value does not exceed the pre-determined threshold value, the value of the corresponding bit is determined to be unreliable. Thereafter, if even a single bit among the 8 bits, which are decided by the codes of the soft decision value and group to configure 1 data byte, is determined to be unreliable, the corresponding data byte is marked on the reliability map as an unreliable data byte.

Herein, determining the reliability of 1 data byte is only exemplary. More specifically, when a plurality of data bytes (e.g., at least 4 data bytes) are determined to be unreliable, the corresponding data bytes may also be marked as unreliable data bytes within the reliability map. Conversely, when all of the data bits within the 1 data byte are determined to be reliable (i.e., when the absolute value of the soft decision values of all 8 bits included in the 1 data byte exceed the predetermined threshold value), the corresponding data byte is marked to be a reliable data byte on the reliability map. Similarly, when a plurality of data bytes (e.g., at least 4 data bytes) are determined to be reliable, the corresponding data bytes may also be marked as reliable data bytes within the reliability map. The numbers proposed in the above-described example are merely exemplary and, therefore, do not limit the scope or spirit of the present invention.

The process of configuring the RS frame and the process of configuring the reliability map both using the soft decision value may be performed at the same time. Herein, the reliability information within the reliability map is in a one-to-one correspondence with each byte within the RS frame. For example, if a RS frame has the size of 540*235 bytes, the reliability map is also configured to have the size of 540*235 bytes. FIG. 38(*a*') illustrates the process steps of configuring the reliability map according to the present invention. Meanwhile, if a RS frame is configured to have the size of (N+2)*235 bytes, the RS frame decoder 907 performs a CRC syndrome checking process on the corresponding RS frame, thereby verifying whether any error has occurred in each row. Subsequently, as shown in FIG. 38(*b*), a 2-byte checksum is removed to configure an RS frame having the size of N*235 bytes. Herein, the presence (or existence) of an error is indicated on an error flag corresponding to each row. Similarly, since the portion of the reliability map corresponding to the CRC checksum has hardly any applicability, this portion is removed so that only N*235 number of the reliability information bytes remain, as shown in FIG. 38(*b*').

After performing the CRC syndrome checking process, the RS frame decoder 907 performs RS decoding in a column direction. Herein, a RS erasure correction process may be performed in accordance with the number of CRC error flags. More specifically, as shown in FIG. 38(*c*), the CRC error flag corresponding to each row within the RS frame is verified. Thereafter, the RS frame decoder 907 determines whether the number of rows having a CRC error occurring therein is equal to or smaller than the maximum number of errors on which the RS erasure correction may be performed, when performing the RS decoding process in a column direction. The maximum number of errors corresponds to a number of parity bytes inserted when performing the RS encoding process. In the embodiment of the present invention, it is assumed that 48 parity bytes have been added to each column.

If the number of rows having the CRC errors occurring therein is smaller than or equal to the maximum number of errors (i.e., 48 errors according to this embodiment) that can be corrected by the RS erasure decoding process, a (235,187)-RS erasure decoding process is performed in a column direction on the RS frame having 235 N-byte rows, as shown in FIG. 38(*d*). Thereafter, as shown in FIG. 38(*f*), the 48-byte parity data that have been added at the end of each column are removed. Conversely, however, if the number of rows having the CRC errors occurring therein is greater than the maximum number of errors (i.e., 48 errors) that can be corrected by the RS erasure decoding process, the RS erasure decoding process cannot be performed. In this case, the error may be corrected by performing a general RS decoding process. In addition, the reliability map, which has been created based upon the soft decision value along with the RS frame, may be used to further enhance the error correction ability (or performance) of the present invention.

More specifically, the RS frame decoder 907 compares the absolute value of the soft decision value of the block decoder 905 with the pre-determined threshold value, so as to determine the reliability of the bit value decided by the code of the corresponding soft decision value. Also, 8 bits, each being determined by the code of the soft decision value, are grouped to form 1 data byte. Accordingly, the reliability information on this 1 data byte is indicated on the reliability map. Therefore, as shown in FIG. 38(*e*), even though a particular row is determined to have an error occurring therein based upon a CRC syndrome checking process on the particular row, the present invention does not assume that all bytes included in the row have errors occurring therein. The present invention refers to the reliability information of the reliability map and sets only the bytes that have been determined to be unreliable as erroneous bytes. In other words, with disregard to whether or not a CRC error exists within the corresponding row, only the bytes that are determined to be unreliable based upon the reliability map are set as erasure points.

According to another method, when it is determined that CRC errors are included in the corresponding row, based upon the result of the CRC syndrome checking result, only the bytes that are determined by the reliability map to be unreliable are set as errors. More specifically, only the bytes corresponding to the row that is determined to have errors included therein and being determined to be unreliable based upon the reliability information, are set as the erasure points. Thereafter, if the number of error points for each column is smaller than or equal to the maximum number of errors (i.e., 48 errors) that can be corrected by the RS erasure decoding process, an RS erasure decoding process is performed on the corresponding column. Conversely, if the number of error points for each column is greater than the maximum number of errors (i.e., 48 errors) that can be corrected by the RS erasure decoding process, a general decoding process is performed on the corresponding column.

More specifically, if the number of rows having CRC errors included therein is greater than the maximum number of errors (i.e., 48 errors) that can be corrected by the RS erasure decoding process, either an RS erasure decoding process or a general RS decoding process is performed on a column that is decided based upon the reliability information of the reliability map, in accordance with the number of erasure points within the corresponding column. For example, it is assumed that the number of rows having CRC errors included therein within the RS frame is greater than 48. And, it is also assumed that the number of erasure points decided based upon the reliability information of the reliability map is indicated as 40 erasure points in the first column and as 50 erasure points in the second column. In this case, a (235,187)-RS erasure decoding process is performed on the first column. Alternatively, a (235,187)-RS decoding process is performed on the second column. When error correction decoding is performed on all column directions within the RS frame by using the above-described process, the 48-byte parity data which were added at the end of each column are removed, as shown in FIG. 38(*f*).

As described above, even though the total number of CRC errors corresponding to each row within the RS frame is greater than the maximum number of errors that can be corrected by the RS erasure decoding process, when the number of bytes determined to have a low reliability level, based upon the reliability information on the reliability map within a particular column, while performing error correction decoding on the particular column. Herein, the difference between the general RS decoding process and the RS erasure decoding process is the number of errors that can be corrected. More specifically, when performing the general RS decoding process, the number of errors corresponding to half of the number of parity bytes (i.e., (number of parity bytes)/2) that are inserted during the RS encoding process may be error corrected (e.g., 24 errors may be corrected). Alternatively, when performing the RS erasure decoding process, the number of errors corresponding to the number of parity bytes that are inserted during the RS encoding process may be error corrected (e.g., 48 errors may be corrected). In the above-described example, it was assumed that 50 error points have been marked in the second column. Therefore, if a general RS encoding process is performed on the second column, only 24 errors are corrected, and the other 26 errors are not corrected.

In this case, since one column is configured of 187 bytes, as shown in FIG. 6(*c*), one packet unit is considered as the basic unit for performing RS encoding and decoding. Therefore, after performing RS decoding on each of the columns, the system may know whether or not error correction has been successfully performed on the corresponding packet. For example, after RS decoding the second column, the system may recognize whether or not one or more errors exits in the 187-byte packet inserted in the second column. In the example given in the present invention, information as to whether or not an error exists within the 187-byte packet is indicated on a TP error flag within a header of the corresponding packet. In the above-described example, 26 errors still remain in the second column, even after the second column has been RS decoded. Therefore, information that errors still exist is marked on the TP error flag of the packet corresponding to the second column. Furthermore, all errors in the first column have been corrected after processing the first column with RS decoding. Therefore, information that no error exists is marked on the TP error flag of the packet corresponding to the first column. Similarly, with respect to columns in which no error has occurred, information that no error exists is marked on the TS error flag of the corresponding packet.

It is preferable to indicate information on whether or not one or more errors exist on the TP error flag after the derandomizer 908 has derandomized the corresponding data packet. In this case, the RS frame decoder 907 only transmits information on whether or not one or more errors exist within the corresponding column (i.e., packet). Herein, the information on whether or not one or more errors exist within a corresponding column, which is (or to be) indicated on the TP error flag within the header of the corresponding packet, corresponds to additional information on the corresponding packet. Reference is made to this additional information in later processes (e.g., by the video decoder). For example, when decoding a packet, the video decoder may perform decoding on the corresponding packet based upon the error information indicated on the TP flag within the packet that is to be decoded. Alternatively, the video decoder may also disregard the corresponding packet and not decode the packet. Furthermore, the video decoder may also process the corresponding packet by using a different method.

Meanwhile, after the RS frame decoder 907 performs an RS decoding process, as shown in FIG. 38(*d*) or FIG. 38(*e*), an RS frame configured of 187 N-byte rows, as shown in FIG. 38(*f*). Thereafter, the RS frame having the size of N*187 bytes is sequentially outputted in N number of 187-byte units. More specifically, an outputted column becomes a data packet having the size of 187 bytes, as shown in FIG. 6(b). Herein, as shown in FIG. 38(g), the 1-byte MPEG synchronization byte that was removed by the transmitting system is added at the end of each 187-byte packet, thereby outputting 188-byte mobile service data packets.

Figure 39:
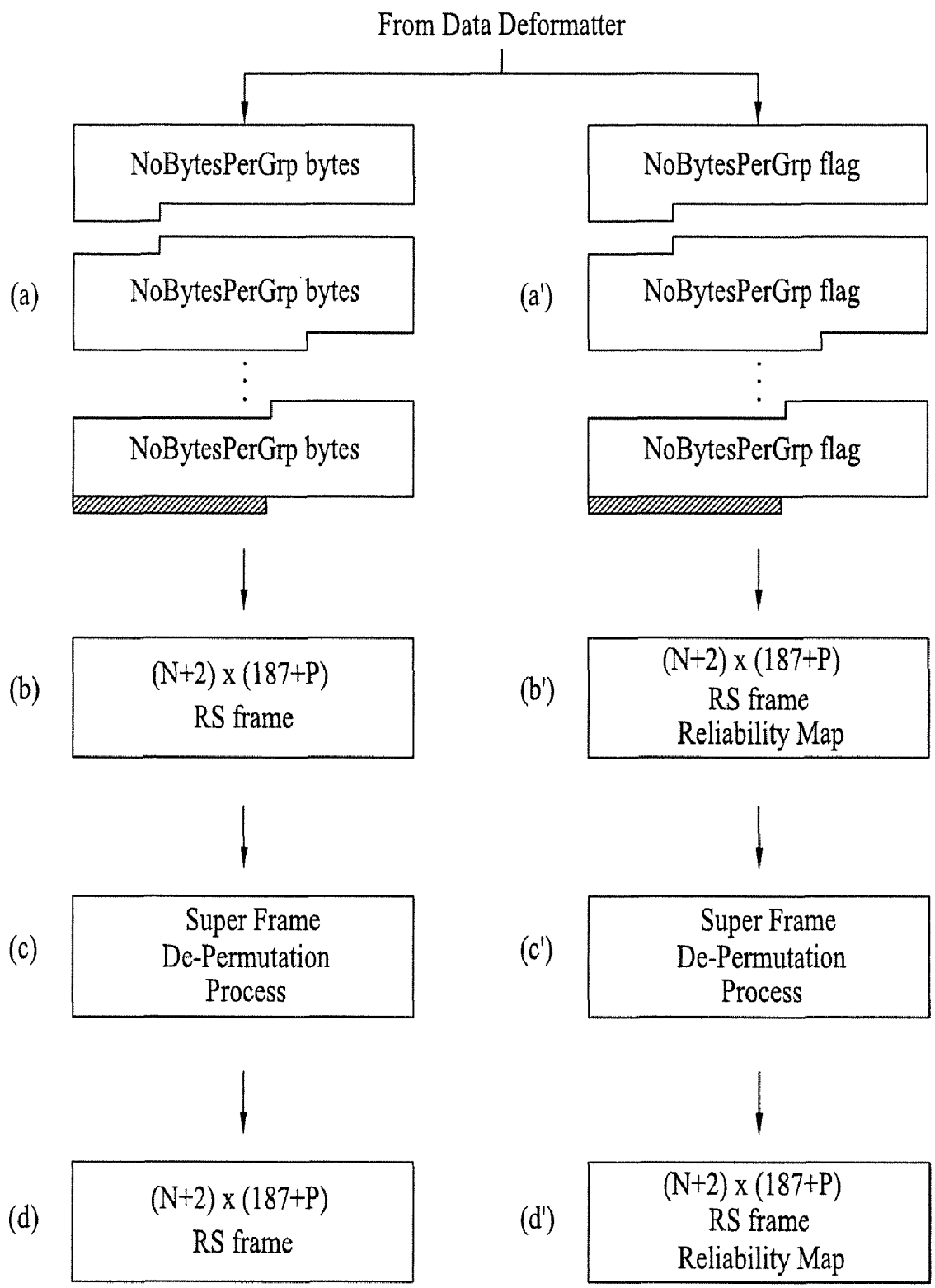
FIG. 39 to FIG. 41 illustrate process steps of error correction decoding according to yet another embodiment of the present invention.

FIG. 39 illustrates a process of grouping a plurality of data groups (e.g., 18 data groups) to create a RS frame and a RS frame reliability map, and also a process of performing data deinterleaving in super frame units as an inverse process of the transmitting system and identifying the deinterleaved RS frame and RS frame reliability map. More specifically, the RS frame decoder 907 groups the inputted mobile service data so as to create a RS frame. The mobile service data have been RS-encoded RS frame units by the transmitting system, and then interleaved in super frame units. At this point, the error correction encoding process (e.g., the CRC encoding process) may have been performed on the mobile service data (as shown in FIG. 5), or may not have been performed on the mobile service data (as shown in FIG. 7).

If it is assumed that the transmitting system has divided the RS frame having the size of (N+2)*(187+P) bytes into M number of data groups (wherein, for example, M is equal to 18) and then transmitted the divided RS frame, the receiving system groups the mobile service data of each data group, as shown in FIG. 39(a), so as to create a RS frame having the size of (N+2)*(187+P) bytes. At this point, if a dummy byte has been added to at least one of the data groups configuring the corresponding RS frame and, then, transmitted, the dummy byte is removed, and a RS frame and a RS frame reliability map are created. For example, as shown in FIG. 21, if K number of dummy bytes has been added, the RS frame and RS frame reliability map are created after the K number of dummy bytes has been removed.

Furthermore, if it is assumed that the RS frame is divided into 18 data groups, which are then transmitted from a single burst section, the receiving system also groups mobile service data of 18 data groups within the corresponding burst section, thereby creating the RS frame. Herein, when it is assumed that the block decoder 905 outputs a soft decision value for the decoding result, the RS frame decoder may decide the '0' and '1' of the corresponding bit by using the codes of the soft decision value. 8 bits that are each decided as described above are grouped to create one data byte. If the above-described process is performed on all soft decision values of the 18 data groups included in a single burst, the RS frame having the size of (N+2)*(187+P) bytes may be configured. Additionally, the present invention uses the soft decision value not only to configure the RS frame but also to configure a reliability map. Herein, the reliability map indicates the reliability of the corresponding data byte, which is configured by grouping 8 bits, the 8 bits being decided by the codes of the soft decision value.

For example, when the absolute value of the soft decision value exceeds a pre-determined threshold value, the value of the corresponding bit, which is decided by the code of the corresponding soft decision value, is determined to be reliable. Conversely, when the absolute value of the soft decision value does not exceed the pre-determined threshold value, the value of the corresponding bit is determined to be unreliable. Thereafter, if even a single bit among the 8 bits, which are decided by the codes of the soft decision value and group to configure one data byte, is determined to be unreliable, the corresponding data byte is marked on the reliability map as an unreliable data byte.

Herein, determining the reliability of one data byte is only exemplary. More specifically, when a plurality of data bytes (e.g., at least 4 data bytes) are determined to be unreliable, the corresponding data bytes may also be marked as unreliable data bytes within the reliability map. Conversely, when all of the data bits within the one data byte are determined to be reliable (i.e., when the absolute value of the soft decision values of all 8 bits included in the one data byte exceed the predetermined threshold value), the corresponding data byte is marked to be a reliable data byte on the reliability map. Similarly, when a plurality of data bytes (e.g., at least 4 data bytes) are determined to be reliable, the corresponding data bytes may also be marked as reliable data bytes within the reliability map. The numbers proposed in the above-described example are merely exemplary and, therefore, do not limit the scope or spirit of the present invention.

The process of configuring the RS frame and the process of configuring the reliability map both using the soft decision value may be performed at the same time. Herein, the reliability information within the reliability map is in a one-to-one correspondence with each byte within the RS frame. For example, if a RS frame has the size of (N+2)*(187+P) bytes, the reliability map is also configured to have the size of (N+2)*(187+P) bytes. FIG. 39(a') and FIG. 39(b') respectively illustrate the process steps of configuring the reliability map according to the present invention.

At this point, the RS frame of FIG. 39(b) and the RS frame reliability map of FIG. 39(b') are interleaved in super frame units (as shown in FIG. 8). Therefore, the RS frame and the RS frame reliability maps are grouped to create a super frame and a super frame reliability map. Subsequently, as shown in FIG. 39(c) and FIG. 39(c'), a de-permutation (or deinterleaving) process is performed in super frame units on the RS frame and the RS frame reliability maps, as an inverse process of the transmitting system. Then, when the de-permutation process is performed in super frame units, the processed data are divided into de-permuted (or deinterleaved) RS frames having the size of (N+2)*(187+P) bytes and de-permuted RS frame reliability maps having the size of (N+2)*(187+P) bytes, as shown in FIG. 39(d) and FIG. 39(d'). Subsequently, the RS frame reliability map is used on the divided RS frames so as to perform error correction.

Figure 40:
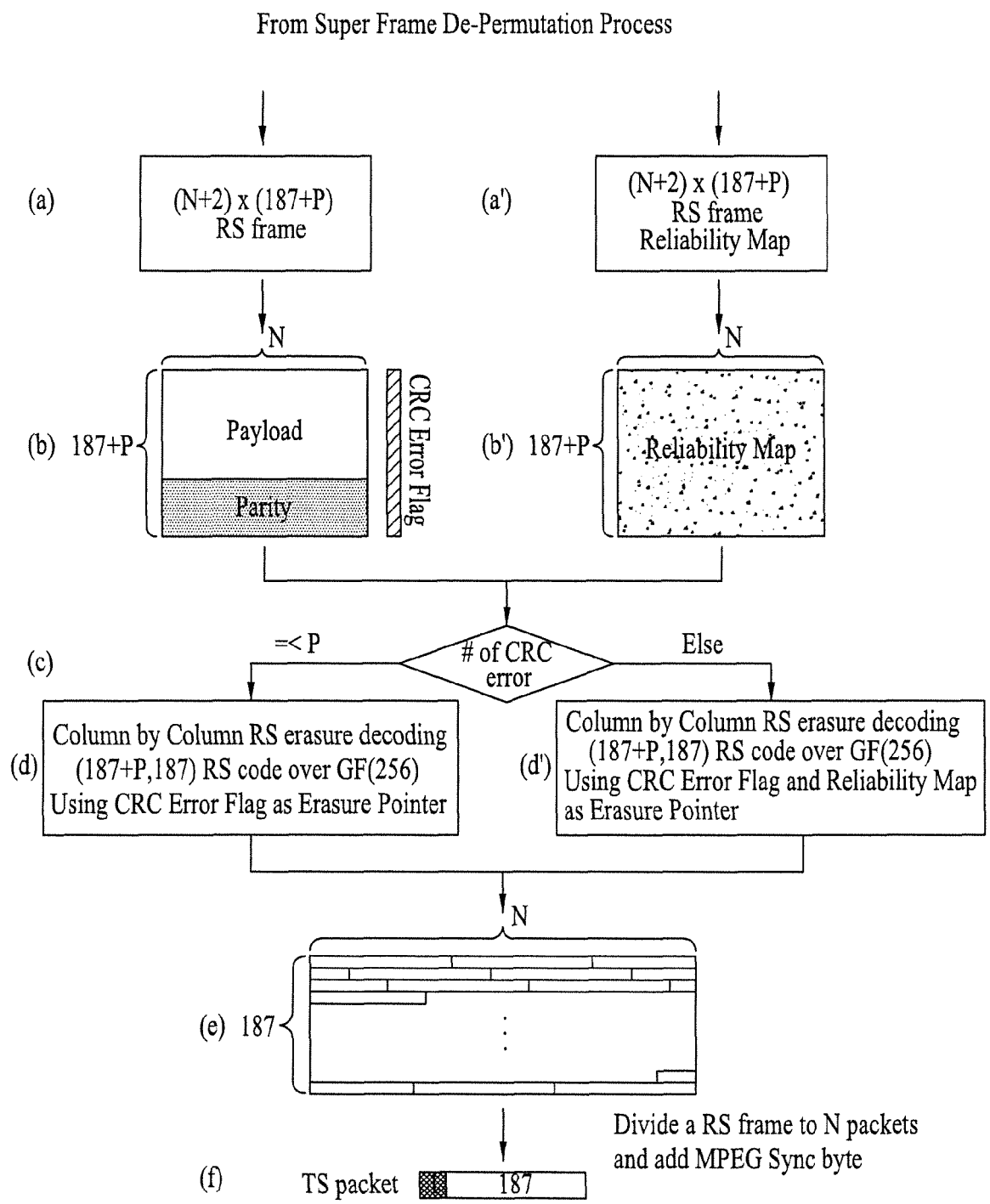
Figure 41:
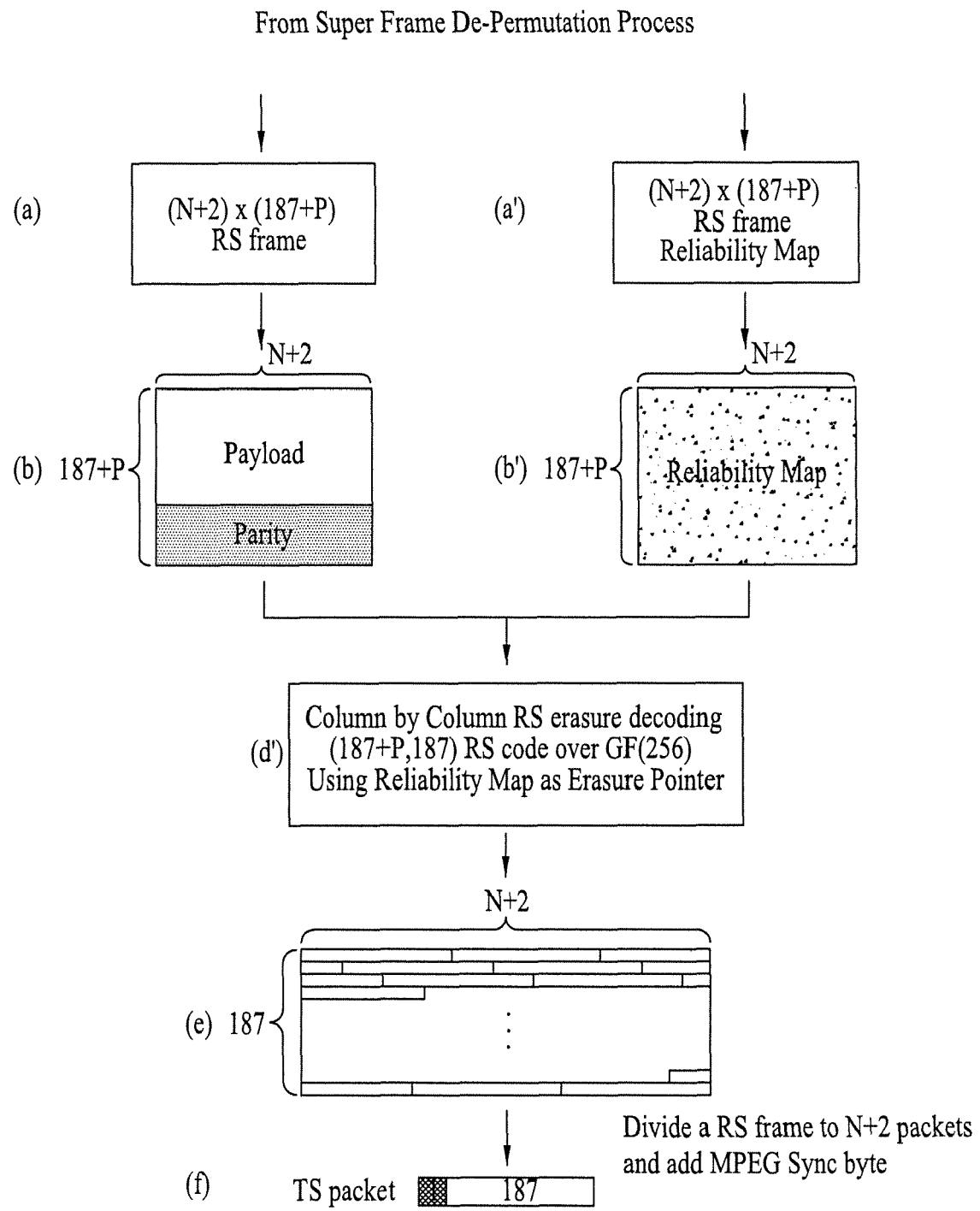

FIG. 40 and FIG. 41 illustrate example of the error correction processed according to embodiments of the present invention. FIG. 40 illustrates an example of performing an error correction process when the transmitting system has performed both RS encoding and CRC encoding processes on the RS frame (as shown in FIG. 5). And, FIG. 41 illustrates an example of performing an error correction process when the transmitting system has performed only the RS encoding process and not the CRC encoding process on the RS frame (as shown in FIG. 7). Hereinafter, the error correction process will now be described in detail with reference to FIG. 40.

As shown in FIG. 40(a) and FIG. 40(a'), when the RS frame having the size of (N+2)*(187+P) bytes and the RS frame reliability map having the size of (N+2)*(187+P) bytes are created, a CRC syndrome checking process is performed on the created RS frame, thereby verifying whether any error has occurred in each row. Subsequently, as shown in FIG. 40(b), a 2-byte checksum is removed to configure an RS frame having the size of N*(187+P) bytes. Herein, the presence (or existence) of an error is indicated on an error flag corresponding to each row. Similarly, since the portion of the reliability map corresponding to the CRC checksum has hardly any applicability, this portion is removed so that only N*(187+P) number of the reliability information bytes remain, as shown in FIG. 40(b').

After performing the CRC syndrome checking process, as described above, a RS decoding process is performed in a column direction. Herein, a RS erasure correction process may be performed in accordance with the number of CRC error flags. More specifically, as shown in FIG. 40(*c*), the CRC error flag corresponding to each row within the RS frame is verified. Thereafter, the RS frame decoder 907 determines whether the number of rows having a CRC error occurring therein is equal to or smaller than the maximum number of errors on which the RS erasure correction may be performed, when performing the RS decoding process in a column direction. The maximum number of errors corresponds to P number of parity bytes inserted when performing the RS encoding process. In the embodiment of the present invention, it is assumed that 48 parity bytes have been added to each column (i.e., P=48).

If the number of rows having the CRC errors occurring therein is smaller than or equal to the maximum number of errors (i.e., 48 errors according to this embodiment) that can be corrected by the RS erasure decoding process, a (235,187)-RS erasure decoding process is performed in a column direction on the RS frame having (187+P) number of N-byte rows (i.e., 235 N-byte rows), as shown in FIG. 40(*d*). Thereafter, as shown in FIG. 40(*e*), the 48-byte parity data that have been added at the end of each column are removed. Conversely, however, if the number of rows having the CRC errors occurring therein is greater than the maximum number of errors (i.e., 48 errors) that can be corrected by the RS erasure decoding process, the RS erasure decoding process cannot be performed. In this case, the error may be corrected by performing a general RS decoding process. In addition, the reliability map, which has been created based upon the soft decision value along with the RS frame, may be used to further enhance the error correction ability (or performance) of the present invention.

More specifically, the RS frame decoder 907 compares the absolute value of the soft decision value of the block decoder 905 with the pre-determined threshold value, so as to determine the reliability of the bit value decided by the code of the corresponding soft decision value. Also, 8 bits, each being determined by the code of the soft decision value, are grouped to form one data byte. Accordingly, the reliability information on this one data byte is indicated on the reliability map. Therefore, as shown in FIG. 40(*c*), even though a particular row is determined to have an error occurring therein based upon a CRC syndrome checking process on the particular row, the present invention does not assume that all bytes included in the row have errors occurring therein. The present invention refers to the reliability information of the reliability map and sets only the bytes that have been determined to be unreliable as erroneous bytes. In other words, with disregard to whether or not a CRC error exists within the corresponding row, only the bytes that are determined to be unreliable based upon the reliability map are set as erasure points.

According to another method, when it is determined that CRC errors are included in the corresponding row, based upon the result of the CRC syndrome checking result, only the bytes that are determined by the reliability map to be unreliable are set as errors. More specifically, only the bytes corresponding to the row that is determined to have errors included therein and being determined to be unreliable based upon the reliability information, are set as the erasure points. Thereafter, if the number of error points for each column is smaller than or equal to the maximum number of errors (i.e., 48 errors) that can be corrected by the RS erasure decoding process, an RS erasure decoding process is performed on the corresponding column. Conversely, if the number of error points for each column is greater than the maximum number of errors (i.e., 48 errors) that can be corrected by the RS erasure decoding process, a general decoding process is performed on the corresponding column.

More specifically, if the number of rows having CRC errors included therein is greater than the maximum number of errors (i.e., 48 errors) that can be corrected by the RS erasure decoding process, either an RS erasure decoding process or a general RS decoding process is performed on a column that is decided based upon the reliability information of the reliability map, in accordance with the number of erasure points within the corresponding column. For example, it is assumed that the number of rows having CRC errors included therein within the RS frame is greater than 48. And, it is also assumed that the number of erasure points decided based upon the reliability information of the reliability map is indicated as 40 erasure points in the first column and as 50 erasure points in the second column. In this case, a (235,187)-RS erasure decoding process is performed on the first column. Alternatively, a (235,187)-RS decoding process is performed on the second column. When error correction decoding is performed on all column directions within the RS frame by using the above-described process, the 48-byte parity data which were added at the end of each column are removed, as shown in FIG. 40(*e*).

As described above, even though the total number of CRC errors corresponding to each row within the RS frame is greater than the maximum number of errors that can be corrected by the RS erasure decoding process, when the number of bytes determined to have a low reliability level, based upon the reliability information on the reliability map within a particular column, while performing error correction decoding on the particular column. Herein, the difference between the general RS decoding process and the RS erasure decoding process is the number of errors that can be corrected. More specifically, when performing the general RS decoding process, the number of errors corresponding to half of the number of parity bytes (i.e., (number of parity bytes)/2) that are inserted during the RS encoding process may be error corrected (e.g., 24 errors may be corrected). Alternatively, when performing the RS erasure decoding process, the number of errors corresponding to the number of parity bytes that are inserted during the RS encoding process may be error corrected (e.g., 48 errors may be corrected).

After performing the error correction decoding process, as described above, a RS frame configured of 187 N-byte rows (or packet) may be obtained as shown in FIG. 40(*e*). The RS frame having the size of N*187 bytes is outputted by the order of N number of 187-byte units. At this point, 1 MPEG synchronization byte, which had been removed by the transmitting system, is added to each 187-byte packet, as shown in FIG. 40(*f*). Therefore, a 188-byte unit mobile service data packet is outputted. Hereinafter, another error correction process will be described in detail with reference to FIG. 41.

As shown in FIG. 41(*a*) and FIG. 41(*a'*), when the RS frame having the size of (N+2)*(187+P) bytes and the RS frame reliability map having the size of (N+2)*(187+P) bytes are created, reference is made to a reliability map with respect to the RS frame, so as to perform a RS decoding process in a column direction. Referring to FIG. 41, since a CRC encoding process has not been performed on the mobile service data by the transmitting system, the CRC syndrome checking process is omitted. Therefore, a CRC error flag which is to be referred to during the RS decoding process does not exist. In other words, the system is unable to determine whether an error exists in each row or not. Therefore, in performing RS decoding in each column as shown in FIG. 41, the RS decoding process is performed by referring to a reliability map, which was created along with the RS frame by using the soft decision value.

FIG. 41(b) and FIG. 41(b') respectively illustrate more detailed views of the RS frame having the size of (N+2)*(187+P) bytes and the RS frame reliability map having the size of (N+2)*(187+P) bytes. Herein, FIG. 41(b) and FIG. 41(b') represent the same RS frame and RS frame reliability map as those shown in FIG. 41(a) and FIG. 41(a'). More specifically, the RS frame decoder 907 compares an absolute value of the soft decision value of the block decoder 905 with a pre-determined threshold value, so as to determine the reliability of bit value, which is decided by a code of the corresponding soft decision value. Further, 8 bits determined by the codes of the soft decision values are grouped to form a byte. And, the reliability information of the corresponding byte is marked in the reliability map. Therefore, the present invention determines a data byte to be erroneous (or to have errors included therein) when the system decides that the corresponding data byte is not reliable based upon the reliability information within the reliability map, as shown in FIG. 41(c). More specifically, only the data bytes determined to be unreliable based upon the reliability information within the reliability map are set as erasure points.

Thereafter, when the number of error points for each column is equal to or smaller than the maximum number (P) of errors that can be corrected by RS erasure decoding (e.g., when P=48), a RS erasure decoding process is performed on the corresponding column. Conversely, when the number of error points for each column is greater than the maximum number (P) of errors that can be corrected by RS erasure decoding (e.g., when P=48), a general RS decoding process is performed on the corresponding column. For example, it is assumed that the number of erasure points decided based upon the reliability information of the reliability map within the RS frame is marked as '40' in the first column and marked as '50' in the second column. Then, (235,187)-RS erasure decoding is performed on the first column, and (235,187)-RS decoding is performed on the second column.

Meanwhile, in decoding each column, another method of referring to the reliability information includes performing a general RS decoding process, when the number of unreliable data bytes is smaller than P/2, performing a RS erasure decoding process, when the number of unreliable data bytes is greater than P/2 and smaller than P, and performing a general RS decoding process, when the number of unreliable data bytes is greater than P. At this point, depending upon the threshold value deciding the reliability information or other particular situations, the first reference method may provide a more enhanced performance. Alternatively, in other case, the second reference method may provide better performance.

The selecting of the appropriate RS decoding method does not only apply in the structure shown in FIG. 41. The selecting of the appropriate and effective RS decoding method also applies in the structure shown in FIG. 40. More specifically, only the method of decoding all of the columns with the same erasure point, when the number of CRC errors is smaller than P, is described and illustrated in FIG. 40. However, as another decoding method, the process may be more fractionalized even when the number of CRC errors is smaller than or equal to P. In other words, a RS decoding process is performed, when the number of CRC errors is smaller than or equal to P/2. And, a RS erasure decoding process may be performed, when the number of CRC errors is greater than P/2 and smaller than or equal to P. Similarly, when the number of CRC errors is greater than P, reference is made to both CRC error information and reliability information of each data byte within the reliability map. Accordingly, when the number of data bytes included in a row indicating the CRC error and, at the same time, determined to have unreliable reliability information is smaller than or equal to P/2, a RS decoding process is performed. When the number of such data bytes is greater than P/2 and smaller than or equal to P, a RS erasure decoding process is performed. Finally, when the number of such data bytes is greater than P, a RS decoding process may be performed. Furthermore, according to another embodiment of the present invention, based upon whether the number of unreliable data bytes is smaller than or equal to P or whether the number of unreliable data bytes is greater than P, the system decides whether to perform a RS erasure decoding process or a general RS decoding process.

Meanwhile, by performing the above-described process so as to perform an error correction decoding process in all column directions within the RS frame, 48 bytes of parity data, which were added to the last portion of each column, are removed, as shown in FIG. 41(d). As described above, in performing an error correction decoding process on a specific column within the corresponding RS frame, when the number of data bytes having a low reliability level based upon the reliability information in the reliability map of the corresponding column is equal to or smaller than a maximum number of error that can be corrected by a RS erasure decoding process, the present invention may perform a RS erasure decoding process of the corresponding column.

After performing the error correction decoding process, as described above, a RS frame configured of 187 (N+2)-byte rows (i.e., packets), as shown in FIG. 41(d). The RS frame having the size of (N+2)*(187+P) bytes is outputted by the order of (N+2) number of 187-byte units. At this point, 1 MPEG synchronization byte, which had been removed by the transmitting system, is added to each 187-byte packet, as shown in FIG. 41(e). Therefore, a 188-byte unit mobile service data packet is outputted.

Figure 42:
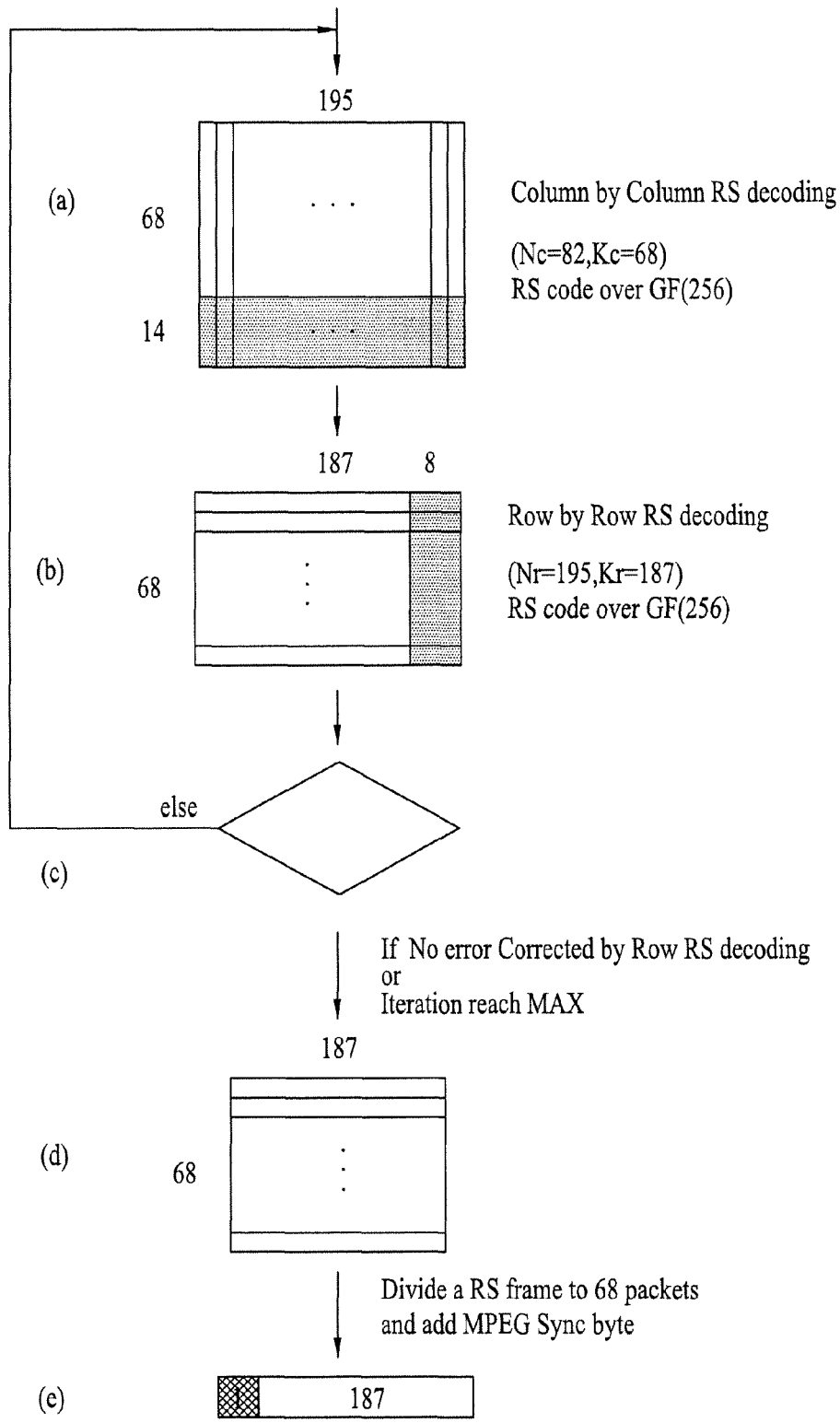
FIG. 42 illustrates process steps of error correction decoding according to yet another embodiment of the present invention.

FIG. 42 illustrates process steps of double error correction decoding performed by the RS frame decoder 907 according to an embodiment of the present invention, when a double error correction encoding process has been performed in an earlier process, as shown in FIG. 11. Before performing the double error correction decoding process, the RS frame decoder 907 first groups a plurality of inputted mobile service data bytes to form a RS frame. Then, the RS frame decoder 907 groups G number of RS frames to form a super frame consisting of 82*G number of rows. Subsequently, the RS frame decoder 907 performs a reverse process of row permutation on the super frame, which consists of 82*G number of 195-byte rows. Thus, the rows are realigned back to their initial state prior to being processed with row permutation by the transmitting system. Thereafter, the processed super frame is divided into G number of RS frames configured of 82 195-byte rows.

Then, the double error correction decoding process is performed as a reverse process of the double error correction encoding process performed by the transmitting system. For example, when a primary RS encoding process is performed in a row direction, and when a secondary RS encoding process is performed in a column direction on the primarily RS encoded data, as shown in FIG. 11, the RS frame decoder 907 performs a primary RS decoding process on each RS frame in a column direction, and, then, performs a secondary RS decoding process on each of the primarily RS decoded RS frames in a row direction. Afterwards, based upon a predetermined condition, either the primary and secondary RS decoding processes are repeated, or the decoding process is terminated.

Herein, a plurality of conditions may be predetermined in the present. According to an embodiment of the present invention, the system may decided whether or not to repeat the decoding process, based upon the number of predetermined repetition rounds and the number of error corrected by the secondary RS decoding process. More specifically, if the maximum number of possible repetition rounds has been completed, or if no further error correction occurs after performing the secondary RS decoding process, the decoding process is terminated. However, in other cases, the primary and secondary RS decoding processes are repeated. In order to do so, (82,68)-RS decoding is performed in a column direction, as shown in FIG. 42(a), on each of the RS frames by the reversed row permutation process. Then, (195,187)-RS decoding is performed in a row direction on the (82,68)-RS decoded RS frames, as shown in FIG. 42(b). At this point, FIG. 42(a) performs (82,68)-RS decoding in a column direction on the RS frames each having 82 195-byte rows. And, FIG. 42(b) performs (195,187)-RS decoding in a row direction on the RS frames each having 68 195-byte rows.

After performing (195,187)-RS decoding in a row direction, the system verifies whether the maximum number of possible repetition rounds has been completed, or whether no further error correction occurs after performing the RS decoding process in a row direction, as shown in FIG. 42(c). At this point, if the maximum number of possible repetition rounds still remains, and if at least one or more error-corrected data bytes are corrected by the RS decoding process, which is performed in a row direction, exist, the process returns to the step shown in FIG. 42(a). Accordingly, RS decoding is performed once again on the RS frame, which has been processed with RS-decoding in a row direction.

More specifically, when one or more error-corrected data bytes exist in the result of a row-direction RS-decoding process, and if a RS-decoding process is performed once again in a column direction on the RS frame RS-decoded in a row direction, additional error-correction may be performed during the column-direction RS-decoding process. Similarly, when RS-decoding is performed once again in a row direction on the additionally error-corrected RS frame by the column-direction RS-decoding process, additional error-correction may also be performed. Therefore, in the present invention, when one or more error-corrected data byte exist in the row-direction RS-decoded result, and when the predetermined number of repetition rounds still remains uncompleted, the column-direction and row-direction RS-decoding processes are repeated while applying the previously error-corrected result in order to enhance the decoding performance.

At this point, when the column-direction and row-direction RS decoding processes are performed repeatedly, the errors may be continuously corrected, thereby enhancing the decoding performance. However, in a particular erroneous state, when an error is corrected by an RS-decoding process performed in a column direction, another error may newly occur in a row direction. And, when an error is corrected by an RS-decoding process performed in row direction, another error may newly occur in a column direction. In order to prevent such defective results (or vicious circle) from occurring, the system according to the present invention limits the number of repetitions of the RS-decoding process.

Furthermore, when an error-corrected data byte no longer exists in the row-direction RS-decoded result, this indicates that no error remains in the corresponding RS frame. And so, the RS-decoding process is no longer required to be repeated. Therefore, referring to FIG. 42(c), if the maximum number of possible repetition rounds is completed, or if an error-corrected data byte corrected by the row-direction RS-decoding process no longer exists, the RS-decoding process is completed, as shown in FIG. 42(d). Thereafter, the 14-byte parity data, which have been added to the end of each column during the double RS-encoding process, and the 8-byte parity data, which have been added to the end of each row, are removed from the processed data. Accordingly, 68 187-byte rows (or packets) may be obtained. Finally, referring to FIG. 42(e), the MPEG synchronization byte, which was removed by the transmitting system, is added at the very beginning of each 187-byte row, thereby outputting a mobile service TS packet that is recovered to 188 data bytes. The above-described double RS-decoding process shown in FIG. 42 is performed on data that are processed with double RS-encoding, as shown in FIG. 9.

Meanwhile, when double RS-encoding process has been performed, as shown in FIG. 12, by the transmitting system, the double RS-decoding process is performed by having the receiving system perform a RS-decoding process in a row direction during the primary error correction decoding process, and by having the same receiving system perform a RS-decoding process in a column direction during the secondary error correction decoding process. The remaining double RS-decoding process steps are identical to those described with reference to FIG. 42. Therefore, a detailed description of the same will be omitted for simplicity. At this point, the number of rounds for repeating the RS decoding process and the number of error-corrected data bytes may vary depending upon the design made by the system designer. Therefore, the present invention will not be limited only to the examples given in the description of the present invention.

Figure 43:
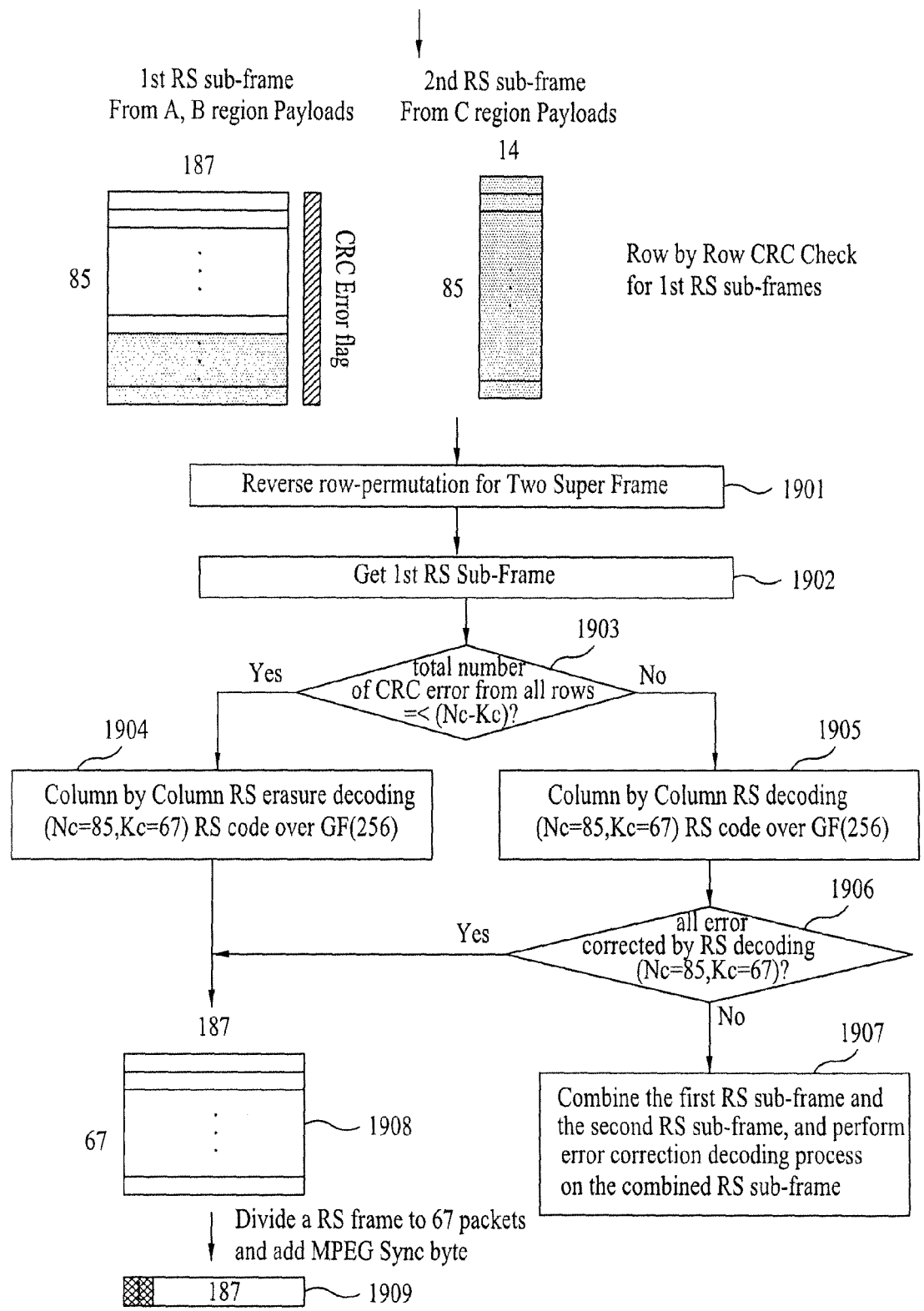
FIG. 43 illustrates process steps of error correction decoding according to yet another embodiment of the present invention.

FIG. 43 illustrates a flow chart showing the process steps of an error correction decoding performed by the RS frame decoder 907 according to an embodiment of the present invention, when an error correction encoding process has been performed in an earlier process, as shown in FIG. 13. For example, when decoding is performed only on the first RS sub-frames, and when, as a result, the receiving system is unable to correct all errors, the receiving system may perform the decoding process by also using the second RS sub-frame. In this embodiment of the present invention, when the number of error within the mobile service data of regions A and B (i.e., the first RS sub-frame) is equal to or greater than a predetermined number of errors, or when the receiving system is unable to correct all errors by performing the decoding process using only the first RS sub-frame, the system additionally uses the mobile service data of region C (i.e., the second RS sub-frame) in order to perform the decoding process.

The RS frame decoder 907 groups G number of first RS sub-frames transmitted to regions A and B, so as to create a first super frame consisting of 85*G number of first RS sub-frames. Also, when using a 1-byte (i.e., 8-bit) CRC checksum, the RS frame decoder 907 determines whether any error exists in each 188-byte data packet. Then, the RS frame decoder 907 removes the 1-byte CRC checksum leaving only 187 bytes. Thereafter, the RS frame decoder 907 indicates the presence of an error on an error flag corresponding to the packet. When using a 2-byte (i.e., 16-bit) CRC checksum, the RS frame decoder 907 determines whether any error exists in each pair of 188-byte data packets. Then, the RS frame decoder 907 removes the 2-byte CRC checksum leaving only 187 bytes in each data packet. In other words, each two 187-byte data packets are grouped to form a pair. Subsequently, the RS frame decoder 907 indicates the presence of an error on an error flag corresponding to each 187-byte data packet. At this point, when a 2-byte CRC checksum is used, each pair of data packets should be indicated either to have an error at the same time or to have no error included therein.

After determining the presence of an error in each row using the CRC checksum, as described above, the RS frame decoder 907 performs a reverse process of the row permutation process on the first super frame, which consists of 85*G number of 187-byte data packets. Thus, the rows are realigned back to their initial state prior to being processed with row permutation by the transmitting system (S1901). Thereafter, the processed first super frame is divided into G number of first RS sub-frames each configured of 85 187-byte data packets. Herein, the error flags, which were used to indicate the error existing in each data packet (or row) during the row permutation process, are converted and applied (or succeeded) to the processed data packets. Each RS frame is formed to have the same byte matrix format of 187×85.

Additionally, the RS frame decoder 907 groups G number of second RS sub-frames transmitted to region C, so as to create a second super frame consisting of 85*G number of second RS sub-frames. The RS frame decoder 907 then performs a reverse process of the row permutation process on the second super frame. Thus, the rows are realigned back to their initial state prior to being processed with row permutation by the transmitting system (S1901). Thereafter, the processed second super frame is divided into G number of second RS sub-frames each configured of 85 14-byte data packets. At this point, since the transmitting system did not perform CRC encoding on the second super frame that is transmitted to region C, the receiving system does not perform CRC decoding on the second super frame as well. After performing the reverse row permutation process, the RS frame decoder 907 performs RS decoding using the error flags, which are used to indicate whether or not an error exists in each packet (or row). Herein, the error flags are succeeded along with the first RS sub-frames (S1902).

At this point, in Step 1903, the RS frame decoder 907 verifies the CRC error flag corresponding to each row within the first RS sub-frame, so as to determine whether the number of rows of the first RS sub-frame each having errors included therein is equal to or smaller than the total number of errors (i.e., Nc−Kc) that can be processed with erasure correction, when the RS frame decoder 907 performs column-direction RS decoding. If the RS frame decoder 907 determines that the number of first RS-sub-frame rows having error included therein is equal to or smaller than the total number of errors that can be corrected by using erasure correction, the RS frame decoder 907 performs (85,67)-RS erasure decoding in a column direction on the first RS sub-frame having 85 187-byte rows. Thereafter, the RS frame decoder 907 removes the 18-byte parity data which were added to the end of each column (S1904 and S1908).

Accordingly, an RS frame consisting of 67 187-byte rows (or packets) may be obtained, as shown in Step 1908. Subsequently, as shown in Step 1909, the RS frame decoder 907 adds the MPEG synchronization byte, which was previously removed by the transmitting system, at the very beginning of each 187-byte row, thereby outputting a mobile service TS packet that is recovered to 188 data bytes. Meanwhile, when the RS frame decoder 907 determines, in Step 1903, that the number of rows of the first RS sub-frame each having errors included therein is larger than the total number of errors (i.e., Nc−Kc) that can be processed with erasure correction, the RS frame decoder 907 performs (85,67)-RS decoding in a column direction on the first RS sub-frame consisting of 85 187-byte rows (S1905). Then, after performing the (85,67)-RS decoding process, the RS frame decoder 907 verifies whether all errors existing in the first RS sub-frame are corrected (S1906).

When the RS frame decoder 907 determines, in Step 1906, that the existing errors have all been corrected, based upon the result of the (85,67)-RS decoding process, the RS frame decoder 907 removes the 18-byte parity data which were added to the end of each column. Accordingly, as shown in Step 1908, an RS frame consisting of 67 187-byte rows (or packets) may be obtained. Thereafter, as shown in Step 1909, the RS frame decoder 907 adds the MPEG synchronization byte, which was previously removed by the transmitting system, to the very beginning of each 187-byte row, thereby outputting a mobile service TS packet that is recovered to 188 data bytes. Alternatively, when the RS frame decoder 907 determines, in Step 1906, that not all of the existing errors have not been corrected, based upon the result of the (85,67)-RS decoding process, the RS frame decoder 907 combines (or merges) the first RS sub-frame and the second RS sub-frame, thereby performing the RS decoding process (S1907).

Figure 44:
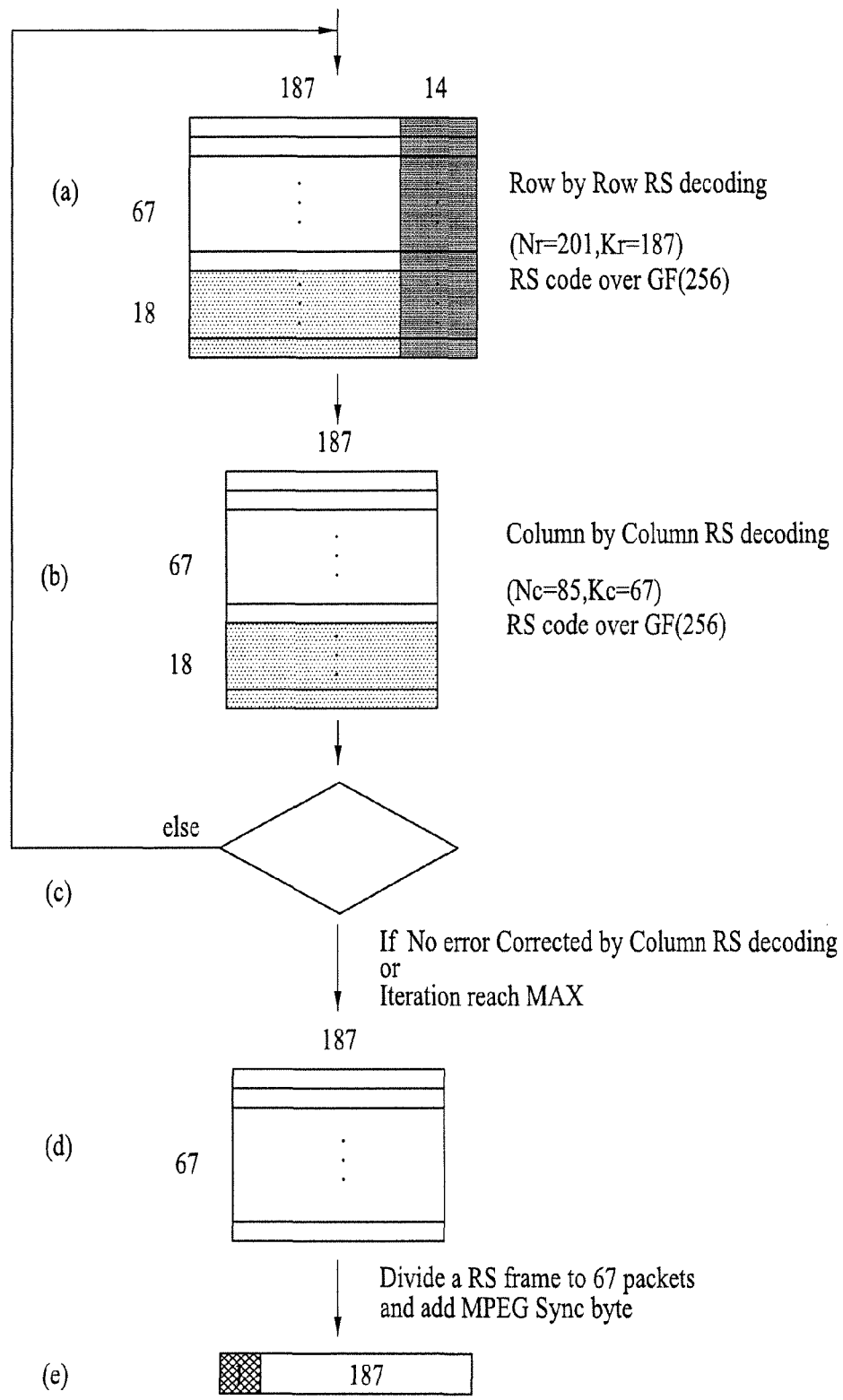
FIG. 44 illustrates detailed operations of an error correction decoding process by combining the first sub-frame and the second sub-frame shown in FIG. 43.

FIG. 44 illustrates an example of combining (or merging) the first RS sub-frame, which is transmitted to regions A and B, and the second RS sub-frame, which is transmitted to region C, in order to perform the RS decoding process, as shown in Step 1907. When the first and second RS sub-frames each being processed with reverse row permutation are merged, an RS frame having 85 201-byte packets (or rows) may be obtained, as shown in FIG. 44(*a*). At this point, each of the RS frames has already been separately processed with double RS encoding. Therefore, the RS frame decoder 907 performs double RS decoding as a reverse process of the double RS encoding process performed by the transmitting system.

For example, when (85,67)-RS encoding is performed in a column direction, and when (201,187)-RS encoding is performed in a row direction on the (85,67)-RS encoded data, as shown in FIG. 13, the RS frame decoder 907 performs (201, 187)-RS decoding (i.e., primary RS encoding) is performed in a row direction, as shown in FIG. 44(*a*), on each of RS frame. Subsequently, (85,67)-RS decoding (i.e., secondary RS encoding) is performed in a column direction, as shown in FIG. 44(*b*). At this point, FIG. 44(*a*) performs (201,187)-RS decoding in a row direction on the RS frames each having 85 201-byte rows. And, FIG. 44(*b*) performs (85,67)-RS decoding in a column direction on the RS frames each having 85 187-byte rows. Afterwards, based upon a predetermined condition, either the column-direction or row-direction RS decoding processes are repeated, or the decoding process is terminated.

Alternatively, when a RS encoding process is performed in a row direction, and when a RS encoding process is performed in a column direction on the primarily RS encoded data, the RS frame decoder 907 first performs a RS decoding (i.e., a primary RS decoding) process on each RS frame in a column direction, and, then, performs a RS decoding (i.e., a secondary RS decoding) process on each of the primarily RS-decoded RS frames in a row direction. Similarly, based upon a predetermined condition, either the column-direction and row-direction RS decoding processes are repeated, or the decoding process is terminated.

Herein, a plurality of conditions may be predetermined in the present. According to an embodiment of the present invention, the system may decided whether or not to repeat the decoding process, based upon the number of predetermined repetition rounds and the number of error corrected by the secondary RS decoding process. More specifically, if the maximum number of possible repetition rounds has been completed, or if no further error correction occurs after performing the secondary RS decoding process, the decoding process is terminated. However, in other cases, the primary and secondary RS decoding processes are repeated.

After performing (85,67)-RS decoding in a column direction, as shown in FIG. 44(b), the system verifies whether the maximum number of possible repetition rounds has been completed, or whether no further error correction occurs after performing the RS decoding process in a column direction, as shown in FIG. 44(c). At this point, if the maximum number of possible repetition rounds still remains, and if at least one or more error-corrected data bytes are corrected by the RS decoding process, which is performed in a column direction, exist, this information is fed-back to the step shown in FIG. 44(a). Accordingly, RS decoding is performed once again in a row direction on the RS frame, which has been processed with RS-decoding in a column direction.

More specifically, when one or more error-corrected data bytes exist in the result of a column-direction RS-decoding process, and if a RS-decoding process is performed once again in a row direction on the RS frame RS-decoded in a column direction, additional error-correction may be performed during the row-direction RS-decoding process. Similarly, when RS-decoding is performed once again in a column direction on the additionally error-corrected RS frame by the row-direction RS-decoding process, additional error-correction may also be performed. Therefore, in the present invention, when one or more error-corrected data byte exist in the column-direction RS-decoded result, and when the predetermined number of repetition rounds still remains uncompleted, the row-direction and column-direction RS-decoding processes are repeated while applying the previously error-corrected result in order to enhance the decoding performance.

At this point, when the row-direction and column-direction RS decoding processes are performed repeatedly, the errors may be continuously corrected, thereby enhancing the decoding performance. However, in a particular erroneous state, when an error is corrected by an RS-decoding process performed in a row direction, another error may newly occur in a column direction. And, when an error is corrected by an RS-decoding process performed in column direction, another error may newly occur in a row direction. In order to prevent such defective results (or vicious circle) from occurring, the system according to the present invention limits the number of repetitions of the RS-decoding process.

Furthermore, when an error-corrected data byte no longer exists in the column-direction RS-decoded result, this indicates that no error remains in the corresponding RS frame. And so, the RS-decoding process is no longer required to be repeated. Therefore, referring to FIG. 44(c), if the maximum number of possible repetition rounds is completed, or if an error-corrected data byte corrected by the column-direction RS-decoding process no longer exists, the RS-decoding process is completed, as shown in FIG. 44(d). Thereafter, the 14-byte parity data, which have been added to the end of each row during the double RS-encoding process, and the 18-byte parity data, which have been added to the end of each column, are removed from the processed data. Accordingly, 67 187-byte rows (or packets) may be obtained, as shown in FIG. 44(d). Finally, referring to FIG. 44(e), the MPEG synchronization byte, which was removed by the transmitting system, is added at the very beginning of each 187-byte row, thereby outputting a mobile service TS packet that is recovered to 188 data bytes.

At this point, the number of rounds for repeating the RS decoding process and the number of error-corrected data bytes may vary depending upon the design made by the system designer. Therefore, the present invention will not be limited only to the examples given in the description of the present invention. Furthermore, in RS decoding each RS frame, when the number of rows known to have errors, based upon a CRC error detection result, is equal to or smaller than the maximum number of errors on which the RS erasure correction may be performed, when performing the RS decoding process in a column direction, the erasure correction process is performed as the RS decoding process in order to maximize the error correction performance.

Figure 45:
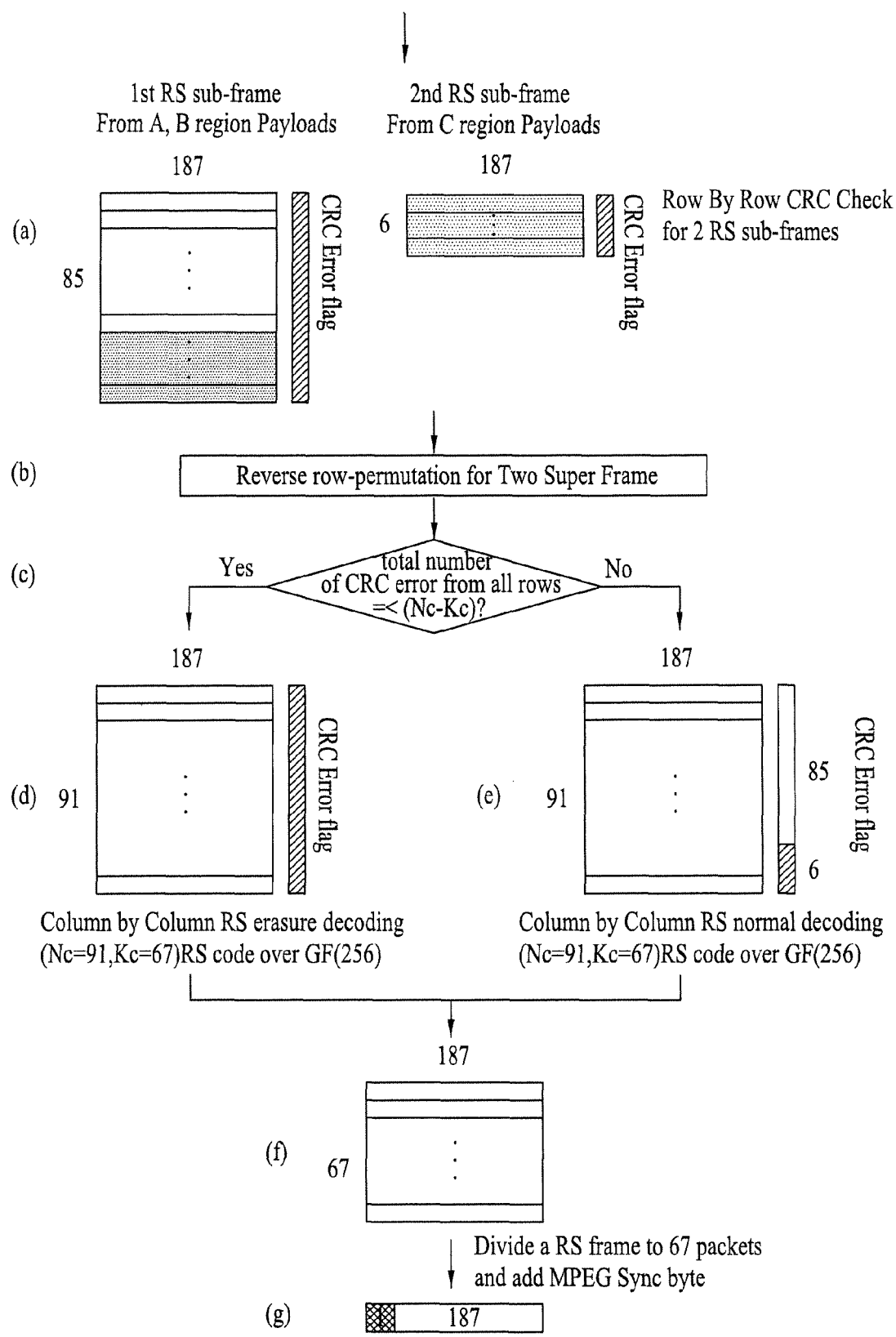
FIG. 45 illustrates process steps of error correction decoding according to yet another embodiment of the present invention.

FIG. 45 illustrates an example of an error correction decoding process performed by the RS frame decoder 907 according to an embodiment of the present invention, when an error correction encoding process has been performed in an earlier process, as shown in FIG. 16. Herein, the RS decoding process may vary depending upon a sum of the number of errors existing in the first RS sub-frames, which are transmitted to regions A and B, and the number of errors existing in the second RS sub-frames, which are transmitted to region C. In order to do so, the RS frame decoder 907 groups G number of first RS sub-frames transmitted to regions A and B, so as to create a first super frame consisting of 85*G number of first RS sub-frames. At this point, a first RS sub-frame consists of 85 187-byte rows (or packets), as shown in FIG. 44(a).

Also, when the transmitting system uses a 1-byte (i.e., 8-bit) CRC checksum, the RS frame decoder 907 determines whether any error exists in each 188-byte data packet within the first super frame. Then, the RS frame decoder 907 removes the 1-byte CRC checksum leaving only 187 bytes. Thereafter, the RS frame decoder 907 indicates the presence of an error on an error flag corresponding to the packet. When using a 2-byte (i.e., 16-bit) CRC checksum, the RS frame decoder 907 determines whether any error exists in each pair of 188-byte data packets. Then, the RS frame decoder 907 removes the 2-byte CRC checksum leaving only 187 bytes in each data packet. In other words, each two 187-byte data packets are grouped to form a pair. Subsequently, the RS frame decoder 907 indicates the presence of an error on an error flag corresponding to each 187-byte data packet. At this point, when a 2-byte CRC checksum is used, each pair of data packets should be indicated either to have an error at the same time or to have no error included therein.

After determining the presence of an error in each row using the CRC checksum, as described above, the RS frame decoder 907 performs a reverse process of the row permutation process on the first super frame, which consists of 85*G number of 187-byte data packets, as shown in FIG. 45(b). Thus, the rows are realigned back to their initial state prior to being processed with row permutation by the transmitting system. Thereafter, the processed first super frame is divided into G number of first RS sub-frames each configured of 85 187-byte data packets. Herein, the error flags, which were used to indicate the error existing in each data packet (or row) during the row permutation process, are converted and applied (or succeeded) to the processed data packets. Additionally, the RS frame decoder 907 groups G number of second RS sub-frames transmitted to region C, so as to create a second super frame consisting of 6*G number of second RS sub-frames. At this point, a second RS sub-frame consists of 6 187-byte rows (or packets), as shown in FIG. 44(a).

Also, when the transmitting system uses a 1-byte (i.e., 8-bit) CRC checksum, the RS frame decoder 907 determines whether any error exists in each 188-byte data packet within the second super frame. Then, the RS frame decoder 907 removes the 1-byte CRC checksum leaving only 187 bytes. Thereafter, the RS frame decoder 907 indicates the presence of an error on an error flag corresponding to the packet. When using a 2-byte (i.e., 16-bit) CRC checksum, the RS frame decoder 907 determines whether any error exists in each pair of 188-byte data packets. Then, the RS frame decoder 907 removes the 2-byte CRC checksum leaving only 187 bytes in each data packet. In other words, each two 187-byte data packets are grouped to form a pair. Subsequently, the RS frame decoder 907 indicates the presence of an error on an error flag corresponding to each 187-byte data packet. At this point, when a 2-byte CRC checksum is used, each pair of data packets should be indicated either to have an error at the same time or to have no error included therein.

After determining the presence of an error in each row using the CRC checksum, as described above, the RS frame decoder 907 performs a reverse process of the row permutation process on the second super frame, which consists of 6*G number of 187-byte data packets, as shown in FIG. 45(b). Thus, the rows are realigned back to their initial state prior to being processed with row permutation by the transmitting system. Thereafter, the processed second super frame is divided into G number of second RS sub-frames each configured of 6 187-byte data packets. Similarly, the error flags, which were used to indicate the error existing in each data packet (or row) during the row permutation process, are converted and applied (or succeeded) to the processed data packets.

At point, when merging the first and second RS sub-frames that are processed with reversed row permutation, a RS frame consisting of 91 187-byte packets (or rows) may be obtained. In FIG. 45(c), the RS frame decoder 907 verifies and determines whether the total number of CRC errors generated in the RS frame is larger than the number of parity data bytes added to the RS frame. Herein, the total number of CRC errors generated in the RS frame can be verified by referring to CRC error flags corresponding to each row within the RS frame. And, the number of parity data bytes added to the RS frame can be known by calculating Nc−Kc. If the total number of CRC errors generated in the RS frame is equal to or smaller than the number of parity data bytes added to the RS frame, 91 CRC error flag values corresponding to each row within the RS frame are used, as shown in FIG. 45(e), in order to perform (91,67)-RS erasure decoding with respect to each column (i.e., in a column direction) within the RS frame. According to another embodiment of the present invention, if the total number of CRC errors generated in the RS frame is larger than the number of parity data bytes added to the RS frame, (91,67)-RS decoding may be performed without using the CRC error flag values.

When RS decoding is performed on each RS frame, as shown in FIG. 45(d) or FIG. 45(e), the 24-byte parity data that were added to the end of each column during the RS encoding process are removed. More specifically, when RS decoding is performed on each RS frame, an RS frame consisting of 67 187-byte rows (or packets) may be obtained, as shown in FIG. 45(f). Finally, referring to FIG. 45(g), the MPEG synchronization byte, which was removed by the transmitting system, is added at the very beginning of each 187-byte row, thereby outputting a mobile service TS packet that is recovered to 188 data bytes.

As described above, the digital broadcasting system and data processing method according to the present invention have the following advantages. More specifically, the digital broadcasting system and data processing method according to the present invention is robust against (or resistant to) any error that may occur when transmitting mobile service data through a channel. And, the present invention is also highly compatible to the conventional system. Moreover, the present invention may also receive the mobile service data without any error even in channels having severe ghost effect and noise.

By inserting known data in specific positions (or places) within a data region, the present invention may enhance the receiving performance of the receiving system in an environment undergoing frequent channel changes. Additionally, when multiplexing the mobile service data with the main service data, by multiplexing the data in a bus structure, the power consumption level of the receiving system may be reduced. Moreover, by using known data information in order to perform channel equalization, the receiving system may perform channel equalization with more stability.

Furthermore, by performing at least one of an error correction encoding process, an error detection encoding process, and a row permutation process in super frame units on the mobile service data and transmitting the processed data, the present invention may provide robustness to the mobile service data, thereby enabling the data to effectively respond to the frequent change in channels. Finally, the present invention is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing broadcast data in a broadcast transmitter, the method comprising:

generating, by a first encoder, a Reed-Solomon (RS) frame by adding RS parity data bytes to bottom ends of columns of an RS frame payload and adding Cyclic Redundancy Check (CRC) data bytes to right ends of rows of the RS frame payload, the RS frame payload including mobile service data bytes;

converting the data bytes in the RS frame into data bits;

encoding, by a second encoder, the converted data bits at a coding rate of 1/H, thereby outputting data symbols, wherein H>2;

interleaving the data symbols in a symbol interleaver, wherein the symbol interleaver interleaves the data symbols by:

calculating L, wherein $L=2^m$, and wherein m is an integer, listing all permuted positions P'(i) in ascending order of i according to the following equation:

P'(i)={S*i*(i+1)/2} mod L, wherein i is a natural number within 0 to (L−1) and wherein S is an integer, discarding all P'(i) that are P'(i)≧B, B being a block length of the data symbols input to the symbol interleaver, and condensing the list by, starting with a lowest i, shifting P'(i) entries to the left to fill empty locations created by discarding all P'(i) that are P'(i)≧B;

converting the interleaved data symbols into data bytes;

mapping the converted data bytes into at least one data group and adding known data sequences and signaling information to each of the at least one data group;

trellis encoding the at least one data group in a trellis encoding unit; and modulating a broadcast signal including the trellis-encoded at least one data group.

2. The method of claim 1, wherein at least two of the known data sequences have different lengths.

3. The method of claim 1, further comprising:
multiplexing mobile service data packets including the converted data bytes in the at least one data group with main service data packets including main service data bytes.

4. The method of claim 1, wherein the trellis encoding unit comprises at least one memory, wherein the at least one memory is initialized at a start of each of the known data sequences.

5. The method of claim 1, wherein one of the data symbols is composed of 2 bits.

6. A broadcast transmitter comprising:
a first encoder for generating a Reed-Solomon (RS) frame by adding RS parity data bytes to bottom ends of columns of an RS frame payload and adding Cyclic Redundancy Check (CRC) data bytes to right ends of rows of the RS frame payload, the RS frame payload including mobile service data bytes;
a byte to bit converter for converting the data bytes in the RS frame into data bits;
a second encoder for encoding the converted data bits at a coding rate of 1/H, thereby outputting data symbols, wherein $H \geq 2$;
a symbol interleaver for interleaving the data symbols, wherein the symbol interleaver interleaves the data symbols by:
calculating L, wherein $L=2^m$, and wherein m is an integer,
listing all permuted positions P'(i) in ascending order of i according to the following equation:
P'(i)={S*i*(i+1)/2} mod L, wherein i is a natural number within 0 to (L−1) and wherein S is an integer,
discarding all P'(i) that are P'(i) 13, B being a block length of the data symbols input to the symbol interleaver, and
condensing the list by, starting with a lowest i, shifting P'(i) entries to the left to fill empty locations created by discarding all P'(i) that are $P'(i) \geq B$;
a symbol to byte converter for converting the interleaved data symbols into data bytes;
a group formatter for mapping the converted data bytes into at least one data group and adding known data sequences and signaling information to each of the at least one data group;
a trellis encoding unit for trellis encoding the at least one data group; and
a modulator for modulating a broadcast signal including the trellis-encoded at least one data group.

7. The broadcast transmitter of claim 6, wherein at least two of the known data sequences have different lengths.

8. The broadcast transmitter of claim 6, further comprising:
a multiplexer for multiplexing mobile service data packets including the converted data bytes in the at least one data group with main service data packets including main service data bytes.

9. The broadcast transmitter of claim 6, wherein the trellis encoding unit comprises at least one memory, wherein the at least one memory is initialized at a start of each of the known data sequences.

10. The broadcast transmitter of claim 6, wherein one of the data symbols is composed of 2 bits.

11. A method of processing broadcast data in a broadcast receiver, the method comprising:
receiving a broadcast signal in a tuner, wherein the broadcast signal results from a process comprising:
generating a Reed-Solomon (RS) frame by adding RS parity data bytes to bottom ends of columns of an RS frame payload and adding Cyclic Redundancy Check (CRC) data bytes to right ends of rows of the RS frame payload, the RS frame payload including mobile service data bytes,
converting the data bytes in the RS frame into data bits,
encoding the converted data bits at a coding rate of 1/H, thereby outputting data symbols, wherein $H \geq 2$,
interleaving the data symbols in a symbol interleaver, wherein the symbol interleaver interleaves the data symbols by:
calculating L, wherein $L=2^m$, and wherein m is an integer,
listing all permuted positions P'(i) in ascending order of i according to the following equation:
P'(i)={S*i*(i+1)/2} mod L, wherein i is a natural number within 0 to (L−1) and wherein S is an integer,
discarding all P'(i) that are $P'(i) \geq B$, B being a block length of the data symbols input to the symbol interleaver, and
condensing the list by, starting with a lowest i, shifting P'(i) entries to the left to fill empty locations created by discarding all P'(i) that are P'(i)>B,
converting the interleaved data symbols into data bytes,
mapping the converted data bytes into at least one data group and adding known data sequences and signaling information to each of the at least one data group,
trellis encoding the at least one data group in a trellis encoding unit, and
modulating the broadcast signal including the trellis-encoded at least one data group;
demodulating the received broadcast signal;
compensating channel distortion in the demodulated broadcast signal based on at least one of the known data sequences;
decoding the channel distortion compensated broadcast signal;
building the RS frame including the mobile service data bytes, the RS parity data bytes, and the CRC data bytes from the decoded broadcast signal; and
correcting at least one error in the RS frame by performing CRC decoding and RS decoding on the RS frame.

12. The method of claim 11, wherein at least two of the known data sequences have different lengths.

13. The method of claim 11, wherein correcting at least one error in the RS frame comprises:
generating a reliability map indicating reliability information of each of the mobile service data bytes in the RS frame.

14. The method of claim 13, wherein correcting at least one error in the RS frame further comprises:
performing RS erase decoding on all columns of the RS frame if a number of rows including errors is less than or equal to a number of the RS parity data bytes added in a column direction of the RS frame.

15. The method of claim 13, wherein correcting at least one error in the RS frame further comprises:
performing either general RS decoding or RS erase decoding on a corresponding column based upon the reliability information of the corresponding column in the reliability map and a value of an error flag corresponding to each row if a number of rows including errors is greater than a number of the RS parity data bytes added in a column direction of the RS frame.

16. A broadcast receiver comprising:

a tuner for receiving a broadcast signal, wherein the broadcast signal results from a process comprising:
- generating a Reed-Solomon (RS) frame by adding RS parity data bytes to bottom ends of columns of an RS frame payload and adding CRC data bytes to right ends of rows of the RS frame payload, the RS frame payload including mobile service data bytes,
- converting the data bytes in the RS frame into data bits,
- encoding the converted data bits at a coding rate of 1/H, thereby outputting data symbols, wherein $H \geq 2$,
- interleaving the data symbols in a symbol interleaver, wherein the symbol interleaver interleaves the data symbols by:
  - calculating L, wherein $L=2^m$, wherein m is an integer,
  - listing all permuted positions P'(i) in ascending order of i according to the following equation:
  - $P'(i)=\{S*i*(i+1)/2\}$ mod L, wherein i is a natural number within 0 to (L−1) and wherein S is an integer,
  - discarding all P'(i) that are $P'(i) \geq B$, B being a block length of the data symbols being input to the symbol interleaver, and
  - condensing the list by, starting with a lowest i, shifting P'(i) entries to the left to fill empty locations created by discarding all P'(i) that are $P'(i) \geq B$,
- converting the interleaved data symbols into data bytes,
- mapping the converted data bytes into at least one data group and adding known data sequences and signaling information to each of the at least one data group,
- trellis encoding the at least one data group in a trellis encoding unit, and
- modulating the broadcast signal including the trellis-encoded at least one data group;

a demodulator for demodulating the received broadcast signal;

an equalizer for compensating channel distortion in the demodulated broadcast signal based on at least one of the known data sequences;

a first decoder for decoding the channel distortion compensated broadcast signal; and a second decoder for building the RS frame including the mobile service data bytes, the RS parity data bytes, and the CRC data bytes from the decoded broadcast signal and correcting at least one error in the RS frame by performing CRC decoding and RS decoding on the RS frame.

17. The broadcast receiver of claim 16, wherein at least two of the known data sequences have different lengths.

18. The broadcast receiver of claim 16, wherein the second decoder generates a reliability map indicating reliability information of each of the mobile service data bytes in the RS frame.

19. The broadcast receiver of claim 18, wherein the second decoder performs RS erase decoding on all columns of the RS frame if a number of rows including errors is less than or equal to a number of the RS parity data bytes added in a column direction of the RS frame.

20. The broadcast receiver of claim 18, wherein the second decoder performs either general RS decoding or RS erase decoding on a corresponding column based upon the reliability information of the corresponding column in the reliability map and a value of an error flag corresponding to each row if a number of rows including errors is greater than a number of the RS parity data bytes added in a column direction of the RS frame.

* * * * *